US012411429B2

(12) United States Patent
Saitoh et al.

(10) Patent No.: US 12,411,429 B2
(45) Date of Patent: Sep. 9, 2025

(54) TONER, DEVELOPER, TONER STORAGE UNIT, IMAGE FORMING APPARATUS, AND IMAGE FORMING METHOD

(71) Applicants: Akinori Saitoh, Shizuoka (JP); Akio Takei, Shizuoka (JP); Toma Takebayashi, Shizuoka (JP); Masahiro Yukikawa, Kanagawa (JP); Tomomi Harashima, Shizuoka (JP); Hiroshi Yamada, Shizuoka (JP)

(72) Inventors: Akinori Saitoh, Shizuoka (JP); Akio Takei, Shizuoka (JP); Toma Takebayashi, Shizuoka (JP); Masahiro Yukikawa, Kanagawa (JP); Tomomi Harashima, Shizuoka (JP); Hiroshi Yamada, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 625 days.

(21) Appl. No.: 17/811,054

(22) Filed: Jul. 6, 2022

(65) Prior Publication Data

US 2023/0014605 A1 Jan. 19, 2023

(30) Foreign Application Priority Data

Jul. 9, 2021 (JP) ................................ 2021-114475

(51) Int. Cl.

*G03G 9/087* (2006.01)
*G03G 9/08* (2006.01)
*G03G 9/093* (2006.01)

(52) U.S. Cl.

CPC ....... *G03G 9/08755* (2013.01); *G03G 9/0806* (2013.01); *G03G 9/0819* (2013.01);

(Continued)

(58) Field of Classification Search

CPC ............ G03G 9/08755; G03G 9/0806; G03G 9/0819; G03G 9/08711; G03G 9/09328; G03G 9/09371

See application file for complete search history.

(56) References Cited

U.S. PATENT DOCUMENTS 6,936,390 B2 8/2005 Nanya et al.
7,303,847 B2 12/2007 Tomita et al.

(Continued)

FOREIGN PATENT DOCUMENTS

JP 3116183 12/2000
JP 2002-284881 10/2002

(Continued)

OTHER PUBLICATIONS

English machine translation of the description of JP-2019143128-A (Year: 2019).*

(Continued)

*Primary Examiner* — Mark F. Huff
*Assistant Examiner* — Boone Alexander Evans
(74) *Attorney, Agent, or Firm* — Grüneberg and Myers PLLC

(57) ABSTRACT

A toner includes toner base particles and external additives deposited on a surface of the toner base particle. The toner base particle includes an amorphous polyester resin, a crystalline polyester resin, a release agent, and resin particles. An abundance ratio of the crystalline polyester resin in the surface of the toner base particle as observed by TEM is 2.5% or greater but 25% or less. The resin particles are deposited at the surface of the toner base particle as observed by SEM. A ratio of aggregates of the resin particles occupying the surface of the toner base particle is 1% or greater but 70% or less, where R is a major axis of the minimum (Continued)

particle of the resin particles, and the resin particle having a major axis of 3R or greater is determined as the aggregate.

14 Claims, 3 Drawing Sheets

(52) U.S. Cl.
CPC ..... *G03G 9/08711* (2013.01); *G03G 9/09328* (2013.01); *G03G 9/09371* (2013.01)

(56) References Cited

U.S. PATENT DOCUMENTS

| | | | |
|---|---|---|---|
| 7,374,851 | B2 | 5/2008 | Nakayama et al. |
| 7,449,273 | B2 | 11/2008 | Ohki et al. |
| 7,504,188 | B2 | 3/2009 | Yamada et al. |
| 7,531,279 | B2 | 5/2009 | Watanabe et al. |
| 8,026,031 | B2 | 9/2011 | Watanabe et al. |
| 9,785,074 | B2 | 10/2017 | Vagata et al. |
| 9,851,649 | B2 | 12/2017 | Makabe et al. |
| 9,921,503 | B2 | 3/2018 | Yamada et al. |
| 10,088,766 | B2 | 10/2018 | Santo et al. |
| 2003/0027074 | A1 | 2/2003 | Emoto et al. |
| 2003/0096185 | A1 | 5/2003 | Yamashita et al. |
| 2003/0134220 | A1 | 7/2003 | Emoto et al. |
| 2003/0138717 | A1 | 7/2003 | Yagi et al. |
| 2003/0152859 | A1 | 8/2003 | Emoto et al. |
| 2004/0131961 | A1 | 7/2004 | Watanabe et al. |
| 2005/0031980 | A1 | 2/2005 | Inoue et al. |
| 2005/0112488 | A1 | 5/2005 | Yamada et al. |
| 2005/0164112 | A1 | 7/2005 | Ohki et al. |
| 2006/0024097 | A1 | 2/2006 | Yamada et al. |
| 2006/0099529 | A1 | 5/2006 | Tanaka et al. |
| 2006/0210903 | A1 | 9/2006 | Ohki et al. |
| 2007/0054210 | A1 | 3/2007 | Ohki et al. |
| 2007/0141506 | A1 | 6/2007 | Inoue et al. |
| 2007/0184370 | A1 | 8/2007 | Yamashita et al. |
| 2007/0218391 | A1 | 9/2007 | Yamada et al. |
| 2007/0218392 | A1 | 9/2007 | Yamada et al. |
| 2008/0070148 | A1 | 3/2008 | Awamura et al. |
| 2008/0213682 | A1 | 9/2008 | Saitoh et al. |
| 2008/0227000 | A1 | 9/2008 | Honda et al. |
| 2008/0280218 | A1 | 11/2008 | Sabu et al. |
| 2008/0280219 | A1 | 11/2008 | Nakayama et al. |
| 2008/0311500 | A1 | 12/2008 | Yamada et al. |
| 2009/0214975 | A1 | 8/2009 | Awamura et al. |
| 2010/0248110 | A1 | 9/2010 | Taguchi et al. |
| 2010/0285402 | A1 | 11/2010 | Saitoh et al. |
| 2011/0033796 | A1 | 2/2011 | Yamada et al. |
| 2014/0242514 | A1 | 8/2014 | Inoue et al. |
| 2014/0272695 | A1 | 9/2014 | Moritani et al. |
| 2014/0342283 | A1 | 11/2014 | Yamamoto et al. |
| 2016/0231661 | A1 | 8/2016 | Nagai et al. |
| 2016/0259257 | A1 | 9/2016 | Sugimoto et al. |
| 2017/0363980 | A1* | 12/2017 | Nagata ................. G03G 9/0904 |
| 2019/0227449 | A1 | 7/2019 | Vemoto et al. |
| 2020/0089140 | A1 | 3/2020 | Masuda et al. |
| 2021/0116830 | A1 | 4/2021 | Takei et al. |
| 2021/0356877 | A1 | 11/2021 | Kamada et al. |
| 2021/0389686 | A1 | 12/2021 | Kakinuma et al. |
| 2022/0050395 | A1 | 2/2022 | Yamada et al. |
| 2022/0057725 | A1 | 2/2022 | Inoue et al. |
| 2022/0057726 | A1 | 2/2022 | Mizoguchi et al. |
| 2022/0137525 | A1 | 5/2022 | Yoshida et al. |
| 2022/0197165 | A1 | 6/2022 | Harashima et al. |

FOREIGN PATENT DOCUMENTS

| | | | | | |
|---|---|---|---|---|---|
| JP | 2004-046095 | | | 2/2004 | |
| JP | 2007-004086 | | | 1/2007 | |
| JP | 2007-271789 | | | 10/2007 | |
| JP | 2010-224502 | A | | 10/2010 | |
| JP | 4873734 | | | 2/2012 | |
| JP | 2014-035542 | | | 2/2014 | |
| JP | 2015-118151 | | | 6/2015 | |
| JP | 5879772 | | | 3/2016 | |
| JP | 5884797 | | | 3/2016 | |
| JP | 2016-164616 | | | 9/2016 | |
| JP | 2019-099809 | | | 6/2019 | |
| JP | 2019-143128 | | | 8/2019 | |
| JP | 2019143128 | A | * | 8/2019 | ........... G03G 9/0802 |
| JP | 2020-106601 | | | 7/2020 | |
| JP | 2021-47217 | A | | 3/2021 | |

OTHER PUBLICATIONS

Notice of Rejection for Japanese Patent Application No. 2021-114475, mailed on Dec. 19, 2024, 7 pages with English transalation.
U.S. Appl. No. 17/678,125, filed Feb. 23, 2022.

* cited by examiner

TONER, DEVELOPER, TONER STORAGE UNIT, IMAGE FORMING APPARATUS, AND IMAGE FORMING METHOD

CROSS-REFERENCE TO RELATED APPLICATIONS

The present application claims priority under 35 U.S.C. § 119 to Japanese Patent Application No. 2021-114475, filed Jul. 9, 2021. The contents of which are incorporated herein by reference in their entirety.

BACKGROUND OF THE INVENTION

Field of the Invention

The present disclosure relates to a toner, a developer, a toner storage unit, an image forming apparatus, and an image forming method.

Description of the Related Art

In recent years, a toner has been desired to have a small particle size and hot offset resistance for improving quality of output images, low temperature fixability for energy saving, and heat resistant storage stability for resisting high temperature and high humidity conditions during storage or transportation after the production of the toner. Particularly, an improvement in low temperature fixability of a toner is very important because the energy consumption during fixing constitutes the majority of the energy consumption from the image formation process.

In order to achieve a high level of low temperature fixability, proposed is a toner including a resin and a release agent, where the resin includes a crystalline polyester resin and the resin and the wax are incompatible and form a sea-island phase separation structure (see Japanese Unexamined Patent Application Publication No. 2004-46095). Moreover, a toner including a crystalline polyester resin, a release agent, and a graft polymer has been proposed (see Japanese Unexamined Patent Application Publication No. 2007-271789).

Moreover, proposed is a toner including a certain amorphous polyester resin A, a certain amorphous polyester resin B, and a certain crystalline polyester resin C to realize excellent low temperature fixability, heat resistant storage stability and preservability in high temperature and high humidity conditions (see Japanese Patent No. 5884797, and Japanese Unexamined Patent Application Publication Nos. 2015-118151 and 2016-164616).

In order to achieve both low temperature fixability and heat resistant storage stability, proposed is a method for producing composite resin particles. The method includes a removing step where part of or all of resin particles are removed after forming composite particles. In each composite resin particle, the resin particles each including two resin as constitutional components are deposited on a surface of the composite resin particle (see Japanese Unexamined Patent Application Publication Nos. 2002-284881, 2019-099809, and 2019-143128).

As one of methods for improving reliability, proposed is a toner having a core-shell structure where a core layer including a styrene acryl-modified polyester resin is covered with spherical particles of a styrene-acryl resin component for constituting a shell for the purpose of achieving high heat resistant storage stability, and preventing toner aggregation due to use over a long period (see Japanese Patent No. 5879772).

As another method, proposed is a toner including non-spherical silica as an external additive in order to prevent liberation or embodiment of the silica. According to the proposal, the liberation or embodiment of the external additives due to frictions between toner particles or between the toner particles and a carrier is prevented by increasing a contact area with the toner base particle.

SUMMARY OF THE INVENTION

According to an aspect of the present disclosure, a toner includes toner base particles, and external additives deposited on a surface of each of the toner base particles. Each of the toner base particles includes an amorphous polyester resin, a crystalline polyester resin, a release agent, and resin particles. An abundance ratio of the crystalline polyester resin in the surface of the toner base particle as observed by a transmission electron microscope (TEM) is 2.5% or greater but 25% or less. The resin particles are deposited at the surface of the toner base particle as observed by a scanning electron microscope (SEM). A ratio of aggregates of the resin particles occupying the surface of the toner base particle is 1% or greater but 70% or less, where R is a major axis of the minimum particle of the resin particles, and the resin particle having a major axis of 3R or greater is determined as the aggregate.

DESCRIPTION OF THE EMBODIMENTS

Figure 1:
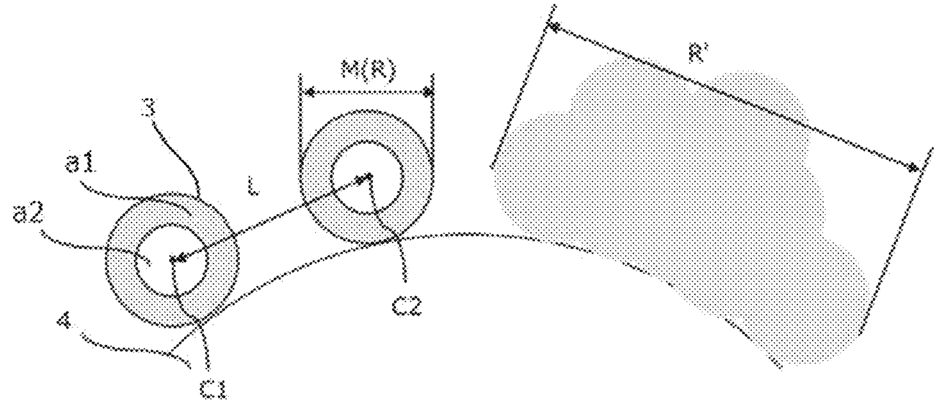
FIG. 1 is a schematic view illustrating an example of a state of a surface of a toner base particle.

The present disclosure will be described with reference to drawings hereinafter. It should be noted that the present disclosure is not limited to the following embodiments, and the following embodiments may be changed by changing to another embodiment, adding, modifying, eliminating, etc. within the range a person in the art can expect. Any of these embodiments are included within the scope of the present disclosure as long as the embodiments exhibit the functions and effects of the present disclosure.

<Toner>

The toner of the present disclosure includes toner base particles, and external additives deposited on a surface of each of the toner base particles. Each of the toner base particles includes an amorphous polyester resin, a crystalline polyester resin, a release agent, and resin particles. An abundance ratio of the crystalline polyester resin in the surface of the toner base particle as observed by a transmission electron microscope (TEM) is 2.5% or greater but 25% or less. The resin particles are deposited at the surface of the toner base particle as observed by a scanning electron microscope (SEM). A ratio of aggregates of the resin particles occupying the surface of the toner base particle is 1% or greater but 70% or less, where R is a major axis of the minimum particle of the resin particles, and the resin particle having a major axis of 3R or greater is determined as the aggregate. The toner may further include other components according to the necessity.

In order to improve low temperature fixability of a toner, it is important that materials having low melting points are used for the toner. However, it has been known that a toner produced with low melting point materials has impaired heat resistant storage stability. Moreover, low temperature fixability and heat resistant storage stability of a toner have a relationship of trade-off.

The toners disclosed in Japanese Unexamined Patent Application Publication Nos. 2004-46095, and 2007-271789, Japanese Patent No. 5884797, and Japanese Unexamined Patent Application Publication Nos. 2015-118151, and 2016-164616 cannot completely avoid deterioration in storage stability due to a crystalline polyester resin arranged at surfaces of particles thereof, and cannot sufficiently achieve both low temperature fixability and storage stability, which have been currently desired in the art.

The toners having excellent low temperature fixability, which are disclosed in Japanese Unexamined Patent Application Publication Nos. 2002-284881, 2019-099809, and 2019-143128, have not sufficiently solve a problem of cleaning failures associated with poor adhesion. When further improvement in low temperature fixability is desired, therefore, it is desired to provide a method for solving poor adhesion force. To improve the low temperature fixability conflicts with improvement of adhesion force.

The toner disclosed in Japanese Patent No. 5879772 has a problem that shell layers inhibit heat transfer from a fixing roller and therefore sufficient low temperature fixability cannot be obtained.

The present disclosure has an object to provide a toner having excellent low temperature fixability, heat resistant storage stability, and cleanability.

The present disclosure can provide a toner having excellent low temperature fixability, heat resistant storage stability, and cleanability.

<Surface Abundance Ratio of Crystalline Polyester>

The toner of the present disclosure includes a crystalline polyester resin. The crystalline polyester resin of the toner is melted at the time of fixing to rapidly reduce the viscosity and become compatible with the amorphous resin to thereby fix the toner. As a result of the above-described characteristics, the toner having excellent low temperature fixability can be obtained. In the present disclosure, it is important that the surface abundance ratio of the crystalline polyester resin in the surfaces of the toner base particles is controlled to be 2.5% or greater but 25% or less. The surface abundance ratio of the crystalline polyester resin is preferably 4% or greater but 20% or less, and more preferably 10% or greater but 15% or less. When the surface abundance ratio of the crystalline polyester resin is within the above-mentioned range, an amount of the crystalline polyester resin exposed to a surface of each toner base particle can be controlled to an appropriate range, and therefore both excellent low temperature fixability and excellent heat resistant storage stability can be achieved. When the surface abundance ratio of the crystalline polyester resin is 2.5% or greater, desirable fixability can be maintained. When the surface abundance ratio of the crystalline polyester resin is 25% or less, desirable heat resistant storage stability can be maintained. The surface abundance ratio of the crystalline polyester resin can be confirmed by observing cross-section of the toner particles under transmission electron microscope (TEM).

<Observation of Cross-Section of Toner>

The toner of the present disclosure includes a crystalline polyester resin and an amorphous polyester resin. The surface abundance ratio of the crystalline polyester resin in the surface of the toner base particle with the crystalline polyester resin can be determined by observing a cross-section of the toner base particles dyed with ruthenium, and analyzing the obtained image. Specifically, the surface abundance ratio can be determined in the following manner.

Figure 4:
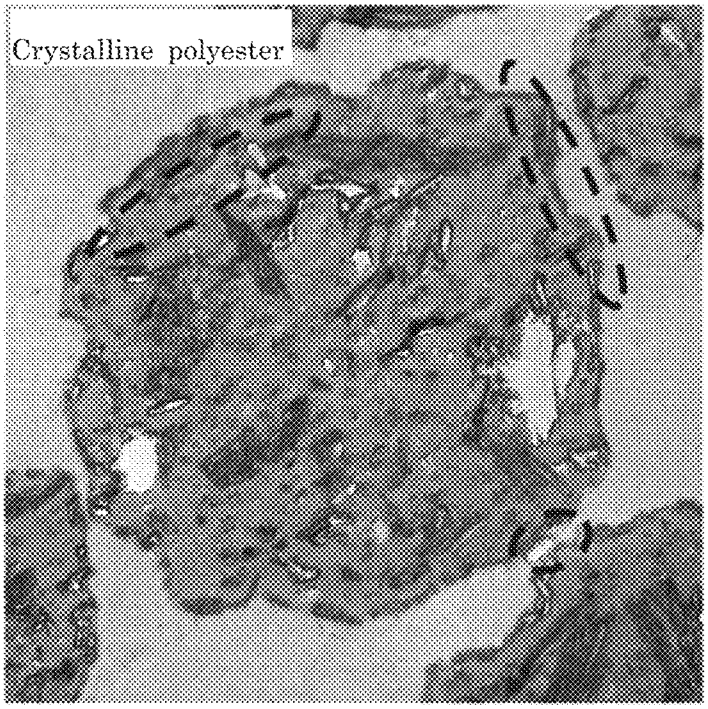
FIG. 4 is a view illustrating an example of distribution of a crystalline polyester resin on a cross-section of a toner base particle according to an embodiment of the present disclosure.

The toner particles or toner base particles are embedded in an epoxy resin, and the epoxy resin is sliced by means of ultramicrotome to obtain a cut piece having an average thickness of 100 nm. The cross-section of the toner particles or toner base particles is observed under transmission electron microscope (TEM). To dye the toner particles or toner base particles, a 0.5% ruthenium tetroxide aqueous solution is used. The crystalline polyester resin is determined within the toner particle or toner base particle from the contrast or shape. As illustrated in FIG. 4, it is judged that linear shapes scattered across the amorphous polyester of the resin, or crystals having a lamellar structure are determined as a crystalline polyester resin. The preparation conditions are controlled to include cross-section of about 50 toner particles or toner base particles per cut piece of the epoxy resin.

The image obtained by the TEM observation is processed by image processing software image J, and a surface abundance ratio of the crystalline polyester resin in the surface of the toner particle or toner base particle is calculated in the following manner.

(1) Surrounding a boundary of one toner base particle with "Segmented Line", and calculating a circumferential length using the programs "Analyze"→"Measure".

(2) In the similar manner, calculating a length of an area occupied with the crystalline polyester resin present on the surface of the toner base particle (the peripheral area on the toner base particle image).

(3) Calculating a surface abundance ratio of the crystalline polyester resin in the surface of the toner base particle according to the following formula.

Surface abundance ratio (%) of crystalline polyester resin=(length of surface area occupied with crystalline polyester resin/circumferential length of toner base particle)*100

(4) Since there are differences between toner base particles, the steps (1) to (3) are performed 5 times. The average value is calculated from the measured values, and the average value is determined as a surface abundance ratio of the crystalline polyester resin in the surface of the toner base particle.

<Resin Particles>

The resin particles preferably include at least one styrene-acrylic resin. The resin particles are obtained through homopolymerization or copolymerization of a vinyl monomer. Moreover, the resin particles preferably include two kinds of the styrene-acrylic resins per particle.

The resin particles including one kind of the styrene-acrylic resin are referred to as resin particles (A), and the resin particles including two kinds of the styrene-acrylic resins per particle are referred to as resin particles (B), hereinafter.

A composition and production method of the resin particles will be described later.

<Aggregates of Resin Particles>

The fundamental cause of filming is detachment of external additives deposited on surfaces of the toner base particles. Therefore, it is difficult to achieve all of the desired characteristics of the toner, which are in the relationship of trade-off, such as low temperature fixability, adhesion force, and heat resistant storage stability.

In the present disclosure, aggregates each formed of several resin particles are present, a ratio of the aggregate occupying a surface of a toner base particle is 1% or greater but 70% or less, and an appropriate amount of the aggregates is arranged on a surface of each toner base particle. Therefore, a liberated amount of external additives can be optimized, and occurrences of filming can be suppressed, and moreover, a high level of cleanability can be achieved owing to both low temperature fixability and low adhesion force.

The resin particles, and aggregates each formed by aggregating the resin particles are deposited on surfaces of the toner base particles.

The ratio of the aggregates occupying the surface of the toner base particle is 1% or greater but 70% or less, more preferably 15% or greater but 60% or less, and even more preferably 15% or greater but 35% or less. The ratio of the aggregates occupying the surface of the toner base particle is referred to as an "occupancy ratio" hereinafter.

When the occupancy ratio is within the above-mentioned range, the optimal amount of the liberated external additives can be maintained, and therefore both low temperature fixability and excellent cleanability owing to low adhesion force can be achieved at a high level, as well as preventing filming.

When the occupancy ratio is 1% or greater, a sufficient spacer effect is secured to prevent the toner particles from being in contact with one another, and therefore desirable cleanability is maintained.

When the occupancy ratio is 70% or less, the aggregates do not inhibit heat transfer from the fixing roller, and therefore sufficient low temperature fixability can be obtained.

Moreover, the standard deviation of the distance between the resin particles next to one another on a surface of the toner base particle is preferably 500 nm or less. When the standard deviation of the distance between the resin particles next to one another on the surface of the toner base particle is 500 nm or less, a protection effect of surfaces of the toner base particles owing to the resin particles can be exhibited on the entire surface area of the toner base particle, and therefore desirable reliability can be secured.

In the present disclosure, the aggregate is a resin particle having a major axis of 3R or greater, where R is a major axis of the minimum particle among the resin particles. The major axis R of the minimum particle of the resin particles, and the major axis R' of the aggregate are measured on an image captured by a scanning electron microscope (SEM). The distance between the resin particles next to one another is a distance between a center of one resin particle and a center of another resin particle. The center of the resin particle is determined by observing the resin particle under a scanning electron microscope (SEM) to capture an image, and determining a center point of the resin particle on the image.

A surface of the toner base particle is not flat, and is slightly rounded (curved). Therefore, the distance between the resin particles is not a distance determined by measuring a distance between the resin particles present on the surface of the toner base particle. The distance between the resin particles is the minimum distance between the resin particles on an image of the resin particles on the surface of the toner base particle, which is captured by means of a scanning electron microscope (SEM).

FIG. 1 is a schematic view illustrating an example of a state of a surface of a toner particle. The resin particles 3 are deposited on the surface of the toner base particle 4. Each resin particle 3 includes the below-described core resin (a2) and shell resin (a1). C1 and C2 each indicate a center of the resin particle 3. M is the volume average primary particle diameter of the resin particles 3. L is a distance between the resin particles 3 next to one another. R' is a major axis of an aggregate of the resin particles.

<Measurements of Aggregate Occupancy Ratio and Distance Between Resin Particles>

The external additives are removed as much as possible by a liberation treatment of the external additives using ultrasonic waves to make the toner as close as the state of the toner base particles, and then an occupancy ratio of the aggregates, and the standard deviation of the distance between the resin particles are determined in the following manner.

—Liberation Method of External Additives—

[1] A 100 mL screw vial is charged with 50 mL of a 5% by mass surfactant aqueous solution (product name: NOIGEN ET-165, available from DKS Co., Ltd.). To the solution, 3 g of the toner is added, and the vial is gently agitated in up-down and left-right motions. Thereafter, the resultant is stirred by a ball mill for 30 minutes to homogeneously disperse the toner in the dispersion solution.

[2] Then, ultrasonic energy is applied to the resultant for 60 minutes by means of an ultrasonic homogenizer (product name: homogenizer, type: VCX750. CV33, available from Sonics & Materials, Inc.) with setting the output to 40 W.

—Ultrasonic Wave Conditions—

Vibration duration: continuous 60 minutes

Amplitude: 40 W

Vibration onset temperature: 23° C.±1.5° C.

Temperature during vibrations: 23° C.±1.5° C.

[3](1) The dispersion liquid is subjected to vacuum filtration with filter paper (product name: Quantitative filter paper (No. 2, 110 mm), available from Advantec Toyo Kaisha, Ltd.). The resultant is washed twice with ion-exchanged water, followed by performing filtration. After removing the free additives that have been detached from the toner particles, the toner particles are dried.

(2) The toner obtained in (1) is observed under scanning electron microscope (SEM). First, a backscattered electron image is observed to detect external additives and/or filler including Si.

(3) The image of (2) is binarized using image processing software (ImageJ), to eliminate the external additives and/or filler.

Next, the toner of the same location as (2) is observed to obtain a secondary electron image. The organic particles (OMS) are not observed in the backscattered electron image, but are observed only in the secondary electron image. With reference to the image obtained in (3), therefore, the particles present in the region other than the residual external additives and fillers (other than the region excluded in (3)) are determined as the organic particles, and a distance between the particles (a distance between the center of one particle and the center of another particle present next to the one particle) is measured using the image processing software.

The minimum particle of the resin particles is determined as a resin particle having the minimum major axis R among the resin particles present on the boundary of the toner base particle by image analysis performed by the image processing software.

The total area the aggregates occupy, and the area of the toner base particle are determined by calculating a circumference of the aggregate and a circumference of the toner base particle by image processing software (ImageJ), and determining an area of a circle having the same circumference to the circumference of the aggregate as an area of the aggregate, and determining an area of a circle having the same circumference to the circumference of the toner base particle as an area of the toner base particle. The aggregate occupancy ratio is calculated according to the following formula (1).

$$\text{Area occupancy ratio (\%)}=(\text{total area aggregates occupy/area of toner base particle})*100 \quad \text{Formula (1)}$$

The measurements above are performed on 100 binarized images (one toner particle per image). The average value of the measured area occupancy ratio values is determined as an aggregate occupancy ratio, and the average value of the measured distance values between the resin particles is determined as an average value of the distance between resin particles.

The standard deviation of the distance between the resin particles is calculated according to the following formula (2), where x is a distance between the resin particles.

$$\sqrt{\frac{1}{n-1}\sum_{k=1}^{n}(x_i-\bar{x})} \quad \text{Formula (2)}$$

[Image Capturing Conditions]

Scanning electron microscope: SU-8230 (available from Hitachi High-Tech Corporation)

Image capturing magnification: 35,000 times

Captured image: secondary electron (SE(L)) image, backscattered electron (BSE) image Acceleration voltage: 2.0 kV Acceleration current: 1.0 μA Probe current: Normal Focus mode: UHR WD: 8.0 mm The volume average primary particle diameter of the resin particles is preferably 10 nm or greater but 100 nm or less, and more preferably 10 nm or greater but 50 nm or less.

When the volume average primary particle diameter of the resin particles is 10 nm or greater, a problem associated with impaired low temperature fixability due to a high coverage rate (occupancy ratio) in the toner surface can be prevented.

When the volume average primary particle diameter of the resin particles is 100 nm or less, a heat resistant storage stability effect can be maintained.

The particle diameters of the resin particles can be measured by a laser Doppler particle size analyzer/particle size distribution analyzer (dynamic light scattering particle size distribution analyzer).

The measuring method is as follows.

Device: nanotrac UPA-150EX (available from Nikkiso Co., Ltd.)

Method:

(1) Measuring conditions of measuring device:

Distribution display: volume

Number of channels: 52

Measuring time: 30 sec

Particle refractive index: 1.81

Temperature: 25° C.

Particle shape: sphere

Viscosity (CP):

High temperature viscosity: 0.797

Low temperature viscosity: 1.002

Solvent refractive index: 1.333

Solvent: water (2) The sample to be measured is added to meet the range (1 particle to 100 particles) by a pipette or syringe with checking the sample loading of the measuring device.

Each of the resin particles preferably includes two kinds of resins, more preferably includes a core resin (a core) and a shell resin (a shell) covering at least part of the surface of the core resin, and even more preferably includes a vinyl-based unit derived from a resin (a1) and a vinyl-based unit derived from a resin (a2).

A resin constituting the shell resin is referred to as a "resin (a1)" and a resin constituting the core resin is referred to as a "resin (a2)" hereinafter. The resin (a1) and the resin (a2) are each preferably a polymer obtained by homopolymerizing or copolymerizing a vinyl monomer.

Examples of the vinyl monomer include the following (1) to (10).

(1) Vinyl Hydrocarbon

Examples of the vinyl hydrocarbon include (1-1) aliphatic vinyl hydrocarbon, (1-2) alicyclic vinyl hydrocarbon, and (1-3) aromatic vinyl hydrocarbon.

(1-1) Aliphatic Vinyl Hydrocarbon

Examples of the aliphatic vinyl hydrocarbon include alkene and alkadiene.

Specific examples of the alkene include ethylene, propylene, and α-olefin.

Specific examples of the alkadiene include butadiene, isoprene, 1,4-pentadiene, 1,6-hexadiene, and 1,7-octadiene.

(1-2) Alicyclic Vinyl Hydrocarbon

Examples of the alicyclic vinyl hydrocarbon include monocycloalkene or dicycloalkene and alkadiene. Specific examples thereof include (di)cyclopentadiene, and terpene.

(1-3) Aromatic Vinyl Hydrocarbon

Examples of the aromatic vinyl hydrocarbon include styrene, and hydrocarbyl (alkyl, cycloalkyl, aralkyl and/or alkenyl)-substituted styrene. Specific examples thereof include α-methylstyrene, 2,4-dimethylstyrene, and vinyl naphthalene.

(2) Carboxyl Group-Containing Vinyl Monomer and Salts Thereof

Examples of the carboxyl group-containing vinyl monomer and salts thereof include C3-C30 unsaturated monocarboxylic acid (salt), unsaturated dicarboxylic acid (salt), anhydrides (salt) thereof, and monoalkyl (C1-C24) ester thereof and salt thereof.

Specific examples thereof include: carboxyl group-containing vinyl monomers, such as (meth)acrylic acid, maleic acid (anhydride), monoalkyl maleate, fumaric acid, monoalkyl fumarate, crotonic acid, itaconic acid, monoalkyl itaconate, itaconic acid glycol monoether, citraconic acid, monoalkyl citraconate, and cinnamic acid; and metal salts thereof.

In the present specification, the term "acid (salt)" means acid or a salt of the acid.

For example, C3-C30 unsaturated monocarboxylic acid (salt) means unsaturated monocarboxylic acid or a salt thereof.

In the present specification, the term "(meth)acryl" means methacrylic acid or acrylic acid. In the present specification, the term "(meth)acryloyl" means methacryloyl or acryloyl. In the present specification, the term "(meth)acrylate" means methacrylate or acrylate.

(3) Sulfonic Acid Group-Containing Vinyl Monomer, Vinyl Sulfuric Acid Monoester Compound, and Salts Thereof Examples of the sulfonic acid group-containing vinyl monomer, vinyl sulfuric acid monoester compound and salts thereof include C2-C14 alkene sulfonic acid (salt), C2-C24 alkyl sulfonic acid (salt), sulfo(hydroxy)alkyl-(meth)acrylate (salt), sulfo(hydroxy)alkyl-(meth)acrylamide (salt), and alkylallylsulfosuccinic acid (salt).

Specific examples of the C2-C14 alkene sulfonic acid include vinyl sulfonic acid (salt). Specific examples of the C2-C24 alkyl sulfonic acid (salt) include α-methylstyrene-sulfonic acid (salt). Specific examples of the sulfo(hydroxy) alkyl-(meth)acrylate (salt) and sulfo(hydroxy)alkyl-(meth) acrylamide (salt) include sulfopropyl(meth)acrylate (salt), sulfuric acid ester (salt), and a sulfonic acid group-containing vinyl monomer (salt).

(4) Phosphoric Acid Group-Containing Vinyl Monomer and Salts Thereof

Examples of the phosphoric acid group-containing vinyl monomer and salts thereof include (meth)acryloyloxyalkyl (the number of carbon atoms: from 1 through 24) phosphoric acid monoester (salt), and (meth)acryloyloxyalkyl (the number of carbon atoms: from 1 through 24) phosphonic acid (salt).

Specific examples of the (meth)acryloyloxyalkyl (the number of carbon atoms: from 1 through 24) phosphoric acid monoester (salt) include 2-hydroxyethyl(meth)acryloyl phosphate (salt), and phenyl-2-acryloyloxyethyl phosphate (salt).

Specific examples of the (meth)acryloyloxyalkyl (the number of carbon atoms: from 1 through 24)phosphonic acid (salt) include 2-acryloyloxyethylphosphonic acid (salt).

Examples of salts of (2) to (4) above include alkali metal salts (e.g., sodium salt, and potassium salt), alkaline earth metal salts (e.g., calcium salt, and magnesium salt), ammonium salts, amine salts, and quaternary ammonium salts.

(5) Hydroxyl Group-Containing Vinyl Monomer

Examples of the hydroxyl group-containing vinyl monomer include hydroxystyrene, N-methylol(meth)acrylamide, hydroxyethyl(meth)acrylate, hydroxypropyl(meth)acrylate, polyethylene glycol mono(meth)acrylate, (meth)allyl alcohol, crotyl alcohol, isocrotyl alcohol, 1-buten-3-ol, 2-buten-1-ol, 2-butane-1,4-diol, propargylalcohol, 2-hydroxyethyl-propenyl ether, and sucrose allyl ether.

(6) Nitrogen-Containing Vinyl Monomer

Examples of the nitrogen-containing vinyl monomer include (6-1) an amino group-containing vinyl monomer, (6-2) an amide group-containing vinyl monomer, (6-3) a nitrile group-containing vinyl monomer, (6-4) a quaternary ammonium cation group-containing vinyl monomer, and (6-5) a nitro group-containing vinyl monomer.

Examples of the (6-1) amino group-containing vinyl monomer include aminoethyl (meth)acrylate.

Examples of the (6-2) amide group-containing vinyl monomer include (meth)acrylamide, and N-methyl(meth) acrylamide.

Examples of the (6-3) nitrile group-containing vinyl monomer include (meth)acrylonitrile, cyanostyrene, and cyanoacrylate.

Examples of the (6-4) quaternary ammonium cation group-containing vinyl monomer include quaternized compound (quaternized using a quaternizing agent, such as methyl chloride, dimethyl sulfate, benzyl chloride, and dimethyl carbonate) of a tertiary amine group-containing vinyl monomer (e.g., dimethylaminoethyl(meth)acrylate, diethylaminoethyl(meth)acrylate, dimethylaminoethyl (meth)acrylamide, diethylaminoethyl(meth)acrylamide, and diallylamine).

Examples of the (6-5) nitro group-containing vinyl monomer include nitrostyrene.

(7) Epoxy Group-Containing Vinyl Monomer

Examples of the epoxy group-containing vinyl monomer include glycidyl (meth)acrylate, tetrahydrofurfuryl (meth) acrylate, and p-vinylphenyl phenyloxide.

(8) Halogen Element-Containing Vinyl Monomer

Examples of the halogen element-containing vinyl monomer include vinyl chloride, vinyl bromide, vinylidene chloride, allyl chloride, chlorostyrene, bromostyrene, dichlorostyrene, chloromethylstyrene, tetrafluorostyrene, and chloroprene.

(9) Vinyl Ester, Vinyl (Thio)Ether, Vinyl Ketone

Examples of the vinyl ester include vinyl acetate, vinyl butyrate, vinyl propionate, vinyl butyrate, diallyl phthalate, diallyl adipate, isopropenyl acetate, vinyl methacrylate, methyl 4-vinylbenzoate, cyclohexyl methacrylate, benzylmethacrylate, phenyl(meth)acrylate, vinyl methoxy acetate, vinyl benzoate, ethyl α-ethoxyacrylate, C1-C50 alkyl group-containing alkyl(meth)acrylate [e.g., methyl (meth)acrylate, ethyl (meth)acrylate, propyl (meth)acrylate, butyl (meth) acrylate, 2-ethylhexyl (meth)acrylate, dodecyl (meth)acrylate, hexadecyl (meth)acrylate, heptadecyl (meth)acrylate, octadecyl (meth)acrylate, eicosyl (meth)acrylate, and behenyl (meth)acrylate)], dialkyl fumarate (where 2 alkyl groups are each a C2-C8 straight-chain or branched-chain alicyclic group), dialkyl maleate (where 2 alkyl groups are each a C2-C8 straight-chain or branched-chain alicyclic group), poly(meth)allyloxy alkane [e.g., diallyloxy ethane, triallyloxy ethane, tetraallyloxy ethane, tetraallyloxy propane, tetraallyloxy butane, and tetrametha-allyloxy ethane], a polyalkylene glycol chain-containing vinyl monomer [e.g., polyethylene glycol (molecular weight: 300) mono(meth) acrylate, polypropylene glycol (molecular weight: 500) monoacrylate, (meth)acrylate of a methyl alcohol ethylene oxide (10 mol) adduct, and (meth)acrylate of a lauryl alcohol ethylene oxide (30 mol) adduct], and poly(meth)acrylate [e.g., poly(meth)acrylate of polyvalent alcohol:ethylene glycol di(meth)acrylate, propylene glycol di(meth)acrylate, neopentyl glycol di(meth)acrylate, trimethylolpropane tri (meth)acrylate, and polyethylene glycol di(meth)acrylate].

Examples of the vinyl (thio)ether include vinyl methyl ether.

Examples of the vinyl ketone include methyl vinyl ketone.

(10) Other Vinyl Monomers

Examples of other vinyl monomers include tetrafluoroethylene, fluoroacrylate, isocyanatoethyl (meth)acrylate, and m-isopropenyl-α,α-dimethylbenzyl isocyanate.

The above-listed vinyl monomers (1) to (10) may be used alone or in combination for synthesis of the resin (a1).

Considering low temperature fixability, the resin (a1) is preferably styrene-(meth)acrylic acid ester copolymer, and (meth)acrylic acid ester copolymer, and more preferably styrene-(meth)acrylic acid ester copolymer.

Since the resin (a1) includes carboxylic acid, an acid value is imparted to the resin constituting the resin particles (B), and therefore toner particles on each surface of which the resin particles (B) are deposited are easily formed.

Examples of a vinyl monomer used for the resin (a2) include the vinyl monomers listed for the resin (a1).

The vinyl monomers (1) to (10) listed for the resin (a1) may be used alone or in combination for synthesis of the resin (a2).

Considering low temperature fixability, the resin (a2) is preferably styrene-(meth)acrylic acid ester copolymer, and (meth)acrylic acid ester copolymer, and more preferably styrene-(meth)acrylic acid ester copolymer.

The viscoelastic loss modulus G" of the resin (a1) at 100° C. with the frequency of 1 Hz is preferably from 1.5 MPa through 100 MPa, more preferably from 1.7 MPa through 30 MPa, and even more preferably from 2.0 MPa through 10 MPa.

The viscoelastic loss modulus G" of the resin (a2) at 100° C. with the frequency of 1 Hz is preferably from 0.01 MPa through 1.0 MPa, more preferably from 0.02 MPa through 0.5 MPa, and even more preferably from 0.05 MPa through 0.3 MPa.

When the viscoelastic loss modulus G" is within the above-mentioned range, toner particles, on each surface of which resin particles (B) each including the resin (a1) and the resin (a2) as constitutional components per particle are easily formed.

The viscoelastic loss modulus G" of the resins (a1) and (a2) at 100° C. with frequency of 1 Hz can be adjusted by varying monomers for use and a blending ratio thereof, and adjusting polymerization conditions (e.g., an initiator for use and an amount thereof, a chain-transfer agent for use and an amount thereof, and a reaction temperature). Specifically, for example, G" of each resin can be adjusted to the above-mentioned range by adjusting the composition of the resin as follows. (1) Tg1 is preferably from 0° C. through 150° C., more preferably from 50° C. through 100° C., where Tg1 is a glass transition temperature calculated from the monomers constituting the resin (a1). Tg2 is preferably from −30° C. through 100° C., more preferably from 0° C. through 80° C., and even more preferably from 30° C. through 60° C., where Tg2 is a glass transition temperature calculated from the monomers constituting the resin (a2).

The glass transition temperature (Tg) calculated from the constitutional monomers is a value calculated according to the Fox method.

The Fox method [T. G. Fox, Phys. Rev., 86, 652(1952)] is a method for estimating Tg of a copolymer from Tg of each homopolymer as represented by the following formula.

$$1/Tg=W1/Tg1+W2/Tg2+\ldots+Wn/Tgn$$

[In the formula above, Tg is a glass transition temperature (absolute temperature) of a copolymer, Tg1, Tg2 . . . Tgn are each a glass transition temperature (absolute temperature) of a homopolymer of each monomer component, and W1, W2 . . . Wn are each a weight fraction of each monomer component.]

(2) (AV1) is preferably from 75 mgKOH/g through 400 mgKOH/g, and more preferably from 150 mgKOH/g through 300 mgKOH/g, where (AV1) is an acid value of the resin (at). Moreover, (AV2) is preferably from 0 mgKOH/g through 50 mgKOH/g, more preferably from 0 mgKOH/g through 20 mgKOH/g, and even more preferably 0 mgKOH/g, where (AV2) is an acid value of the resin (a2).

As a constitutional monomer satisfying the conditions of (1) and (2), for example, the resin (a1) is a resin including, as constitutional monomers, styrene preferably in an amount of from 10% by weight through 80% by weight, and more preferably from 30% by weight through 60% by weight, and methacrylic acid and/or acrylic acid preferably in the combined amount of from 10% by weight through 60% by weight, and more preferably from 30% by weight through 50% by weight, relative to a total mass of the resin (a1).

As a constitutional monomer satisfying the conditions of (1) and (2), moreover, the resin (a2) is, for example, a resin including, as constitutional monomers, styrene preferably in an amount of from 10% by mass through 100% by mass, and more preferably from 30% by mass through 90% by mass, and methacrylic acid and/or acrylic acid preferably in the combined amount of from 0% by mass through 7.5% by mass, and more preferably from 0% by mass through 2.5% by mass, relative to a total mass of the resin (a2).

(3) Polymerization conditions (e.g., an initiator for use and an amount thereof, a chain-transfer agent for use and an amount thereof, and a reaction temperature) are adjusted. Specifically, the number average molecular weight (Mn1) of the resin (a1) is preferably from 2,000 through 2,000,000, and more preferably 20,000 through 200,000, and the number average molecular weight (Mn2) of the resin (a2) is preferably from 1,000 through 1,000,000, and more preferably from 10,000 through 100,000.

In the present disclosure, viscoelastic loss modulus G" is measured, for example, by means of the following rheometer.

Device: ARES-24A (available from Rheometric Scientific)

Jig: 25 mm parallel plate

Frequency: 1 Hz

Distortion factor: 10%

Heating rate: 5° C./min

The acid value (AVa1) of the resin (a1) is preferably from 75 mgKOH/g through 400 mgKOH/g, and more preferably from 150 mgKOH/g through 300 mgKOH/g.

When the acid value (AVa1) of the resin (a1) is within the above-mentioned range, toner particles, on each surface of which resin particles (B) including vinyl units including the resin (a1) and the (a2) as constitutional components per particle are deposited, are easily formed.

The resin (a1) having the acid value in the above-mentioned range is a resin including methacrylic acid and/or acrylic acid preferably in the combined amount of from 10% by mass through 60% by mass, and more preferably from 30% by mass through 50% by mass, relative to a total weight of the resin (a1).

The acid value (AVa2) of the resin (a2) is preferably from 0 mgKOH/g through 50 mgKOH/g, more preferably from 0 mgKOH/g through 20 mgKOH/g, and even more preferably 0 mgKOH/g, considering low temperature fixability.

The resin (a2) having the acid value (Ava2) in the above-mentioned range is a resin including methacrylic acid and/or acrylic acid preferably in the combined amount of from 0% by mass through 7.5% by mass, and more preferably from 0% by mass through 2.5% by mass, relative to a total weight of the resin (a2).

In the present disclosure, the acid value (Ava2) is measured by a method according to JIS K0070:1992.

The glass transition temperature of the resin (a) is preferably higher than the glass transition temperature of the resin (a2), more preferably higher by 10° C. or greater, and more preferably higher by 20° C. or greater. When the glass transition temperature of the resin (a1) is within the above-mentioned range, excellent balance between easiness of formation of toner particles on each surface of which the resin particles are deposited, and low temperature fixability of the toner particles of the present disclosure can be achieved.

The glass transition temperature (may be abbreviated as Tg hereinafter) of the resin (at) is preferably 0° C. or higher but 150° C. or lower, and more preferably from 50° C. or higher but 100° C. or lower.

When the glass transition temperature of the resin (a) is 0° C. or higher, favorable preservability of the resin particles of the present disclosure can be obtained. When the glass transition temperature of the resin (at) is 150° C. or lower, the resin (at) does not adversely affect low temperature fixability.

Tg of the resin (a2) is preferably −30° C. or higher but 100° C. or lower, more preferably 0° C. or higher but 80° C. or lower, and even more preferably 30° C. or higher but 60° C. or lower.

When the glass transition temperature of the resin (a2) is −30° C. or higher, favorable preservability of the resin particles can be obtained. When the glass transition temperature of the resin (a2) is 100° C. or lower, the resin (a2) does not adversely affect low temperature fixability.

In the present disclosure, Tg is measured by means of DSC20, SSC/580 (available from Seiko Instruments Inc.) by a method (DSC) specified in ASTM D3418-82.

The solubility parameter (may be abbreviated as an SP value hereinafter) of the resin (a1) is preferably from 9 $(cal/cm^3)^{1/2}$ through 13 $(cal/cm^3)^{1/2}$, more preferably from 9.5 $(cal/cm^3)^{1/2}$ through 12.5 $(cal/cm^3)^{1/2}$, and even more preferably from 10.5 $(cal/cm^3)^{1/2}$ through 11.5 $(cal/cm^3)^{1/2}$, considering easiness of formation of toner particles on each surface of which the resin particles each including the resin (a1) and the resin (a2) as the constitutional components per particle are deposited.

The SP value of the resin (a1) can be adjusted by changing monomers used to constitute the resin (a1) and a composition ratio thereof.

The SP value of the resin (a2) is preferably from 8.5 $(cal/cm^3)^{1/2}$ through 12.5 $(cal/cm^3)^{1/2}$, more preferably from 9 $(cal/cm^3)^{1/2}$ through 12 $(cal/cm^3)^{1/2}$, and even more preferably from 10 $(cal/cm^3)^{1/2}$ through 11 $(cal/cm^3)^{1/2}$, considering easiness of formation of toner base particles on each surface of which the resin particles each including the resin (a1) and the resin (a2) as the constitutional components per particle are deposited.

The SP value of the resin (a2) can be adjusted by changing monomers used to constitute the resin (a2) and a composition ratio thereof.

In the present disclosure, the SP value can be calculated by the method of Fedors [Polym. Eng. Sci. 14(2)152, (1974)].

Considering Tg of the resin (a1) and copolymerizability with other monomers, the resin (a1) includes, as a constitutional monomer, styrene preferably in an amount of 10% by mass or greater but 80% by mass or less, and more preferably 30% by mass or greater but 60% by mass or less, relative to total mass of the resin (a1).

Considering Tg of the resin (a2) and copolymerizability with other monomers, the resin (a2) includes, as a constitutional monomer, styrene preferably in an amount of 10% by mass or greater but 100% by mass or less, and more preferably 30% by mass or greater but 90% by mass or less, relative to total weight of the resin (a2).

The number average molecular weight (Mn1) of the resin (a1) is preferably from 2,000 through 2,000,000, and more preferably from 20,000 through 200,000. When the number average molecular weight (Mn1) of the resin (a1) is 2,000 or greater, heat resistant storage stability of a resultant toner improves. When the number average molecular weight (Mn1) of the resin (a1) is 2,000,000 or less, the resin (a1) does not impair low temperature fixability of a resultant toner.

The weight average molecular weight of the resin (a1) is preferably greater than the weight average molecular weight of the resin (a2), more preferably greater than the weight average molecular weight of the resin (a2) by 1.5 times or greater, and even more preferably greater than the weight average molecular weight of the resin (a2) by 2.0 times or greater. When the weight average molecular weight of the resin (a1) is within the above-mentioned range, excellent balance between easiness of formation of toner particles on each surface of which the resin particles are deposited and low temperature fixability is achieved.

The weight average molecular weight (Mw1) of the resin (a1) is preferably from 20,000 through 20,000,000, and more preferably from 200,000 through 2,000,000. When the weight average molecular weight (Mw1) of the resin (a1) is 20,000 or greater, heat resistant storage stability is improved. When the weight average molecular weight (Mw1) of the resin (a1) is 20,000,000 or less, the resin (a1) does not adversely affect low temperature fixability.

The number average molecular weight (Mn2) of the resin (a2) is preferably from 1,000 through 1,000,000, and more preferably from 10,000 through 100,000. When the number average molecular weight (Mn2) of the resin (a2) is 1,000 or greater, heat resistant storage stability of a resultant toner is improved. When the number average molecular weight (Mn2) of the resin (a2) is 1,000,000 or less, the resin (a2) does not adversely affect low temperature fixability.

The weight average molecular weight (Mw2) of the resin (a2) is preferably from 10,000 through 10,000,000, and more preferably from 100,000 through 1,000,000. When the weight average molecular weight (Mw2) of the resin (a2) is 10,000 or greater, heat resistant storage stability of a resultant toner is improved. When the weight average molecular weight (Mw2) of the resin (a2) is 10,000,000 or less, the resin (a2) does not adversely affect low temperature fixability of a resultant toner.

Among the above-listed examples, it is preferred that Mw1 of the resin (a1) be from 200,000 through 2,000,000, Mw2 of the resin (a2) be from 100,000 through 500,000, and the resin (a1) and the resin (a2) satisfy the relationship of [Mw1]>[Mw2].

The number average molecular weights and weight average molecular weights of the resin (a1) and the resin (a2) can be measured by gel permeation chromatography (GPC) under the following conditions.

Device (one example): HLC-8120, available from Tosoh Corporation

Columns (one example): 2 columns, TSK GEL GMH6, available from Tosoh Corporation Measuring temperature: 40° C.

Sample solution: 0.25% by mass tetrahydrofuran solution (from which an insoluble component is separated by filtration with a glass filter)

Solution injection amount: 100 μL

Detection device: refractive index detector

Reference materials: 12 samples of standard polystyrene (TSKstandard POLYSTYRENE) (molecular weights: 500, 1,050, 2,800, 5,970, 9,100, 18,100, 37,900, 96,400, 190,000, 355,000, 1,090,000, and 2,890,000) [available from Tosoh Corporation]

A mass ratio of the resin (a1) to the resin (a2) in the resin particles (B) is preferably from 5/95 through 95/5, more preferably from 25/75 through 75/25, and even more preferably from 40/60 through 60/40. When the mass ratio of the resin (a1) to the resin (a2) is 5/95 or greater, excellent heat resistant storage stability of a toner is obtained. When the mass ratio of the resin (a1) to the resin (a2) is 95/5 or less, toner particles on each surface of which the resin particles (B) are deposited are easily formed.

Although one kind of the resin particles may be used alone for the toner of the present disclosure, the toner of the present disclosure is also obtained by using the resin particles (B) including two styrene-acrylic resins (the resin (a1) and the resin (a2)) and the resin particles (A) including one styrene-acrylic resin in combination.

The resin particles (A) and the resin particles (B) mixed in advance are uniformly deposited on surfaces of toner base particles during emulsification, all of or part of the resin (a1) in the resin particles (A) and the resin particles (B) deposited on the toner base particles is removed during the below-described washing step, and therefore the resin particles can be uniformly deposited with leaving gaps between the resin particles.

As a method for producing the resin particles (B), any of productions methods known in the art may be listed. Examples of the method for producing the resin particles (B) including the following production methods (I) to (V).

(I) A method where constitutional monomers of the resin (a2) are polymerized through seeded polymerization using particles of the resin (a1) in an aqueous dispersion liquid as seeds.

(II) A method where constitutional monomers of the resin (a1) are polymerized through seeded polymerization using particles of the resin (a2) in an aqueous dispersion liquid as seeds.

(III) A method where a mixture of the resin (a1) and the resin (a2) is emulsified with an aqueous medium to obtain an aqueous dispersion liquid of resin particles.

(IV) A method where a mixture of the resin (a1) and constitutional monomers of the resin (a2) is emulsified with an aqueous medium, followed by polymerizing the constitutional monomers of the resin (a2), to obtain an aqueous dispersion liquid of resin particles.

(V) A method where a mixture of the resin (a2) and constitutional monomers of the resin (a1) is emulsified with an aqueous medium, followed by polymerizing the constitutional monomers of the resin (a1), to obtain an aqueous dispersion liquid of resin particles.

Whether or not the resin particles (B) each include, as constitutional components, the resin (a1) and the resin (a2) per particle can be confirmed by observing an element mapping image of a cross-sectional surface of the resin particles (B) under a known surface elemental analysis device (e.g., TOF-SIMSEDX-SEM), or observing cross-sectional surfaces of the resin particles (B) dyed with a dye that can be used for functional groups included in the resin (a1) and the resin (a2) under an electron microscope.

The resin particles obtained by the above-described method may be a mixture of resin particles each including only the resin (a1) as a constitutional resin component, and resin particles each including only the resin (a2) as a constitutional resin component, other than the resin particles (B) each including, as constitutional components, the resin (a1) and the resin (a2) per particle. In the below-mentioned composite step, the resin particles may be used as the mixture of the resin particles, or only the resin particles (B) may be separated and used.

Specific examples of (I) include: a method where constitutional monomers of the resin (a1) are dripped and polymerized to produce an aqueous dispersion liquid of resin particles including the resin (at), followed by seeded polymerizing constitutional monomers of the resin (a2) using the resin particles including the resin (a1) as seeds; and a method where the resin (a1), which is produced in advance by solution polymerization etc., is emulsified and dispersed in water, followed by seeded polymerizing constitutional monomers of the resin (a2) using the resin (a1) as seeds.

Specific examples of (II) include: a method where constitutional monomers of the resin (a2) are dripped and polymerized to produce an aqueous dispersion liquid of resin particles, followed by polymerizing constitutional monomers of the resin (a1) using the resin particles as seeds; and a method where the resin (a2), which is produced in advance by solution polymerization etc., is emulsified and dispersed in water, followed by seeded polymerizing constitutional monomers of the resin (a1) using the resin (a2) as seeds.

Specific examples of (III) include a method where solutions or melts of the resin (a1) and the resin (a2), which are produced in advance by solution polymerization, followed by emulsifying and dispersing the resultant into an aqueous medium.

Specific examples of (IV) include: a method where the resin (a1), which is produced in advance by solution polymerization etc., and constitutional monomers of the resin (a2) are mixed, and the resultant mixture is emulsified and dispersed in an aqueous medium, followed by polymerizing the constitutional monomers of the resin (a2); and a method where the resin (a1) is produced in constitutional monomers of the resin (a2), and the resultant mixture is emulsified and dispersed in an aqueous medium, followed by polymerizing the constitutional monomers of the resin (a2).

Specific examples of (V) include: a method where the resin (a2), which is produced in advance by solution polymerization etc., is mixed with constitutional monomers of the resin (a1), and the resultant mixture is emulsified and dispersed in an aqueous medium, followed by polymerizing the constitutional monomers of the resin (a1); and a method where the resin (a2) is produced in constitutional monomers of the resin (a1), and the resultant mixture is emulsified and dispersed in an aqueous medium, followed by polymerizing the constitutional monomers of the resin (a1).

In the present disclosure, any of the production methods (I) to (V) is suitably used.

The resin particles (B) are preferably used in the state of an aqueous dispersion liquid.

Materials used for the aqueous dispersion liquid (aqueous medium) are not particularly limited as long as the materials can be dissolved in water, and may be appropriately selected depending on the intended purpose. Examples of the materials include a surfactant (D), a buffer, and a protective colloid. The above-listed examples may be used alone or in combination.

The aqueous medium used for the aqueous dispersion liquid is not particularly limited as long as the aqueous medium is a liquid including water. Examples of the aqueous medium include an aqueous solution including water.

Examples of the surfactant (D) include a nonionic surfactant (D1), an anionic surfactant (D2), a cationic surfactant (D3), an amphoteric surfactant (D4), and other emulsification dispersants (D5).

Examples of the nonionic surfactant (D1) include an alkylene oxide (AO) adduct-based nonionic surfactant, and a polyvalent alcohol-based nonionic surfactant.

Examples of the AO adduct-based nonionic surfactant include a C10-C20 aliphatic alcohol EO adduct, a phenol EO adduct, a nonyl phenol ethylene oxide (EO) adduct, a C8-C22 alkyl amine EO adduct, and a poly(oxypropylene) glycol EO adduct.

Examples of the polyvalent alcohol-based nonionic surfactant include polyvalent (tri-through octavalent or higher) alcohol (C2-C30) fatty acid (C8-C24) ester (e.g., glycerin monostearate, glycerin monooleate, sorbitan monolaurate, and sorbitan monooleate), and alkyl (C4-C24) poly (degree of polymerization: 1 through 10) glucoside.

Examples of the anionic surfactant (D2) include C8-C24 hydrocarbon group-containing ether carboxylic acid or salt thereof, C8-C24 hydrocarbon group-containing sulfuric acid ester or ether sulfuric acid ester and salts thereof, C8-C24 hydrocarbon group-containing sulfonic acid salt, sulfosuccinic acid salt including one or two C8-C24 hydrocarbon groups. C8-C24 hydrocarbon group-containing phosphoric acid ester or ether phosphoric acid ester and salts thereof, C8-C24 hydrocarbon group-containing fatty acid salt, and C8-C24 hydrocarbon group-containing acylated amino acid salt.

Examples of the C8-C24 hydrocarbon group-containing ether carboxylic acid or salts thereof include sodium lauryl ether acetate, and sodium (poly)oxyethylene (the number of moles added: from 1 through 100) lauryl ether acetate.

Examples of the C8-C24 hydrocarbon group-containing sulfuric acid ester or ether sulfuric acid ester and salts thereof include sodium lauryl sulfate, sodium (poly)oxyethylene (the number of moles added: from 1 through 100) lauryl sulfate, triethanolamine (poly)oxyethylene (the number of moles added: from 1 through 100) lauryl sulfate, and (poly)oxyethylene (the number of moles added: from 1 through 100) coconut fatty acid monoethanolamide sodium sulfate.

Examples of the C8-C24 hydrocarbon group-containing sulfonic acid salt include sodium dodecylbenzene sulfonate.

Examples of the C8-C24 hydrocarbon group-containing phosphoric acid ester or ether phosphoric acid ester and salts thereof include sodium lauryl phosphate, and sodium (poly) oxyethylene (the number of moles added: from 1 through 100) lauryl ether phosphate.

Examples of the C8-C24 hydrocarbon group-containing fatty acid salt include sodium laurate, and triethanolamine laurate.

Examples of the C8-C24 hydrocarbon group-containing acylated amino acid salt include sodium methyl cocoyl taurate, sodium cocoyl sarcosinate, triethanolamine cocoyl sarcosinate, triethanolamine N-cocoyl-L-glutamate, sodium N-cocoyl-L-glutamate, and laurylmethyl-6-alanine sodium salt.

Examples of the cationic surfactant (D3) include a quaternary ammonium salt-based cationic surfactant, and an amine salt-based cationic surfactant.

Examples of the quaternary ammonium salt-based cationic surfactant include trimethyl stearyl ammonium chloride, behenyl trimethyl ammonium chloride, distearyl dimethyl ammonium chloride, and N—(N'-lanolin fatty acid amide propyl) N-ethyl-N,N-dimethyl ammonium ethyl sulfate (i.e. Quaterinium-33).

Examples of the amine salt-based cationic surfactant include stearic acid diethylaminoethylamide lactic acid salt, dilaurylamine hydrochloride, and oleylamine lactate.

Examples of the amphoteric surfactant (D4) include a betaine-based amphoteric surfactant, and an amino acid-based amphoteric surfactant.

Examples of the betaine-based amphoteric surfactant include coconut oil fatty acid amidepropyldimethylaminoacetic acid betaine, lauryl dimethylaminoaetic acid betaine, 2-alkyl-N-carboxymethyl-N-hydroxyethylimidazolium betaine, and lauryl hydroxysulfobetaine.

Examples of the amino acid-based amphoteric surfactant include sodium β-laurylaminopropionate.

Other Examples of other emulsification dispersants (D5) include a reactive activator. The reactive activator is not particularly limited as long as the reactive activator has radical reactivity. Examples thereof include: ADEKA REASOAP (registered trademark) SE-10N, SR-10, SR-20, SR-30, ER-20, and ER-30 (all available from ADEKA CORPORATION); HITENOL (registered trademark), HS-10, KH-05, KH-10, and KH-1025 (all available from DKS Co., Ltd.); ELEMINOL (registered trademark) JS-20 (available from SANYO CHEMICAL, LTD.); LATEMUL (registered trademark) D-104, PD-420, and PD-430 (available from Kao Corporation); IONET (registered trademark) MO-200 (available from SANYO CHEMICAL, LTD.); polyvinyl alcohol; starch and derivatives thereofi cellulose derivatives, such as carboxymethyl cellulose, methyl cellulose, and hydroxyethyl cellulose; carboxyl group-containing (co)polymer, such as polyacrylic acid soda; and urethane group or ester group-containing emulsification dispersants (e.g., a compound obtained by linking polycaptolactone polyol and polyether diol with polyisocyanate) disclosed in U.S. Pat. No. 5,906,704.

In order to stabilize oil droplets to obtain desired shapes, and to make a particle size distribution sharp during emulsification and dispersion, the surfactant (D) is preferably (D1), (D2), (D5), or a combination thereof, and a combination of (D) and (D5) or a combination of (D2) and (D5) is more preferable.

Examples of the buffer include sodium acetate, sodium citrate, and sodium bicarbonate.

Examples of the protective colloid include a water-soluble cellulose compound, and an alkali metal salt of polymethacrylic acid.

The resin particles (B) may each include, in addition to the resin (a1) and the resin (a2), other resin components, an initiator (and a residue thereof), a chain-transfer agent, an antioxidant, a plasticizer, a preservative, a reducing agent, and an organic solvent.

Examples of the above-mentioned other resin components include a vinyl resin excluding the resin used for the resin (a1) and the resin (a2), a polyurethane resin, an epoxy resin, a polyester resin, a polyamide resin, a polyimide resin, a silicon-based resin, a phenol resin, a melamine resin, a urea resin, an aniline resin, an ionomer resin, and a polycarbonate resin.

Examples of the initiator (a residue thereof) include radical polymerization initiators known in the art. Specific examples thereof include: a persulfuric acid salt initiator, such as potassium persulfate, and ammonium persulfate; an azo initiator, such as azobisisobutyronitrile; organic peroxide, such as benzoyl peroxide, cumene hydroperoxide, tert-butyl hydroperoxide, tert-butyl peroxyisopropyl monocarbonate, and tert-butyl peroxybenzoate; and hydrogen peroxide.

Examples of the chain-transfer agent include n-dodecylmercaptan, tert-dodecylmercaptan, n-butylmercaptan, 2-ethylhexyl thioglycolate, 2-mercaptoethanol, β-mercaptopropionic acid, and α-methylstyrene dimer.

Examples of the antioxidant include a phenol compound, para-phenylenediamine, hydroquinone, an organic sulfur compound, and an organophosphorus compound.

Examples of the phenol compound include 2,6-di-t-butyl-p-cresol, butylated hydroxyanisole, 2,6-di-t-butyl-4-ethylphenol, stearyl-8-(3,5-di-t-butyl-4-hydroxyphenyl)propionate, 2,2'-methylene-bis-(4-methyl-6-t-butylphenol), 2,2'-methylene-bis-(4-ethyl-6-t-butylphenol), 4,4'-thiobis-(3-methyl-6-t-butylphenol), 4,4'-butylidenebis-(3-methyl-6-t-butylphenol), 1,1,3-tris-(2-methyl-4-hydroxy-5-t-butylphenyl)butane, 1,3,5-trimethyl-2,4,6-tris-(3,5-di-t-butyl-4-hydroxybenzyl)benzene, tetrakis-[methylene-3-(3',5'-di-t-butyl-4'-hydroxyphenyl)propionate]methane, bis[3,3'-bis(4'-hydroxy-3'-t-butylphenyl)butyric acid]glycol ester, and tocopherol.

Examples of the para-phenylenediamine include N-phenyl-N'-isopropyl-p-phenylenediamine, N,N'-di-sec-butyl-p-phenylenediamine, N-phenyl-N-sec-butyl-p-phenylenediamine, N,N'-di-isopropyl-p-phenylenediamine, and N,N'-dimethyl-N,N'-di-t-butyl-p-phenylenediamine.

Examples of the hydroquinone include 2,5-di-t-octylhydroquinone, 2,6-didodecylhydroquinone, 2-dodecylhydroquinone, 2-dodecyl-5-chlorohydroquinone, 2-t-octyl-5-methylhydroquinone, and 2-(2-octadecenyl)-5-methylhydroquinone.

Examples of the organic sulfur compound include dilauryl-3,3'-thiodipropionate, distearyl-3,3'-thiodipropionate, and ditetradecyl-3,3'-thiodipropionate.

Examples of the organophosphorus compound include triphenylphosphine, tri(nonylphenyl)phosphine, tri(dinonylphenyl)phosphine, tricresyl phosphate, and tri(2,4-dibutylphenoxy)phosphine.

Examples of the plasticizer include phthalic acid ester, aliphatic diprotic acid ester, trimellitic acid ester, phosphoric acid ester, and fatty acid ester.

Examples of the phthalic acid ester include dibutyl phthalate, dioctyl phthalate, butylbenzyl phthalate, and isodecyl phthalate.

Examples of the aliphatic diprotic acid ester include di-2-ethylhexyl adipate, and 2-ethylhexyl sebacate.

Examples of the trimellitic acid ester include tri-2-ethylhexyl trimellitate, and trioctyl trimellitate.

Examples of the phosphoric acid ester include triethyl phosphate, tri-2-ethylhexyl phosphate, and tricresyl phosphate.

Examples of the fatty acid ester include butyl oleate.

Examples of the preservative include an organic nitrogen sulfur compound preservative, and an organic sulfur halogenated compound preservative.

Examples of the reducing agent include: a reducing organic compound, such as ascorbic acid, tartaric acid, citric acid, glucose, and formaldehyde sulfoxylate metal salt; and a reducing inorganic compound, such as sodium thio sulfate, sodium sulfite, sodium bisulfite, and sodium metabisulfite.

Examples of the organic solvent include: a ketone solvent, such as acetone, and methyl ethyl ketone (may be abbreviated as MEK hereinafter); an ester solvent, such as ethyl acetate, and γ-butyrolactone; an ether solvent, such as tetrahydrofuran (THF); an amide solvent, such as N,N-dimethylformamide, N,N-dimethylacetamide, N-methyl-2-pyrrolidone, and N-methylcaprolactam; an alcohol solvent, such as isopropyl alcohol; and an aromatic hydrocarbon solvent, such as toluene, and xylene.

An amount of the resin particles is preferably from 0.2% by mass through 5% by mass relative to the toner.

When the sum of the amount of the resin (a1) and the amount of the resin (a2) is within the above-mentioned range, low temperature fixability and heat resistant storage stability are improved.

When the sum of the amount of the resin (a1) and the amount of the resin (a2) is 0.2% by mass or greater relative to the toner, desirable heat resistant storage stability can be secured. When the sum of the amount of the resin (a1) and the amount of the resin (a2) is 5% by mass or greater, desirable low temperature fixability can be secured.

<Toner Base Particles>

The toner base particles each include a binder resin, a colorant, a release agent, and the resin particles, where the resin particles are deposited on each surface of the toner base particles. The toner base particles may further include other components according to the necessity.

<<Binder Resin>>

The binder resin is not particularly limited, and may be appropriately selected depending on the intended purpose. Examples of the binder resin include a polyester resin, a styrene-acrylic resin, a polyol resin, a vinyl-based resin, a polyurethane resin, an epoxy resin, a polyamide resin, a polyimide resin, a silicon-based resin, a phenol resin, a melamine resin, a urea resin, an aniline resin, an ionomer resin, and a polycarbonate resin. The above-listed examples may be used alone or in combination. Among the above-listed examples, a polyester resin is preferable because flexibility can be imparted to a toner, and an effect of low temperature fixability owing to sharp melting of crystalline polyester is sufficiently exhibited.

<<<Polyester Resin>>>

The polyester resin is not particularly limited, and may be appropriately selected depending on the intended purpose. Examples of the polyester resin include a crystalline polyester resin, an amorphous polyester resin, and a modified polyester resin. The above-listed examples may be used alone or in combination.

—Amorphous Polyester Resin—

The amorphous polyester resin is not particularly limited, and may be appropriately selected depending on the intended purpose. Examples of the amorphous polyester resin include an amorphous polyester resin obtained through a reaction between polyol and polycarboxylic acid.

In the present disclosure, the amorphous polyester resin is a polyester resin obtained through a reaction between polyol and polycarboxylic acid as described above. A modified polyester resin, such as the below-described prepolymer, and a modified polyester resin obtained through a crosslinking reaction and/or an elongation reaction of the prepolymer is not classified as the amorphous polyester resin, but classified as a modified polyester resin in the present disclosure.

The amorphous polyester resin is a polyester resin component soluble to tetrahydrofuran (THF).

The amorphous polyester resin (may be referred to as an "amorphous polyester resin A1") is preferably a linear polyester resin.

Examples of the polyol include diol.

Examples of the diol include: bisphenol A (C2-C3) alkylene oxide adduct (the number of moles added: from 1 through 10), such as polyoxypropylene(2.2)-2,2-bis(4-hydroxyphenyl)propane, and polyoxyethylene(2.2)-2,2-bis(4-hydroxyphenyl)propane; ethylene glycol; propylene glycol; hydrogenated bisphenol A; and hydrogenated bisphenol A (C2-C3) alkylene oxide adduct (the number of moles added: from 1 through 10) The above-listed examples may be used alone or in combination. Among the above-listed example, polyol preferably include mol % or greater of alkylene glycol.

Examples of the polycarboxylic acid include dicarboxylic acid.

Examples of the dicarboxylic acid include adipic acid, phthalic acid, isophthalic acid, terephthalic acid, fumaric acid, maleic acid, and C1-C20 alkyl group or C2-C20 alkenyl group-substituted succinic acid (e.g., dodecenyl succinic acid, and octyl succinic acid). The above-listed examples may be used alone or in combination. Among the above-listed examples, the polycarboxylic acid is preferably polycarboxylic acid including 50 mol % or greater of terephthalic acid.

For the purpose of adjusting an acid value and a hydroxyl value, the polyester resin component A1 may include trivalent or higher carboxylic acid and/or trivalent or higher alcohol, or a trivalent or higher epoxy compound at terminals of the molecular chain of the polyester resin component A1.

Among the above-listed examples, trivalent or higher aliphatic alcohol is preferably included because sufficient glossiness and image density can be obtained without unevenness.

Examples of the trivalent or higher carboxylic acid include trimellitic acid, pyromellitic acid, and acid anhydrides thereof.

Examples of the trivalent or higher alcohol include glycerin, pentaerythritol, and trimethylolpropane.

A molecular weight of the amorphous polyester resin A1 is not particularly limited, and may be appropriately selected depending on the intended purpose. The molecular weight of the amorphous polyester resin A1 is preferably within the following range.

A weight average molecular weight (Mw) of the amorphous polyester resin A1 is preferably from 3,000 through 10,000, and more preferably from 4,000 through 7,000.

A number average molecular weight (Mn) of the amorphous polyester resin A1 is preferably from 1,000 through 4,000, and more preferably from 1,500 through 3,000.

A molecular weight ratio (Mw/Mn) of the amorphous polyester resin A1 is preferably from 1.0 through 4.0, and more preferably from 1.0 through 3.5.

For example, the weight average molecular weight and the number average molecular weight can be measured by gel permeation chromatography (GPC).

The reasons why the above-described ranges of the weight average molecular weight and the number average molecular weight are as follows. When the weight average molecular weight and the number average molecular weight are too small, heat resistant storage stability of a resultant toner and durability of the toner against stress, such as stirring inside a developing device, may be impaired. When the weight average molecular weight and the number average molecular weight are too large, viscoelasticity of a resultant toner as melted may become high and therefore low temperature fixability may be impaired. When the amount of the component having a molecular weight of 600 or less is too large, heat resistant storage stability of a resultant toner and durability of the toner against stress, such as stirring inside a developing device, may be impaired. When the amount of the component having a molecular weight of 600 or less is too small, low temperature fixability of a resultant toner may be impaired.

An amount of the THF-soluble component having a molecular weight of 600 or less is preferably from 2% by mass through 10% by mass.

Examples of a method for adjusting the amount of the THF-soluble component having a molecular weight of 600 or less include a method where the polyester resin component A is extracted with methanol, and the component having a molecular weight of 600 or less is removed from the extracted polyester resin component A to purify.

An acid value of the amorphous polyester resin A1 is not particularly limited, and may be appropriately selected depending on the intended purpose. The acid value of the amorphous polyester resin A1 is preferably from 1 mgKOH/g through 50 mgKOH/g, and more preferably from 5 mgKOH/g through 30 mgKOH/g.

When the acid value of the amorphous polyester resin A1 is 1 mgKOH/g or greater, a toner tends to be negatively charged, and affinity between paper and the toner increases during fixing on the paper to thereby improve low temperature fixability. When the acid value of the amorphous polyester resin A1 is 50 mgKOH/g or less, a problem associated with charging stability, particularly reduction in charging stability due to fluctuations of environmental conditions, can be prevented.

A hydroxyl value of the amorphous polyester resin A1 is not particularly limited, and may be appropriately selected depending on the intended purpose. The hydroxyl value of the amorphous polyester resin A1 is preferably 5 mgKOH/g or greater.

A glass transition temperature (Tg) of the amorphous polyester resin A1 is preferably from 40° C. through 65° C., more preferably from 45° C. through 65° C., and even more preferably from 50° C. through 60° C. When Tg of the amorphous polyester resin A1 is 40° C. or higher, heat resistant storage stability of a resultant toner, and durability of the toner against stress (e.g., stirring inside a developing unit) are improved, and anti-filming properties are improved. When Tg of the amorphous polyester resin A1 is 65° C. or lower, a resultant toner desirably deforms upon application of heat and pressure during fixing, and therefore low temperature fixability is improved.

An amount of the amorphous polyester resin A1 is preferably from 80 parts by mass through 90 parts by mass, relative to 100 parts by mass of the toner.

—Modified Polyester Resin—

The modified polyester resin is not particularly limited, and may be appropriately selected depending on the intended purpose. Examples of the modified polyester resin include a reaction product between an active hydrogen group-containing compound and a polyester resin having a site reactive with the active hydrogen group-containing compound (may be referred to as a "prepolymer," a "polyester prepolymer," or an "amorphous polyester resin A2" hereinafter, in the present specification).

The modified polyester resin is a polyester resin insoluble to tetrahydrofuran (THF). The tetrahydrofuran (THF)-insoluble polyester resin component reduces Tg or melt viscosity of a resultant toner, and has a branched structure in a molecular skeleton thereof and a molecular chain thereof forms a three-dimensional network structure. Therefore, the TH F-insoluble polyester resin component imparts rubber-like characteristics that a toner deforms at a low temperature but does not flow, while maintaining low temperature fixability. Since the modified polyester resin includes sites reactive with the active hydrogen group-containing compound, the sites act as pseudo-crosslink points, to enhance rubber-like characteristics of the amorphous polyester resin. As a result, a toner having excellent heat resistant storage stability, and hot offset resistance can be produced.

——Active Hydrogen Group-Containing Compound——

The active hydrogen-containing compound is a compound reactive with the polyester resin having a site reactive with the active hydrogen group-containing compound.

The active hydrogen group is not particularly limited, and may be appropriately selected depending on the intended purpose. Examples of the active hydrogen group include a hydroxyl group (e.g., an alcoholic hydroxyl group, and a phenolic hydroxyl group), an amino group, a carboxyl group, and a mercapto group. The above-listed examples may be used alone or in combination.

The active hydrogen group-containing compound is not particularly limited, and may be appropriately selected depending on the intended purpose. When the polyester resin having a site reactive with the active hydrogen group-containing compound is a polyester resin including an isocyanate group, the active hydrogen group-containing compound is preferably amines because a high molecular weight of the polyester resin can be formed through an elongation reaction or cross-linking reaction with the polyester resin.

The amines are not particularly limited, and may be appropriately selected depending on the intended purpose. Examples thereof include diamine, trivalent or higher amine, amino alcohol, aminomercaptan, amino acid, and any of the above-listed amines in which an amino group is blocked. The above-listed examples may be used alone or in combination.

Among the above-listed examples, diamine, and a mixture of diamine and a small amount of trivalent or higher amine are preferable.

The diamine is not particularly limited, and may be appropriately selected depending on the intended purpose. Examples of the diamine include aromatic diamine, alicyclic diamine, and aliphatic diamine.

The aromatic diamine is not particularly limited, and may be appropriately selected depending on the intended purpose. Examples thereof include phenylene diamine, diethyltoluene diamine, and 4,4'-diaminodiphenylmethane.

The alicyclic diamine is not particularly limited, and may be appropriately selected depending on the intended purpose. Examples thereof include 4,4'-diamino-3,3'-dimethyldicyclohexylmethane, diaminocyclohexane, and isophorone diamine.

The aliphatic diamine is not particularly limited, and may be appropriately selected depending on the intended purpose. Examples thereof include ethylene diamine, tetramethylene diamine, and hexamethylene diamine.

The trivalent or higher amine is not particularly limited, and may be appropriately selected depending on the intended purpose. Examples thereof include diethylene triamine, and triethylene tetramine.

The amino alcohol is not particularly limited, and may be appropriately selected depending on the intended purpose. Examples thereof include ethanolamine, and hydroxyethylaniline.

The aminomercaptan is not particularly limited, and may be appropriately selected depending on the intended purpose. Examples thereof include aminoethyl mercaptan, and aminopropyl mercaptan.

The amino acid is not particularly limited, and may be appropriately selected depending on the intended purpose. Examples thereof include amino propionic acid, and amino caproic acid.

The amine in which an amino group is blocked is not particularly limited, and may be appropriately selected depending on the intended purpose. Examples thereof include ketimine compounds and oxazoline compounds obtained by blocking an amino group with any of ketones, such as acetone, methyl ethyl ketone, and methyl isobutyl ketone.

——Polyester Resin Having Site Reactive with Active Hydrogen Group-Containing Compound——

The polyester resin having a site reactive with the active hydrogen group-containing compound is not particularly limited, and may be appropriately selected depending on the intended purpose. Examples thereof include a polyester resin including an isocyanate group (may be referred to as an "isocyanate group-containing polyester resin" or an "isocyanate group-containing polyester prepolymer").

The isocyanate group-containing polyester resin is not particularly limited, and may be appropriately selected depending on the intended purpose. Examples of the isocyanate group-containing polyester resin include a reaction product between an active hydrogen group-containing polyester resin and polyisocyanate, where the active hydrogen group-containing polyester is obtained through polycondensation between polyol and polycarboxylic acid.

The polyol is not particularly limited, and may be appropriately selected depending on the intended purpose. Examples of the polyol include diol, trivalent or higher alcohol, and a mixture of diol and trivalent or higher alcohol. The above-listed examples may be used alone or in combination.

Among the above-listed examples, diol, and a mixture of diol and a small amount of trivalent or higher alcohol are preferable.

The diol is not particularly limited, and may be appropriately selected depending on the intended purpose. Examples of the diol include chain alkylene glycol, oxyalkylene group-containing diol, alicyclic diol, bisphenols, alicyclic diol alkylene oxide adducts, and bisphenol alkylene oxide adducts.

Examples of the chain alkylene glycol include ethylene glycol, 1,2-propyleneglycol, 1,3-propyleneglycol, 1,4-butanediol, and 1,6-hexanediol.

Examples of the oxyalkylene group-containing diol include diethylene glycol, triethylene glycol, dipropylene glycol, triethylene glycol, polypropylene glycol, and polytetramethylene glycol.

Examples of the alicyclic diol include 1,4-cyclohexanedimethanol, and hydrogenated bisphenol A.

Examples of the bisphenols include bisphenol A, bisphenol F, and bisphenol S.

Examples of the alkylene oxide include ethylene oxide, propylene oxide, and butylene oxide.

The number of carbon atoms of the chain alkylene glycol is not particularly limited, and may be appropriately selected depending on the intended purpose. The number of carbon atoms thereof is preferably from 2 through 12.

Among the above-listed examples, at least one of C2-12 chain alkylene glycol, and an alkylene oxide adduct of bisphenol is preferable, and an alkylene oxide adduct of bisphenol, or a mixture including an alkylene oxide adduct of bisphenol and C2-12 chain alkylene glycol is more preferable.

The trivalent or higher alcohol is not particularly limited and may be appropriately selected depending on the intended purpose. Examples thereof include trivalent or higher aliphatic alcohol, trivalent or higher polyphenols, and an alkylene oxide adduct of trivalent or higher polyphenols.

The trivalent or higher aliphatic alcohol is not particularly limited and may be appropriately selected depending on the intended purpose. Examples thereof include glycerin, trimethylolethane, trimethylolpropane, pentaerythritol, and sorbitol.

The trivalent or higher polyphenols are not particularly limited and may be appropriately selected depending on the intended purpose. Examples thereof include trisphenol PA, phenol novolac, and cresol novolac.

Examples of the alkylene oxide adduct of trivalent or higher polyphenols include alkylene oxide (e.g., ethylene oxide, propylene oxide, and butylene oxide) adducts of trivalent or higher polyols.

When a mixture of the diol and the trivalent or higher alcohol is used, a mass ratio (trivalent or higher alcohol/diol) of the trivalent or higher alcohol to the diol is not particularly limited and may be appropriately selected depending on the intended purpose, but the mass ratio is preferably from 0.01% by mass through 10% by mass, and more preferably from 0.01% by mass through 1% by mass.

The polycarboxylic acid is not particularly limited and may be appropriately selected depending on the intended purpose. Examples of the polycarboxylic acid include dicarboxylic acid, trivalent or higher carboxylic acid, and a mixture including dicarboxylic acid and trivalent or higher carboxylic acid. The above-listed examples may be used alone or in combination. Among the above-listed examples, dicarboxylic acid, and a mixture including dicarboxylic acid and a small amount of trivalent or higher polycarboxylic acid are preferable.

The dicarboxylic acid is not particularly limited and may be appropriately selected depending on the intended purpose. Examples thereof include divalent alkanoic acid, divalent alkenoic acid, and aromatic dicarboxylic acid.

The divalent alkanoic acid is not particularly limited and may be appropriately selected depending on the intended purpose. Examples thereof include succinic acid, adipic acid, and sebacic acid.

The divalent alkenoic acid is not particularly limited and may be appropriately selected depending on the intended purpose. The divalent alkenoic acid is preferably divalent alkenoic acid having 4 through 20 carbon atoms. The divalent alkenoic acid having 4 through 20 carbon atoms is not particularly limited and may be appropriately selected depending on the intended purpose. Examples thereof include maleic acid, and fumaric acid.

The aromatic dicarboxylic acid is not particularly limited and may be appropriately selected depending on the intended purpose. The aromatic dicarboxylic acid is preferably aromatic dicarboxylic acid having 8 through 20 carbon atoms. The aromatic dicarboxylic acid having 8 through 20 carbon atoms is not particularly limited and may be appropriately selected depending on the intended purpose. Examples thereof include phthalic acid, isophthalic acid, terephthalic acid, and naphthalene dicarboxylic acid.

The trivalent or higher carboxylic acid is not particularly limited and may be appropriately selected depending on the intended purpose. Examples thereof include trivalent or higher aromatic carboxylic acid.

The trivalent or higher aromatic carboxylic acid is not particularly limited and may be appropriately selected depending on the intended purpose. The trivalent or higher aromatic carboxylic acid is preferably trivalent or higher aromatic carboxylic acid having 9 through 20 carbon atoms. The trivalent or higher aromatic carboxylic acid having 9 through 20 carbon atoms is not particularly limited and may be appropriately selected depending on the intended purpose. Examples thereof include trimellitic acid, and pyromellitic acid.

As the polycarboxylic acid, acid anhydride or lower alkyl ester of any of dicarboxylic acid, trivalent or higher carboxylic acid, or a mixture including dicarboxylic acid and trivalent or higher carboxylic acid may be used.

The lower alkyl ester is not particularly limited and may be appropriately selected depending on the intended purpose. Examples thereof include methyl ester, ethyl ester, and isopropyl ester.

When a mixture of the dicarboxylic acid and the trivalent or higher carboxylic acid is used, a mass ratio (trivalent or higher carboxylic acid/dicarboxylic acid) of the trivalent or higher carboxylic acid to the dicarboxylic acid is not particularly limited and may be appropriately selected depending on the intended purpose. The mass ratio is preferably from 0.01% by mass through 10% by mass, and more preferably from 0.01% by mass through 1% by mass.

When the polyol and the polycarboxylic acid are reacted through polycondensation, an equivalent ratio (hydroxyl groups of polyol/carboxyl groups of polycarboxylic acid) of hydroxyl groups of the polyol to carboxyl groups of the polycarboxylic acid is not particularly limited and may be appropriately selected depending on the intended purpose. The equivalent ratio is preferably from 1 through 2, more preferably from 1 through 1.5, and particularly preferably from 1.02 through 1.3.

An amount of the constitutional unit derived from the polyol in the isocyanate group-containing polyester prepolymer is not particularly limited and may be appropriately selected depending on the intended purpose. The amount thereof is preferably from 0.5% by mass through 40% by mass, more preferably 1% by mass through 30% by mass, and particularly preferably from 2% by mass through 20% by mass.

The amount of the constitutional unit derived from the polyol in the isocyanate group-containing polyester prepolymer being 0.5% by mass or greater is preferable because hot offset resistance can be maintained, and both heat resistant storage stability and low temperature fixability of a toner can be achieved.

The amount of the constitutional unit derived from the polyol in the isocyanate group-containing polyester prepolymer being 40% by mass or less is preferable because low temperature fixability can be secured.

The polyisocyanate is not particularly limited, and may be appropriately selected depending on the intended purpose. Examples thereof include aliphatic isocyanate, alicyclic diisocyanate, aromatic diisocyanate, aromatic aliphatic diisocyanate, isocyanurate, and products obtained by blocking the above-listed polyisocyanates with a phenol derivative, oxime, or caprolactam.

The aliphatic diisocyanate is not particularly limited and may be appropriately selected depending on the intended purpose. Examples thereof include tetramethylene diisocyanate, hexamethylene diisocyanate, 2,6-diisocyanatocaproic acid methyl ester, octamethylene diisocyanate, decamethylene diisocyanate, dodecamethylene diisocyanate, tetradecamethylene diisocyanate, trimethylhexane diisocyanate, and tetramethylhexane diisocyanate.

The alicyclic diisocyanate is not particularly limited and may be appropriately selected depending on the intended purpose. Examples thereof include isophorone diisocyanate, and cyclohexylmethane diisocyanate.

The aromatic diisocyanate is not particularly limited and may be appropriately selected depending on the intended purpose. Examples thereof include tolylene diisocyanate, diisocyanatodiphenyl methane, 1,5-naphthylenediisocyanate, 4,4'-diisocyanatodiphenyl, 4,4'-diisocyanato-3,3'-dimethyldiphenyl, 4,4'-diisocyanato-3-methyldiphenylmethane, and 4,4'-diisocyanato-diphenyl ether.

The aromatic aliphatic diisocyanate is not particularly limited and may be appropriately selected depending on the intended purpose. Examples thereof include α,α,α',α'-tetramethylxylenediisocyanate.

The isocyanurate is not particularly limited and may be appropriately selected depending on the intended purpose. Examples thereof include tris(isocyanatalkyl)isocyanurate, and tris(isocyanatocycloalkyl)isocyanurate. The above-listed examples may be used alone or in combination.

When the polyester including a hydroxyl group is reacted with the polyisocyanate, an equivalent ratio (NCO/OH) of isocyanate groups of the polyisocyanate to hydroxyl groups of the polyester resin is not particularly limited and may be appropriately selected depending on the intended purpose. The equivalent ratio is preferably from 1 through 5, more preferably from 1.2 through 4, and particularly preferably from 1.5 through 2.5.

When the equivalent ratio (NCO/OH) of hydroxyl groups of the polyester resin to isocyanate groups of the polyisocyanate is 1 or greater, hot offset resistance can be secured.

When the equivalent ratio (NCO/OH) of hydroxyl groups of the polyester resin to isocyanate groups of the polyisocyanate is 5 or less, low temperature fixability can be secured.

An amount of the constitutional unit derived from polyisocyanate in the isocyanate group-containing polyester prepolymer is not particularly limited, and may be appropriately selected depending on the intended purpose. The amount of the constitutional unit derived from polyisocyanate in the isocyanate group-containing polyester prepolymer is preferably from 0.5% by mass through 40% by mass, more preferably from 1% by mass through 30% by mass, and particularly preferably from 2% by mass through 20% by mass.

When the amount of the constitutional unit derived from polyisocyanate in the isocyanate group-containing polyester prepolymer is 0.5% by mass or greater, hot offset resistance can be secured.

When the amount of the constitutional unit derived from polyisocyanate in the isocyanate group-containing polyester prepolymer is 40% by mass or less, low temperature fixability can be secured.

The average number of isocyanate groups included per molecule of the isocyanate group-containing polyester prepolymer is not particularly limited, and may be appropriately selected depending on the intended purpose. The number average of isocyanate groups is preferably 1 or greater, more preferably from 1.5 through 3, and particularly preferably from 1.8 through 2.5.

When the average number of isocyanate groups included per molecule of the isocyanate group-containing polyester prepolymer is 1 or greater, a problem that a molecular weight of a modified polyester resin reduces to lower hot offset resistance can be prevented.

The modified polyester resin can be produced by a one-shot method etc. As one example, a production method of a urea-modified polyester resin will be described.

First, polyol and polycarboxylic acid are heated to a temperature ranging from 150° C. through 280° C. in the presence of a catalyst (e.g., tetrabutoxy titanate, and dibutyl tin oxide) optionally under reduced pressure to remove generated water, to thereby obtain a hydroxyl group-containing polyester resin. Next, the hydroxyl group-containing polyester resin and polyisocyanate are allowed to react at a temperature ranging from 40° C. through 140° C., to thereby obtain an isocyanate group-containing polyester prepolymer. Moreover, the isocyanate group-containing polyester prepolymer and amines are allowed to react at a temperature ranging from 0° C. through 140° C., to thereby obtain an urea-modified polyester resin.

The number average molecular weight (Mn) of the modified polyester resin is not particularly limited, and may be appropriately selected depending on the intended purpose. The number average molecular weight (Mn) of the modified polyester resin as measured by gel permeation chromatography (GPC) is preferably from 1,000 through 10,000, and more preferably from 1,500 through 6,000.

The weight average molecular weight of the modified polyester resin is not particularly limited, and may be appropriately selected depending on the intended purpose. The weight average molecular weight of the modified polyester resin as measured by gel permeation chromatography (GPC) is preferably 20,000 or greater but 1,000,000 or less.

When the weight average molecular weight of the modified polyester resin is 20,000 or greater, a resultant toner does not flow at a low temperature thus heat resistant storage stability can be secured, and appropriate viscosity of the toner can be maintained when the toner is melted and therefore hot offset resistance can be secured.

When the hydroxyl group-containing polyester resin and polyisocyanate are allowed to react, and when the isocyanate group-containing polyester prepolymer and amines are allowed to react, a solvent may be optionally used.

The solvent is not particularly limited, and may be appropriately selected depending on the intended purpose. Examples of the solvent include solvents inert to isocyanate groups, such as aromatic solvents, ketones, esters, amides, and ethers.

Examples of the aromatic solvents include toluene, and xylene.

Examples of the ketones include acetone, methyl ethyl ketone, methyl isobutyl ketone.

Examples of the esters include ethyl acetate.

Examples of the amides include dimethylformamide, and dimethylacetamide.

Examples of the ethers include tetrahydrofuran.

A glass transition temperature of the modified polyester resin is preferably −60° C. or higher but 0° C. or lower, and more preferably −40° C. or higher but −20° C. or lower.

When the glass transition temperature of the modified polyester resin is −60° C. or higher, the toner is prevented from flowing at a low temperature, and therefore heat resistant storage stability can be secured and anti-filming properties can be secured.

When the glass transition temperature of the modified polyester resin is 0° C. or lower, the toner can be sufficiently deformed by heat and pressure applied during fixing, and therefore sufficient low temperature fixability can be exhibited.

An amount of the modified polyester resin is not particularly limited, and may be appropriately selected depending on the intended purpose. The amount of the modified polyester resin is preferably from 1 part by mass through 15 parts by mass, and more preferably from 5 parts by mass through 10 parts by mass, relative to 100 parts by mass of the toner.

The molecular structures of the amorphous polyester resin A1 and the modified polyester resin can be confirmed by solution or solid NMR spectroscopy, X-ray diffraction spectroscopy, GC/MS, LC/MS, or IR spectroscopy.

As a simple method for confirming the molecular structures thereof, there is a method for detecting, as an amorphous polyester resin, a compound not having absorption, which is based on SCH (out plane bending) of olefin, at 965±10 $cm^{-1}$ or 990±10 $cm^{-1}$ in an infrared absorption spectrum thereof.

—Crystalline Polyester Resin—

The crystalline polyester resin (may be referred to as a "crystalline polyester resin C" hereinafter) is not particularly limited, and may be appropriately selected depending on the intended purpose. Examples of the crystalline polyester resin include a crystalline polyester resin obtained through a reaction between polyol and polycarboxylic acid.

The crystalline polyester resin has high crystallinity, and therefore, the crystalline polyester resin has heat fusion characteristics that viscosity thereof drastically changes at a temperature around a fixing onset temperature.

Since the crystalline polyester resin having such properties is used together with the amorphous polyester resin, excellent heat resistant storage stability is obtained up to a melt onset temperature owing to the crystallinity thereof, drastic reduction in viscosity (sharp melt) is caused at a melt onset temperature thereof due to fusion of the crystalline polyester resin to be compatible to the amorphous polyester resin, and the rapid reduction in the viscosity makes a resultant toner to be fixed. Therefore, the toner having both excellent heat resistant storage stability and low temperature fixing ability can be obtained. Moreover, an excellent release width (a difference between the minimum fixing temperature and a hot offset onset temperature) is also obtained.

In the present disclosure, as described above, the crystalline polyester resin means a resin obtained using polyvalent alcohol, and polyvalent carboxylic acid, and for example, a modified polyester resin, such as such as the prepolymer and a resin obtained through a cross-linking and/or elongation reaction of the prepolymer, is not classified as the crystalline polyester resin.

——Polyol——

The polyol is not particularly limited, and may be appropriately selected depending on the intended purpose. Examples of the polyol include diol and trivalent or higher alcohol.

Examples of the diol include saturated aliphatic diol.

Examples of the saturated aliphatic diol include straight-chain saturated aliphatic diol, and branched-chain saturated aliphatic diol. The above-listed examples may be used alone or in combination. Among the above-listed examples, a straight-chain saturated aliphatic diol is preferable, and C2-C12 straight-chain saturated aliphatic diol is more preferable because use thereof can improve crystallinity and lower a melting point.

Examples of the saturated aliphatic diol include ethylene glycol, 1,3-propanediol, 1,4-butanediol, 1,5-pentadiol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,14-eicosanediol.

Among the above-listed examples, ethylene glycol, 1,4-butanediol, 1,6-hexanediol, 1,8-octanediol, 1,10-decanediol, and 1,12-dodecanediol are preferable because a resultant crystalline polyester resin has high crystallinity and excellent sharp melting properties.

Examples of the trivalent or higher alcohol include glycerin, trimethylolethane, trimethylolpropane, and pentaerythritol.

——Polycarboxylic Acid——

The polycarboxylic acid is not particularly limited, and may be appropriately selected depending on the intended purpose. Examples of the polycarboxylic acid include divalent carboxylic acid, and trivalent or higher carboxylic acid.

Examples of the divalent carboxylic acid include: saturated aliphatic dicarboxylic acid, such as oxalic acid, succinic acid, glutaric acid, adipic acid, suberic acid, azelaic acid, sebacic acid, 1,9-nonanedicarboxylic acid, 1,10-decanedicarboxylic acid, 1,12-dodecanedicarboxylic acid, 1,14-tetradecanedicarboxylic acid, and 1,18-octadecanedicarboxylic acid; aromatic dicarboxylic acid, such as dibasic acid (e.g., phthalic acid, isophthalic acid, terephthalic acid, and naphthalene-2,6-dicarboxylic acid); malonic acid, and mesaconic acid; anhydrides thereof, and lower (C1-C3) alkyl esters thereof.

Examples of the trivalent or higher carboxylic acid include 1,2,4-benzenetricarboxylic acid, 1,2,5-benzenetricarboxylic acid, 1,2,4-naphthalenetricarboxylic acid, anhydrides thereof, and lower (C1-C3) alkyl esters thereof.

As well as the saturated aliphatic dicarboxylic acid or aromatic dicarboxylic acid, moreover, dicarboxylic acid having a sulfonic acid group may be included as the polycarboxylic acid. As well as the saturated aliphatic dicarboxylic acid or aromatic dicarboxylic acid, furthermore, dicarboxylic acid having a double bond may be included. The above-listed examples may be used alone or in combination.

The crystalline polyester resin is preferably formed from C4-C12 straight-chain saturated aliphatic dicarboxylic acid and C2-C12 straight-chain saturated aliphatic diol.

Specifically, the crystalline polyester resin preferably includes a constitutional unit derived from C4-C12 saturated aliphatic dicarboxylic acid and a constitutional unit derived from C2-C12 saturated aliphatic diol. Such a crystalline polyester resin is preferable because excellent sharp melting properties can be imparted to a resultant toner to exhibit excellent low-temperature fixability.

In the present disclosure, the presence of crystallinity of the crystalline polyester resin can be confirmed by means of a crystallography X-ray diffractometer (e.g., X'Pert Pro MRD, available from Philips). The measurement method will be described hereinafter.

First, a sample is ground by a pestle and mortor to prepare a sample powder. The obtained sample powder is uniformly deposited in a sample holder. Thereafter, the sample holder is set in the diffractometer, and the measurement is performed to obtain a diffraction spectrum.

When the peak half value width of the peak having the maximum peak intensity among the peaks obtained in the range of $20° < 2\theta < 25°$ is 2.0 or less, it is determined that the sample has crystallinity.

In contrast to the crystalline polyester resin, the polyester resin that does not exhibit the above-described state is referred to as an amorphous polyester resin in the present specification.

The measuring conditions of the X-ray diffraction spectroscopy are described below.

[Measuring Conditions]

Tension kV: 45 kV
Current: 40 mA
MPSS
Upper
Gonio
Scan mode: continuous
Start angle: 3°
End angle: 35°
Angle Step: 0.02°
Lucident beam optics
Divergence slit: Div slit ½
Deflection beam optics
Anti scatter slit: As Fixed ½
Receiving slit: Prog rec slit A melting point of the crystalline polyester resin is not particularly limited, and may be appropriately selected depending on the intended purpose. The melting point of the crystalline polyester resin is preferably 60° C. or higher but 80° C. or lower.

When the melting point of the crystalline polyester resin is 60° C. or higher, the crystalline polyester resin does not easily melt at a low temperature and therefore heat resistant storage stability of a resultant toner can be secured.

When the melting point of the crystalline polyester resin is 80° C. or lower, the crystalline polyester resin is sufficiently melted by heat applied during fixing, and therefore low temperature fixability of a resultant toner can be secured.

A molecular weight of the crystalline polyester resin is not particularly limited, and may be appropriately selected depending on the intended purpose.

A weight average molecular weight (Mw) of the ortho-dichlorobenzene-soluble component of the crystalline polyester resin as measured by GPC is preferably from 3,000 through 30,000, and more preferably from 5,000 through 15,000.

A number average molecular weight (Mn) of the ortho-dichlorobenzene-soluble component of the crystalline polyester resin as measured by GPC is preferably from 1,000 through 10,000, and more preferably from 2,000 through 10,000.

A molecular weight ratio (Mw)/(Mn) of the crystalline polyester resin is preferably from 1.0 through 10, and more preferably from 1.0 through 5.0. The above-mentioned range of the molecular weight ratio is preferable because the crystalline polyester resin having a sharp molecular weight distribution and a low molecular weight has excellent low temperature fixability, and heat resistant storage stability is impaired when the crystalline polyester resin has a large amount of the component having a low molecular weight.

An acid value of the crystalline polyester resin is not particularly limited, and may be appropriately selected depending on the intended purpose. In order to achieve desired low temperature fixability in view of affinity between paper and the resin, the acid value of the crystalline polyester resin is preferably 5 mgKOH/g or greater, and more preferably 10 mgKOH/g or greater. In order to improve hot offset resistance, conversely, the acid value of the crystalline polyester resin is preferably mgKOH/g or less.

A hydroxyl value of the crystalline polyester resin is not particularly limited, and may be appropriately selected depending on the intended purpose. In order to achieve desired low temperature fixability and excellent chargeability, the hydroxyl value of the crystalline polyester resin is preferably from 0 mgKOH/g through 50 mgKOH/g, and more preferably from 5 mgKOH/g through 50 mgKOH/g.

The molecular structure of the crystalline polyester resin can be confirmed by solution or solid NMR spectroscopy, X-ray diffraction spectroscopy, GC/MS, LC/MS, or IR spectroscopy. As a simple method for confirming the molecule structure thereof, there is a method for detecting, as the crystalline polyester resin, a compound having absorption, which is based on SCH (out plane bending) of olefin, at 965±10 $cm^{-1}$ or 990±10 $cm^{-1}$ in an infrared absorption spectrum thereof.

An amount of the crystalline polyester resin is not particularly limited, and may be appropriately selected depending on the intended purpose. The amount of the crystalline polyester resin is preferably from 3 parts by mass through 20 parts by mass, and more preferably from parts by mass through 15 parts by mass, relative to 100 parts by mass of the toner.

When the amount of the crystalline polyester resin is 3 parts by mass or greater, sharp melt of the crystalline polyester resin is sufficiently exhibited to secure desirable low temperature fixability. When the amount of the crystalline polyester resin is 20 parts by mass or less, heat resistant storage stability is secured and therefore occurrences of image fogging can be prevented.

<Amorphous Hybrid Resin (Dispersant for Crystalline Polyester Resin)>

In the present disclosure, an appropriate amount of a dispersant resin may be used for improving dispersibility of the crystalline polyester resin inside the toner particles. Examples of the effective dispersant resin include a composite resin including a polycondensation-based resin, and a styrene-acrylic resin. Specifically, the composite resin is an amorphous hybrid resin, in which two polymer resin components each independently obtained through separate reaction paths are partially chemically bonded, and at least one of the polymer resin components is formed of the same polymer resin component as the polymer resin component of a polyester resin. Use of the above-described amorphous hybrid resin can improve dispersibility of the crystalline polyester resin inside the toner particles. As well as preventing the crystalline polyester resin from being exposed to surfaces of the toner base particles, the crystalline polyester resin can be homogenously dispersed inside the toner base particles, which contributes to both low temperature fixability and heat resistant storage stability.

The amorphous hybrid resin is preferably a resin obtained by adding, as one of raw material monomers, a monomer reactive with both raw materials of the two polymer resins (bi-reactive monomer), as well as a mixture of the raw materials monomers of the two polymer resins each having separate reaction paths.

<<Colorant>>

The colorant is not particularly limited, and may be appropriately selected depending on the intended purpose. Examples of the colorant include carbon black, a nigrosine dye, iron black, naphthol yellow S, Hansa yellow (10G, 5G, G), cadmium yellow, yellow iron oxide, yellow ocher, yellow lead, titanium yellow, polyazo yellow, oil yellow, Hansa yellow (GR, A, RN, R), pigment yellow L, benzidine yellow (G, GR), permanent yellow (NCG), Vulcan fast yellow (5G, R), tartrazine lake, quinoline yellow lake, anthrasan yellow BGL, isoindolinon yellow, red iron oxide, red lead, lead vermilion, cadmium red, cadmium mercury red, antimony vermilion, permanent red 4R, parared, fiser red, parachloroorthonitro aniline red, lithol fast scarlet G, brilliant fast scarlet, brilliant carmine BS, permanent red (F2R, F4R, FRL, FRLL and F4RH), fast scarlet VD, vulcan fast rubin B, brilliant scarlet G, lithol rubin GX, permanent red F5R, brilliant carmine 6B, pigment scarlet 3B, Bordeaux 5B, toluidine Maroon, permanent Bordeaux F2K, Helio Bordeaux BL, Bordeaux 10B, BON maroon light, BON maroon medium, eosin lake, rhodamine lake B, rhodamine lake Y, alizarin lake, thioindigo red B, thioindigo maroon, oil red, quinacridone red, pyrazolone red, polyazo red, chrome vermilion, benzidine orange, perinone orange, oil orange, cobalt blue, cerulean blue, alkali blue lake, peacock blue lake, Victoria blue lake, metal-free phthalocyanine blue, phthalocyanine blue, fast sky blue, indanthrene blue (RS and BC), indigo, ultramarine, iron blue, anthraquinone blue, fast violet B, methyl violet lake, cobalt purple, manganese violet, dioxane violet, anthraquinone violet, chrome green, zinc green, chromium oxide, viridian, emerald green, pigment green B, naphthol green B, green gold, acid green lake, malachite green lake, phthalocyanine green, anthraquinone green, titanium oxide, zinc flower, and lithopone.

An amount of the colorant is not particularly limited, and may be appropriately selected depending on the intended purpose. The amount of the colorant is preferably 1 part by mass or greater but 15 parts by mass or less, and more preferably 3 parts by mass or greater but 10 parts by mass or less, relative to 100 parts by mass of the toner.

The colorant may be also used as a master batch in which the colorant forms a composite with a resin. Examples of a resin used for production of the master batch or kneaded together with the master batch include, in addition to the above-mentioned other polyester resins: polymers of styrene or substituted styrene, such as polystyrene, poly(p-chlorostyrene), and polyvinyl toluene; styrene-based copolymers, such as styrene-p-chlorostyrene copolymer, styrene-propylene copolymer, styrene-vinyl toluene copolymer, styrene-vinyl naphthalene copolymer, styrene-methyl acrylate copolymer, styrene-ethyl acrylate copolymer, styrene-butyl acrylate copolymer, styrene-octyl acrylate copolymer, styrene-methyl methacrylate copolymer, styrene-ethyl methacrylate copolymer, styrene-butyl methacrylate copolymer, styrene-methyl α-chloromethacrylate copolymer, styrene-acrylonitrile copolymer, styrene-methyl vinyl ketone copolymer, styrene-butadiene copolymer, styrene-isoprene copolymer, styrene-acrylonitrile-indene copolymer, styrene-maleic acid copolymer, and styrene-maleic acid ester copolymer; polymethyl methacrylate; polybutyl methacrylate; polyvinyl chloride; polyvinyl acetate; polyethylene; polypropylene; polyester; an epoxy resin; an epoxypolyol resin; polyurethane; polyamide; polyvinyl butyral; polyacrylic resin; rosin; modified rosin; a terpene resin; an aliphatic or alicyclic hydrocarbon resin; an aromatic petroleum resin; chlorinated paraffin; and paraffin wax. The above-listed examples may be used alone or in combination.

The master batch can be obtained by applying high shear force to a resin for a master batch and a colorant to mix and kneading the mixture. In order to enhance interaction between the colorant and the resin, an organic solvent may be used. Moreover, a so-called flashing method is preferably used, since a wet cake of the colorant can be directly used without being dried. The flashing method is a method where an aqueous paste containing a colorant is mixed or kneaded with a resin and an organic solvent, and then the colorant is transferred to the resin to remove the moisture and the organic solvent. A high-shearing disperser (e.g., a three-roll mill) is preferably used for the mixing and kneading.

<<Release Agent>>

The release agent is not particularly limited, and may be appropriately selected from release agents known in the art. Examples of the release agent include natural wax, and synthetic wax. The above-listed examples may be used.

Examples of the natural wax include vegetable wax (e.g., carnauba wax, cotton wax, and Japanese wax), animal wax (e.g., bees wax and lanolin wax), mineral wax (e.g., ozocerite and ceresin), and petroleum wax (e.g., paraffin wax, microcrystalline wax, and petrolatum wax).

Examples of the synthetic wax include synthetic hydrocarbon wax (e.g., Fischer-Tropsch wax, polyethylene wax, and polypropylene wax), fatty acid amide-based compounds (e.g., ester, ketone, ether, 12-hydroxystearic acid amide, stearic acid amide, phthalimide anhydride, and chlorinated hydrocarbon), homopolymers or copolymers of polyacrylate (e.g., poly-n-stearylmethacrylate, and poly-n-laurylmethacrylate) that is a low molecular weight crystalline polymeric resin (e.g., n-stearylacrylate-ethylmethacrylate copolymer), and a crystalline polymer having a long alkyl chain at a side chain thereof.

Among the above-listed examples, hydrocarbon wax, such as paraffin wax, microcrystalline wax, Fischer-Tropsch wax, polyethylene wax, and polypropylene wax, is preferable.

A melting point of the release agent is not particularly limited, and may be appropriately selected depending on the intended purpose. The melting point of the release agent is preferably 60° C. or higher but 80° C. or lower.

When the melting point of the release agent is 60° C. or higher, the release agent does not easily melt at a low temperature, and therefore heat resistant storage stability of a resultant toner can be secured. When the melting point of the release agent is 80° C. or lower, the following problem can be prevented. That is, a problem that the release agent is not sufficiently melted even when the resin is melted, and the temperature is in the fixing temperature range, and therefore fixing offset occurs to form an image defect.

An amount of the release agent is not particularly limited, and may be appropriately selected depending on the intended purpose. The amount of the release agent is preferably from 2 parts by mass through parts by mass, and more preferably from 3 parts by mass through 8 parts by mass, relative to 100 parts by mass of the toner. When the amount of the release agent is 2 parts by mass or greater, desirable hot offset resistance during fixing, and desirable low temperature fixability can be obtained. When the amount of the release agent is 10 parts by mass or less, desirable heat resistant storage stability is secured, and occurrences of image fogging can be prevented.

The toner base particles are not particularly limited as long as the toner base particles are toner base particles typically used. The toner base particles may further include other components appropriately selected depending on the intended purpose.

An amount of the above-mentioned other components is not particularly limited as long as the amount thereof does not adversely affect characteristics of the toner. The amount of the above-mentioned other components may be appropriately selected depending on the intended purpose.

<Other Components>

The above-mentioned other components are not particularly limited as long as the components are components typically used for toners. The above-mentioned other components may be appropriately selected depending on the intended purpose. Examples of the above-mentioned other components include a charge controlling agent, external additives, a flowability improving agent, a cleaning improving agent, a magnetic material.

—Charging Controlling Agent—

The charge controlling agent is not particularly limited, and may be appropriately selected depending on the intended purpose. Examples of the charge controlling agent include a nigrosine-based dye, a triphenylmethane-based dye, a chrome-containing metal complex dye, a molybdic acid chelate pigment, a rhodamine-based dye, an alkoxy-based amine, a quaternary ammonium salt (including fluorine-modified quaternary ammonium), alkylamide, phosphorus or a compound thereof, tungsten or a compound thereof, a fluorosurfactant, a metal salt of salicylic acid, and a metal salt of a salicylic acid derivative.

Examples of commercial products of the charge controlling agent include: nigrosine dye BONTRON 03, quaternary ammonium salt BONTRON P-51, metal-containing azo dye BONTRON S-34, oxynaphthoic acid-based metal complex E-82, salicylic acid-based metal complex E-84 and phenol condensate E-89 (all manufactured by ORIENT CHEMICAL INDUSTRIES CO., LTD); quaternary ammonium salt molybdenum complex TP-302 and TP-415 (all manufactured by Hodogaya Chemical Co., Ltd.); and LRA-901, and boron complex LR-147 (manufactured by Japan Carlit Co., Ltd.).

An amount of the charge controlling agent cannot be set unconditionally as the amount thereof is adjusted depending on the binder resin for use, the presence of optionally used additives, and a toner production method including a dispersion method. However, the amount of the charge controlling agent is preferably from 0.1 parts by mass through 10 parts by mass, and more preferably from 0.2 parts by mass through 5 parts by mass, relative to 100 parts by mass of the binder resin.

When the amount of the charge controlling agent is 10 parts by mass or less relative to 100 parts by mass of the binder resin, appropriate chargeability of a resultant toner is obtained, and therefore an effect of the main charge controlling agent can be exhibited, the electrostatic attraction force with the developing roller is appropriately maintained to secure desirable flowability of a developer, or to maintain desirable image density.

The charge controlling agent may be melt-kneaded with a master batch or resin, followed by dissolving or dispersing therein, or may be directly added to an organic solvent when the master batch or resin is dissolved or dispersed therein. Alternatively, the charge controlling agent may be fixed on surfaces of toner particles after producing the toner particles.

—External Additives—

The external additives are not particularly limited, and may be appropriately selected depending on the intended purpose.

Examples of the external additives include silica particles, hydrophobic silica, fatty acid metal salts (e.g., zinc stearate, and aluminium stearate), metal oxide (e.g., titania, alumina, tin oxide, and antimony oxide), and a fluoropolymer. The above-listed examples may be used alone or in combination. Among the above-listed examples, hydrophobicity-treated inorganic particles are preferable.

Examples of the silica particles include R972, R974, RX200, RY200, R202, R805, and R812 (all available from NIPPON AEROSIL CO., LTD.).

Examples of the titania particles include: P-25 (available from NIPPON AEROSIL CO., LTD.); STT-30, and STT-65C-S (both available from Titan Kogyo, Ltd.); TAF-140 (available from Fuji Titanium Industry Co., Ltd.); and MT-150W, MT-500B, MT-600B, and MT-150A (all available from TAYCA CORPORATION).

Examples of the hydrophobicity-treated titanium oxide particles include: T-805 (available from NIPPON AEROSIL CO., LTD.); STT-30A and STT-65S-S (both available from Titan Kogyo, Ltd.); TAF-500T and TAF-1500T (both available from Fuji Titanium Industry Co., Ltd.); MT-100S and MT-100T (both available from TAYCA CORPORATION); and IT-S (available from ISHIHARA SANGYO KAISHA, LTD.).

The hydrophobicity-treated oxide particles, hydrophobicity-treated silica particles, hydrophobicity-treated titania particles, and hydrophobicity-treated alumina particles can be obtained, for example, by treating hydrophilic particles with a silane coupling agent, such as methyltrimethoxysilane, methyltriethoxysilane, and octyltrimethoxysilane. Moreover, silicone oil-treated oxide particles or silicone oil-treated inorganic particles obtained by processing inorganic particles with silicone oil optionally with heating are also suitably used.

Examples of the silicone oil include dimethylsilicone oil, methylphenylsilicone oil, chlorophenylsilicone oil, methylhydrogen silicone oil, alkyl-modified silicone oil, fluorine-modified silicone oil, polyether-modified silicone oil, alcohol-modified silicone oil, amino-modified silicone oil, epoxy-modified silicone oil, epoxy/polyether-modified silicone oil, phenol-modified silicone oil, carboxyl-modified silicone oil, mercapto-modified silicone oil, methacryl-modified silicone oil, and α-methylstyrene-modified silicone oil.

The average primary particle diameter of the external additives is not particularly limited, and may be appropriately selected depending on the intended purpose. The average primary particle diameter thereof is preferably 100 nm or less, more preferably from 1 nm through 100 nm, even more preferably from 3 nm through 70 nm, and particularly preferably from 5 nm through 70 nm. When the average primary particle diameter thereof is within the above-mentioned range, the following problems can be prevented. Specifically, the problems are a problem that inorganic particles are embedded in toner base particles and therefore the inorganic particles cannot be effectively functioned, and a problem that a surface of a photoconductor is unevenly damaged.

The external additives preferably include at least one group of hydrophobic inorganic particles having the average primary particle diameter of 20 nm or smaller and at least one group of inorganic particles having the average primary particle diameter of 30 nm or greater.

The BET specific surface area of the external additives is from 20 $m^2/g$ through 500 $m^2/g$.

An amount of the external additives is not particularly limited and may be appropriately selected depending on the intended purpose. The amount thereof is preferably from 0.1 parts by mass through 5 parts by mass, and more preferably from 0.3 parts by mass through 3 parts by mass, relative to 100 parts by mass of the toner.

—Flowability Improving Agent—

The flowability improving agent is not particularly limited as long as the flowability improving agent is an agent used to perform a surface treatment to increase hydrophobicity to prevent degradation of flowability and charging properties even in high humidity environment. The flowability improving agent may be appropriately selected depending on the intended purpose. Examples thereof include a silane coupling agent, a silylating agent, a fluoroalkyl group-containing silane coupling agent, an organic titanate-based coupling agent, an aluminium-based coupling agent, silicone oil, and modified silicone oil.

The silica and the titanium oxide are particularly preferably subjected to a surface treatment with any of the above-listed flowability improving agents to be used as hydrophobic silica and hydrophobic titanium oxide.

—Cleaning Improving Agent—

The cleaning improving agent is not particularly limited as long as the cleaning improving agent is an agent added to the toner for removing the residual developer on a photoconductor or a primary transfer medium after transferring. The cleaning improving agent may be appropriately selected depending on the intended purpose. Examples thereof include: fatty acid (e.g., stearic acid) metal salts, such as zinc stearate, and calcium stearate; and polymer particles produced by soap-free emulsion polymerization, such as polymethyl methacrylate particles, and polystyrene particles.

The polymer particles are preferably polymer particles having a relatively narrow particle size distribution, and are suitably polymer particles having the volume average particle diameter of from 0.01 μm through 1 μm.

—Magnetic Material—

The magnetic material is not particularly limited and may be appropriately selected depending on the intended purpose. Examples thereof include iron powder, magnetite, and ferrite. Among the above-listed examples, white magnetic materials are preferable in view of color tone.

The glass transition temperature (Tg1st) of the toner measured from the first heating of differential scanning calorimetry (DSC) is preferably from 40° C. through 65° C.

The glass transition temperature (Tg1st) of the tetrahydrofuran (THF) insoluble component of the toner measured from the first heating of DSC is preferably from −45° C. through 5° C.

The glass transition temperature (Tg2nd) of the THF soluble component of the toner measured from the second heating of DSC is preferably from 20° C. through 65° C.

The glass transition temperature (Tg1st) of the toner measured from the first heating of differential scanning calorimetry (DSC) and the glass transition temperature (Tg2nd) of the toner measured from the second heating of DSC preferably satisfy Tg1st-Tg2nd≥10 [° C.], because low temperature fixability and heat resistant storage stability are improved.

The glass transition temperature of the toner can be measured, for example, by means of a differential scanning calorimeter (DSC-60, available from Shimadzu Corporation).

For example, DSC curves are measured by the differential scanning calorimeter. The DSC curve for the first heating is selected from the obtained DSC curves using an analysis program, and the glass transition temperature Tg1st of the first heating is determined using an endothermic shoulder temperature in the analysis program. The DSC curve for the second heating is selected, and the glass transition temperature Tg2nd of the second heating is determined using the endothermic shoulder temperature.

(Developer)

The developer of the present disclosure includes at least the toner of the present disclosure, and may further include appropriately selected other components, such as a carrier, according to the necessity. The developer may be a one-component developer or two-component developer. In the case where the developer is used for high-speed printers corresponded to improved information processing speed of recent years, the developer is preferably a two-component developer because service life can be improved.

<Carrier>

The carrier is not particularly limited, and may be appropriately selected depending on the intended purpose. The carrier is preferably a carrier including carrier particles each of which includes a core and a resin layer covering the core.

—Core—

A material of the core is not particularly limited, and may be appropriately selected depending on the intended purpose. Examples thereof include a manganese-strontium-based material of from 50 emu/g through 90 emu/g, and a manganese-magnesium-based material of from 50 emu/g through 90 emu/g. In order to ensure sufficient image density, moreover, a hard magnetic material, such as iron powder of 100 emu/g or greater, and magnetite of from 75 emu/g through 120 emu/g, is preferably used. A soft magnetic material, such as a copper-zinc-based material of from 30 emu/g through 80 emu/g, is preferably used because an impact of the developer held in the form of a brush against the photoconductor can be reduced, and a high image quality can be achieved. The above-listed examples may be used alone or in combination.

The volume average particle diameter of the cores is not particularly limited and may be appropriately selected depending on the intended purpose. The volume average particle diameter thereof is preferably from 10 μm through 150 μm, and more preferably from 40 μm through 100 μm.

When the volume average particle diameter of the cores is 10 μm or greater, an amount of the fine powder in the carrier is maintained at an appropriate level, and therefore appropriate magnetization per particle can be maintained so that carrier scattering does not occur. When the volume average particle diameter of the cores is 150 μm or less, an appropriate specific surface area is secured to prevent toner scattering, and desirable reproducibility, especially reproducibility of a solid image, can be secured in a full-color image including a large area of a solid image.

The toner of the present disclosure may be mixed with the carrier to be used for a two-component developer.

An amount of the carrier in the two-component developer is not particularly limited, and may be appropriately selected depending on the intended purpose. The amount of the carrier is preferably from 90 parts by mass through 98 parts by mass, and more preferably from 93 parts by mass through 97 parts by mass, relative to 100 parts by mass of the two-component developer.

The developer of the present disclosure can be suitably used for image formation according to various electrophotographic methods known in the art, such as a magnetic one-component developing method, a non-magnetic one-component developing method, and a two-component developing method.

(Production Method of Toner)

A production method of a toner of the present disclosure is a method for producing the above-described toner.

The production method of a toner includes a composite particle forming step, and a removing step, and may further include other steps according to the necessity.

<Composite Particle Forming Step>

The composite particle forming step is a step including depositing resin particles on a surface of each toner base particle to form a composite particle.

Examples of a method for forming the composite particles include a known dissolution suspension method where an oil phase including components of the toner base particles, such as the binder resin, the colorant, and the release agent, is dispersed in an aqueous medium including resin particles to form composite particles.

As one example of the dissolution suspension method, a method for forming composite particles while generating a polyester resin through an elongation reaction and/or cross-linking reaction between the prepolymer and the curing agent will be described.

In this method, preparation of an aqueous medium, preparation of an oil phase including toner base particle materials, emulsification and/or dispersion of the toner base particles, and removal of the organic solvent are performed.

—Preparation of Aqueous Medium (Aqueous Phase)—

The preparation of the aqueous medium can be performed by dispersing the resin particles in an aqueous medium. An amount of the resin particles added to the aqueous medium is not particularly limited and may be appropriately selected depending on the intended purpose. The amount thereof is preferably from 0.5 parts by mass through 10 parts by mass, relative to 100 parts by mass of the aqueous medium.

The aqueous medium is not particularly limited and may be appropriately selected depending on the intended purpose. Examples thereof include water, a solvent miscible with water, and a mixture thereof. The above-listed examples may be used alone or in combination. Among the above-listed examples, water is preferable.

The solvent miscible with water is not particularly limited and may be appropriately selected depending on the intended purpose. Examples thereof include alcohol, dimethyl formamide, tetrahydrofuran, cellosolves, and lower ketones.

Examples of the alcohol include methanol, isopropanol, and ethylene glycol.

Examples of the lower ketones include acetone, and methyl ethyl ketone.

—Preparation of Oil Phase—

The preparation of the oil phase is performed by dissolving and/or dispersing, in an organic solvent, toner base particle materials including a binder resin, a colorant, a release agent, and optionally a curing agent.

The organic solvent is not particularly limited, and may be appropriately selected depending on the intended purpose. The organic solvent is preferably an organic solvent having a boiling point of lower than 150° C. as such an organic solvent can be easily removed.

Examples of the organic solvent having a boiling point of lower than 150° C. include toluene, xylene, benzene, carbon tetrachloride, methylene chloride, 1,2-dichloroethane, 1,1,2-trichloroethane, trichloroethylene, chloroform, monochlorobenzene, dichloroethylidene, methyl acetate, ethyl acetate, methyl ethyl ketone, and methyl isobutyl ketone. The above-listed examples may be used alone or in combination. Among the above-listed examples, ethyl acetate, toluene, xylene, benzene, methylene chloride, 1,2-dichloroethane, chloroform, and carbon tetrachloride are preferably, and ethyl acetate is more preferable.

—Emulsifying and/or Dispersing—

The emulsifying and/or dispersing the toner materials can be performed by dispersing the oil phase including the toner materials in the aqueous medium. When the toner materials are emulsified and/or dispersed, the curing agent and the prepolymer are allowed to react through an elongation reaction and/or cross-linking reaction.

The reaction conditions for generating the prepolymer (e.g., a reaction time and a reaction temperature) are not particularly limited, and may be appropriately selected depending on a combination of the curing agent and the prepolymer. The reaction time is preferably from 10 minutes through 40 hours, and more preferably from 2 hours through 24 hours. The reaction temperature is preferably from 0° C. through 150° C., and more preferably from 40° C. through 98° C.

A method for stably forming a dispersion liquid including the prepolymer in the aqueous medium is not particularly limited and may be appropriately selected depending on the intended purpose. Examples thereof include a method where the oil phase prepared by dissolving and/or dispersing the toner materials is added to the aqueous medium phase, and the resultant is mixture is dispersed with shearing force.

A disperser used for the dispersing is not particularly limited and may be appropriately selected depending on the intended purpose. Examples thereof include a low-speed shearing disperser, a high-speed shearing disperser, a friction disperser, a high-pressure jet disperser, and an ultrasonic disperser. Among the above-listed examples, a high-speed shearing disperser is preferable as the particle diameter of the dispersed elements (oil droplets) can be adjusted to from 2 μm through 20 μm.

In the case where the high-speed shearing disperser is used, conditions, such as rotational speed, a dispersion time, and a dispersion temperature, are appropriately selected depending on the intended purpose. The rotational speed is preferably from 1,000 rpm through 30,000 rpm, and more preferably from 5,000 rpm through 20,000 rpm. In case of a batch system, the dispersion time is from 0.1 minutes through 5 minutes. The dispersion temperature is preferably from 0° C. through 150° C., and more preferably from 40° C. through 98° C. under pressure. Generally speaking, dispersion is performed easier when the dispersion temperature is a high temperature.

An amount of the aqueous medium used for emulsifying and/or dispersing the toner materials is not particularly limited and may be appropriately selected depending on the intended purpose. The amount thereof is preferably from 50 parts by mass through 2,000 parts by mass, and more preferably from 100 parts by mass through 1,000 parts by mass, relative to 100 parts by mass of the toner materials.

When the amount of the aqueous medium is 50 parts by mass or greater, the appropriate dispersion state of the toner materials is secured, and therefore toner base particles having the predetermined particle size can be obtained. When the amount of the aqueous medium is 2,000 parts by mass or less, production cost can be kept low.

When the oil phase including the toner materials is emulsified or dispersed, a dispersant is preferably used for the purpose of stabilizing dispersed elements, such as oil droplets, to obtain desired shapes and make a particle size distribution sharp.

The dispersant is not particularly limited, and may be appropriately selected depending on the intended purpose. Examples of the dispersant include a surfactant, a poorly water-soluble inorganic compound disperser, and a polymer-based protective colloid. The above-listed examples may be used alone or in combination. Among the above-listed examples, a surfactant is preferable.

The surfactant is not particularly limited and may be appropriately selected depending on the intended purpose. For example, an anionic surfactant, a cationic surfactant, a nonionic surfactant, or an amphoteric surfactant may be used.

Examples of the anionic surfactant include alkyl benzene sulfonic acid salt, α-olefin sulfonic acid salt, and phosphoric acid ester. Among the above-listed examples, a surfactant including a fluoroalkyl group is preferable.

—Removal of Organic Solvent—

A method for removing the organic solvent from the dispersion liquid, such as the emulsified slurry, is not particularly limited and may be appropriately selected depending on the intended purpose. Examples thereof include: a method where the entire reaction system is gradually heated to evaporate the organic solvent inside the oil droplets; and a method where spraying the dispersion liquid in a dry atmosphere to remove the organic solvent in the oil droplets.

Once the organic solvent is removed, composite particles are formed.

<Removing Step>

The removing step is a step including removing at least part of the resin particles from the composite particles, and preferably removing part of or all of the shell resin (resin (a1)) of the resin particles.

Examples of the step including removing at least part of the resin particles include a washing step including washing the composite particles. Therefore, the removing step can be also referred to as a washing step.

Examples of a method for removing part or all of the resin (a1) in the washing step include a method where part of or all of the resin (a1) is removed by a chemical method.

Examples of the chemical method include a step for washing the composite particles with a basic aqueous solution. Part or all of the shell resin (a1) can be dissolved by washing the composite particles with the basic aqueous solution.

By performing the washing step, a toner including toner base particles on each surface of which the resin particles (B) are homogeneously deposited with even gaps can be obtained.

The basic aqueous solution is not particularly limited as long as the aqueous solution is basic, and may be appropriately selected depending on the intended purpose. Examples thereof include an aqueous solution of hydroxide of alkali metal, such as potassium hydroxide, and sodium hydroxide, and ammonia. The above-listed examples may be used alone or in combination.

Among the above-listed examples, potassium hydroxide and sodium hydroxide are preferable as the shell resin (a1) is easily dissolved.

The pH of the basic aqueous solution is preferably from 8 through 14, and more preferably from 10 through 12.

Mixing the composite particles and the alkali aqueous solution in the washing step can be performed by a method where the basic aqueous solution is added to the composite slurry by dripping with stirring. After dripping the basic aqueous solution, an acid aqueous solution may be added by dripping to neutralize.

<Other Steps>

The above-mentioned other steps are not particularly limited, and may be appropriately selected depending on the intended purpose. Examples thereof include a drying step and a classifying step.

The drying step is not particularly limited as long as the drying step can remove the solvent from the composite particles, and may be appropriately selected depending on the intended purpose.

The classifying step may be performed by removing the fine particle component by cyclone in a liquid, a decanter, or centrifugation. Alternatively, an operation of the classification may be performed after drying.

The obtained composite particles may be mixed with particles of the external additives or the charge controlling agent. As mechanical impact is applied, the particles of the external additives etc., are prevented from being detached from surfaces of the toner base particles.

A method for applying the mechanical impact is not particularly limited and may be appropriately selected depending on the intended purpose. Examples thereof include: a method for applying impact force to the mixture using a blade rotated at high speed; and a method where the mixture is added to a high-speed air flow to accelerate the particles to make the particles crush to each other or make the particles crush into an appropriate impact board.

A device used for the above-mentioned method is not particularly limited and may be appropriately selected depending on the intended purpose. Examples thereof include an angmill (available from HOSOKAWA MICRON CORPORATION), a device obtained by modifying an I-type mill (available from Nippon Pneumatic Mfg. Co., Ltd.) to reduce pulverization air pressure, a hybridization system (available from NARA MACHINERY CO., LTD.), Kryptron System (available from Kawasaki Heavy Industries, Ltd.), and an automatic mortar.

(Toner Storage Unit)

A toner storage unit of the present disclosure is a unit that has a function of storing a toner and stores the toner. Examples of embodiments of the toner storage unit include a toner storage container, a developing device, and a process cartridge.

The toner storage container is a container in which a toner is stored.

The developing device is a device including a unit configured to store a toner and develop with the toner.

The process cartridge includes at least an image bearer and a developing unit as an integrated body, stores the toner therein, and is detachably mounted in an image forming apparatus. The process cartridge may further include at least one selected from the group consisting a charging unit, an exposing unit, and a cleaning unit.

Figure 2:
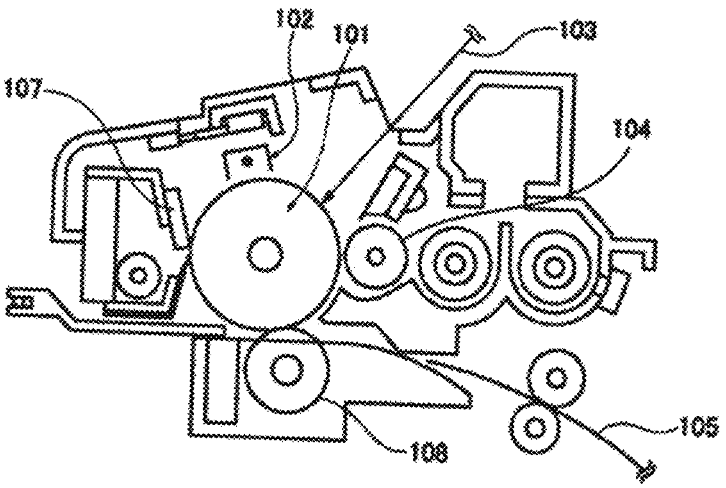
FIG. 2 is a schematic view illustrating an example of the process cartridge of the present disclosure.

Next, an embodiment of the process cartridge is illustrated in FIG. 2. As illustrated in FIG. 2, the process cartridge of the present disclosure includes a latent image bearer 101 therein, and includes a charging device 102, a developing device 104, and a cleaning unit 107. The process cartridge may further include other units according to the necessity. In FIG. 2, the numeral reference 103 is exposure light emitted from an exposing device, and the numeral reference 105 is recording paper.

As the latent image bearer 101, a latent image bearer identical to an electrostatic latent image bearer in the below-described image forming apparatus may be used. Moreover, an arbitrary charging member is used as the charging device 102.

In the image forming process using the process cartridge illustrated in FIG. 2, the latent image bearer 101 is charged by the charging device 102 with rotating in the clockwise direction in FIG. 2, and exposed to light 103 by the exposing unit (not illustrated) to form an electrostatic latent image corresponding to the exposure image on the surface of the latent image bearer.

The electrostatic latent image is developed with the toner by the developing device 104, and the developed toner image is transferred to recording paper 105 by the transfer roller 108, followed by outputting. Subsequently, the surface of the latent image bearer after the image transfer is cleaned by the cleaning unit 107, and the charge is eliminated by the charge-eliminating unit (not illustrated). Then, the above-described operations are again repeated.

(Image Forming Apparatus and Image Forming Method)

The image forming apparatus of the present disclosure include the above-described toner storage unit, and further includes at least an electrostatic latent image bearer, an electrostatic latent image forming unit, and a developing unit. The image forming apparatus may further include other units according to the necessity.

The image forming method associated with the present disclosure includes at least an electrostatic latent image forming step and a developing step, and may further include other steps according to the necessity.

<Electrostatic Latent Image Bearer>

A material, structure, and size of the electrostatic latent image bearer are not particularly limited and may be appropriately selected those known in the art. Examples of the material thereof include: inorganic photoconductors, such as amorphous silicon and selenium; and organic photoconductors, such as polysilane and phthalopolymethine. Among the above-listed examples, amorphous silicon is preferable considering long service life.

The linear speed of the electrostatic latent image bearer is preferably 300 mm/s or greater.

<Electrostatic Latent Image Forming Unit and Electrostatic Latent Image Forming Step>

The electrostatic latent image forming unit is not particularly limited as long as the electrostatic latent image forming unit is a unit configured to form an electrostatic latent image on the electrostatic latent image bearer, and may be appropriately selected depending on the intended purpose. Examples thereof include a unit including a charging member configured to charge a surface of the electrostatic latent image bearer and an exposure member configured to expose the surface of the electrostatic latent image bearer to light imagewise.

The electrostatic latent image forming step is not particularly limited as long as the electrostatic latent image forming step is a step including forming an electrostatic latent image on the electrostatic latent image bearer, and may be appropriately selected depending on the intended purpose. For example, the electrostatic latent image forming step can be performed by charging a surface of the electrostatic latent image bearer, followed by exposing the charged surface of the electrostatic latent image bearer to light imagewise. The electrostatic latent image forming step can be performed by the electrostatic latent image forming unit.

—Charging Member and Charging—

The charging member is not particularly limited, and may be appropriately selected depending on the intended purpose. Examples of the charging member include contact chargers, known in the art themselves, each equipped with a conductive or semiconductive roller, brush, film, or rubber blade, and non-contact chargers utilizing corona discharge, such as corotron, and scorotron.

For example, the charging can be performed by applying voltage to the surface of the electrostatic latent image bearer using the charging member.

A form of the charging member may be any shape, such as a magnetic brush and a fur brush, other than a roller. The form thereof may be selected depending on specifications or an embodiment of the image forming apparatus.

The charging member is not limited to the contact charger, but the contact charger is preferably used because an image forming apparatus which discharges a reduced amount of ozone generated from the charging member can be obtained.

<<Exposing Member and Exposure>>

The exposing member is not particularly limited as long as the exposing member is a member capable of exposing the surface of the electrostatic latent image bearer, which has been charged by the charging member, to imagewise light corresponding to an image to be formed, and may be appropriately selected depending on the intended purpose. Examples thereof include various exposing members, such as copy optical exposing members, rod lens array exposing members, laser optical exposing members, and liquid crystal shutter optical exposing members.

A light source used for the exposing member is not particularly limited and may be appropriately selected depending on the intended purpose. Examples thereof include most of light emitters, such as a fluorescent lamp, a tungsten lamp, a halogen lamp, a mercury lamp, a sodium vapor lamp, a light emitting diode (LED), a semiconductor laser (LD), and an electroluminescent light (EL).

In order to apply only light having a desired wavelength range, various filters, such as a sharp-cut filter, a band-pass filter, a near infrared ray-cut filter, a dichroic filter, an interference filter, and a color temperature conversion filter, may be used.

For example, the exposure may be performed by exposing the surface of the electrostatic latent image bearer to imagewise light using the exposing member.

In the present disclosure, a back-exposure system may be employed. The back-exposure system is a system where imagewise exposure is performed from the back side of the electrostatic latent image bearer.

<Developing Unit and Developing Step>

The developing unit is not particularly limited as long as the developing unit is a developing unit storing therein a toner for forming a toner image, which is a visible image obtained by developing the electrostatic latent image formed on the electrostatic latent image bearer. The developing unit may be appropriately selected depending on the intended purpose.

The developing step is not particularly limited as long as the developing step is a step including developing the electrostatic latent image formed on the electrostatic latent image bearer with a toner to form a toner image that is a visible image. The developing step may be appropriately selected depending on the intended purpose. For example, the developing step may be performed by the developing unit.

The developing unit is preferably a developing device including a stirring rod configured to stir the toner to charge the toner with friction, and a developer bearer, inside of which a magnetic field generating unit is disposed and fixed, where the developer bearer is configured to bear a developer including the toner on a surface thereof, and is rotatable.

<Other Units and Other Steps>

Examples of the above-mentioned other units include a transferring unit, a fixing unit, a cleaning unit, a charge-eliminating unit, a recycling unit, and a controlling unit.

Examples of the above-mentioned other steps include a transferring step, a fixing step, a cleaning step, a charge-eliminating step, a recycling step, and a controlling step.

—Transferring Unit and Transferring Step—

The transferring unit is not particularly limited as long as the transferring unit is a unit configured to transfer a visible image to a recording medium. The transferring unit may be appropriately selected depending on the intended purpose. A preferable embodiment of the transferring unit is a transferring unit including a primary transferring unit configured to transfer visible images onto an intermediate transfer member to form a composite transfer image, and a secondary transferring unit configured to transfer the composite transfer image onto a recording medium.

The transferring step is not particularly limited as long as the transferring step is a step including transferring a visible image to a recording medium. The transferring step may be appropriately selected depending on the intended purpose. A preferable embodiment of the transferring step is a transferring step, which uses an intermediate transfer member, and includes primary transferring visible images onto the intermediate transfer member, followed by secondary transferring the visible images onto the recording medium.

For example, the transferring step can be performed by charging the photoconductor with a transfer charger to charge the visible image. The transferring step may be performed by the transferring unit.

When an image secondary transferred to the recording medium is a color image formed of two or more color toners, images of respective color toners are sequentially superimposed onto the intermediate transfer member by the transferring unit to form a composite image on the intermediate transfer member, and the composite image on the intermediate transfer member is collectively secondary transferred onto the recording medium by the intermediate transferring unit (i.e., the secondary transferring unit).

The intermediate transfer member is not particularly limited and may be appropriately selected from transfer members known in the art depending on the intended purpose. Preferable examples thereof include a transfer belt.

The transferring unit (the primary transferring unit, the secondary transferring unit) preferably includes at least a transferor configured to charge the visible image formed on the photoconductor to release the visible image to the side of the recording medium. Examples of the transferor include a corona transferor using corona discharge, a transfer belt, a transfer roller, a pressure transfer roller, and an adhesion transferor.

The recording medium is typically plane paper, and the recording medium is not particularly limited as long as the recording medium is a medium to which an unfixed image after developing can be transferred. The recording medium may be appropriately selected depending on the intended purpose. A PET base for OHP may be also used as the recording medium.

—Fixing Unit and Fixing Step—

The fixing unit is not particularly limited as long as the fixing unit is a unit configured to fix the transfer image transferred onto the recording medium. The fixing unit may be appropriately selected depending on the intended purpose. For example, the fixing unit is preferably a known heat press member. Examples of the heat press member include a combination of a heating roller and a press roller, and a combination of a heating roller, a press roller, and an endless belt.

The fixing step is not particularly limited as long as the fixing step is a step including fixing the visible image transferred onto the recording medium. The fixing step may be appropriately selected depending on the intended purpose. For example, the fixing step may be performed every time an image of each color toner is transferred to the recording medium, or may be performed once when images of respective color toners are laminated on the recording medium.

The fixing step may be performed by the fixing unit.

Heating performed by the heat press member is preferably at a temperature from 80° C. through 200° C.

In the present disclosure, for example, a known optical fixing device may be used in combination with or instead of the fixing unit according to the intended purpose.

The surface pressure during the fixing step is not particularly limited and may be appropriately selected depending on the intended purpose. The surface pressure is preferably from 10 $N/cm^2$ through 80 $N/cm^2$.

<<Cleaning Unit and Cleaning Step>>

The cleaning unit is not particularly limited as long as the cleaning unit is capable of removing the toner remained on the photoconductor, and may be appropriately selected depending on the intended purpose. Examples of the cleaning unit include a magnetic brush cleaner, an electrostatic brush cleaner, a magnetic roller cleaner, a blade cleaner, a brush cleaner, and a web cleaner.

The cleaning step is not particularly limited as long as the cleaning step is a step capable of removing the toner remained on the photoconductor, and may be appropriately selected depending on the intended purpose. For example, the cleaning step can be performed by the cleaning unit.

—Charge-Eliminating Unit and Charge-Eliminating Step—

The charge-eliminating unit is not particularly limited as long as the charge-eliminating unit is a unit configured to apply charge-eliminating bias to the photoconductor to eliminate the charge of the photoconductor. The charge-eliminating unit may be appropriately selected depending on the intended purpose. Examples of the charge-eliminating unit include a charge-eliminating lamp.

The charge-eliminating step is not particularly limited as long as the charge-eliminating step is a step including applying charge-eliminating bias to the photoconductor to eliminate the charge of the photoconductor. The charge-eliminating step may be appropriately selected depending on the intended purpose. For example, the charge-eliminating step may be performed by the charge-eliminating unit.

—Recycling Unit and Recycling Step—

The recycling unit is not particularly limited as long as the recycling unit is a unit configured to recycle the toner removed by the cleaning step to the developing device. The recycling unit may be appropriately selected depending on the intended purpose. Examples of the recycling unit include a known conveying unit.

The recycling step is not particularly limited as long as the recycling step is a step including recycling the toner removed by the cleaning step to the developing device. The recycling step may be appropriately selected depending on the intended purpose. For example, the recycling step may be performed by the recycling unit.

Next, one embodiment for carrying out a method for forming an image by the image forming apparatus of the present disclosure will be described with reference to FIG. 3. A printer is illustrated as an example of the image forming apparatus of the present embodiment, but the image forming apparatus is not particularly limited as long as the image forming apparatus is an apparatus capable of forming an image with a toner, such as a photocopier, a facsimile, and a multifunction peripheral.

The image forming apparatus includes a paper feeding unit 210, a conveying unit 220, an image formation unit 230, a transferring unit 240, and a fixing unit 250.

The paper feeding unit 210 includes a paper feeding cassette 211 loaded with paper P to be fed, and a paper feeding roller 212 configured to feed paper P in the paper feeding cassette 211 one by one.

The conveying unit 220 includes a roller 221 configured to transport the paper P fed by the paper feeding roller 212 towards the transferring unit 240, a pair of timing rollers 222 configured to nip the edge of the paper P transported by the roller 221 to stand-by and send the paper to the transferring unit 240 at the predetermined timing, and a paper ejection roller 223 configured to discharge the paper P on which a color toner image is fixed to the paper ejection tray 224.

Figure 3:
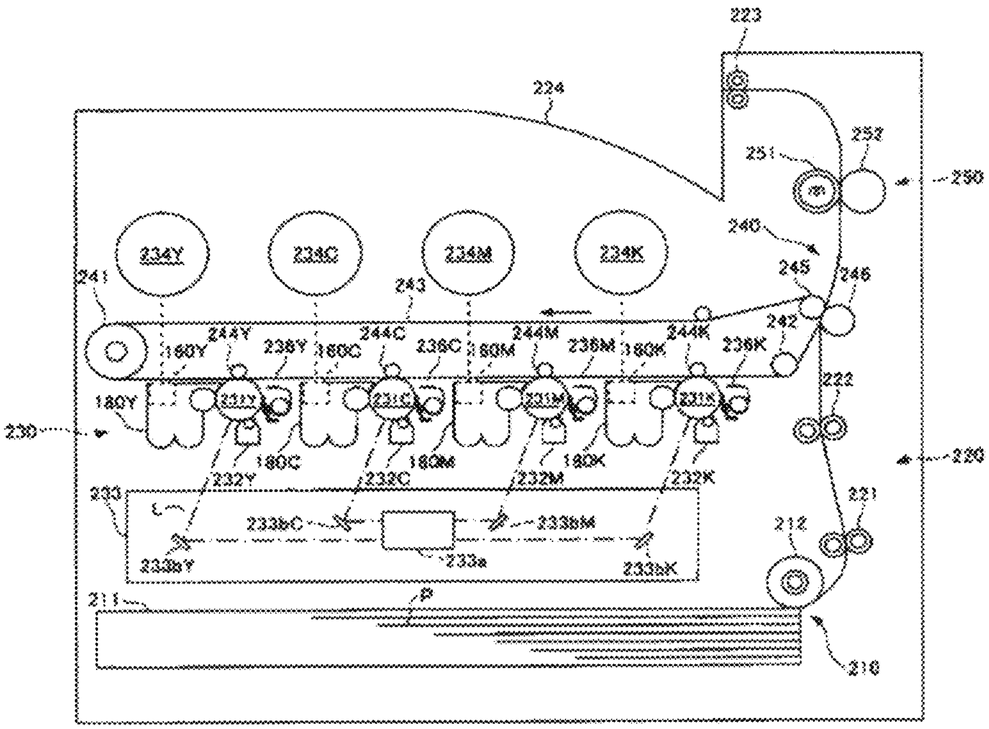
FIG. 3 is a schematic view illustrating an example of the image forming apparatus of the present disclosure.

The image formation unit 230 includes an image formation unit Y configured to form an image using a developer including a yellow toner, an image formation unit C using a developer including a cyan toner, an image formation unit M using a developer including a magenta toner, and an image formation unit K using a developer including a black toner, which are disposed in this order from left to right in FIG. 3 with the predetermined gap therebetween, and an exposure unit 233.

The image forming unit 180 (180Y, 180C, 180M, 180K) is mounted to be rotatable clockwise in FIG. 3, and includes a photoconductor drum 231 (231Y, 231C, 231M, 231K) on which an electrostatic latent image and a toner image are to be formed, a charger 232 (232Y, 232C, 232M, 232K) configured to uniformly charge a surface of the photoconductor drum 231 (231Y, 231C, 231M, 231K), and a cleaner 236 (236Y, 236C, 236M, 236K) configured to remove the toner remained on the surface of the photoconductor drum 231 (231Y, 231C, 231M, 231K).

Moreover, the image forming unit 180 (180Y, 180C, 180M, 180K) includes a toner bottle 234 (234Y, 234C, 234M, 234K) configured to store a toner of each color, and a supply hopper 160 (160Y, 160C, 160M, 160K) configure to supply the toner from the toner bottle 234 (234Y, 234C, 234M, 234K).

When an arbitrary image formation unit is described among the image formation units (Y, C, M, K), it is simply referred to as an image formation unit.

The exposure device 233 is configured to reflect laser light L emitted from a light source 233*a* with polygon mirror 233*b* (233*b*Y, 233*b*C, 233*b*M, 233*b*K) rotated and driven by a motor to irradiate the photoconductor drum 231 with the laser light L based on the image information.

Moreover, the developer includes a toner and a carrier. The four image formation units (Y, C, M, and K) have identical mechanical structures, expect that a developer for use is different.

The transferring unit 240 includes a driving roller 241 and a driven roller 242, an intermediate transfer belt 243 rotatable in the anti-clockwise direction in FIG. 3 along the movement of the driving roller 241, primary transfer rollers (244Y, 244C, 244M, and 244K) disposed to face the photoconductor drum 231 via the intermediate transfer belt 243, and a secondary counter roller 245 and a secondary transfer roller 246 disposed to face each other via the intermediate transfer belt 243 at the transfer position of the toner image to paper.

The fixing unit 250 includes a press roller 252, which includes a heater therein, and is configured to rotatably press a fixing belt 251 to form a nip, where the fixing belt 251 is configured to heat the paper P. Owing to the fixing unit, heat and pressure are applied to the color toner image on the paper P to fix the color toner image. The paper P, on which the color toner image has been fixed, is ejected to the paper ejection tray 224 by the paper ejection roller 223, to thereby complete a series of image formation processes.

EXAMPLES

The present disclosure will be described below by way of Examples. The present disclosure should not be construed as being limited to these Examples. In Examples, "part(s)" denotes "part(s) by mass" and "%" denotes "% by mass" unless otherwise stated.

Production Example 1

<Synthesis of Amorphous Polyester Resin A1>

A reaction chamber equipped with a cooling tube, a stirrer, and a nitrogen-inlet tube was charged with 26.5 parts of terephthalic acid, 13.5 parts of a bisphenol A ethylene oxide (2.2 mol) adduct, 59.9 parts of a bisphenol A propylene oxide (2.2 mol) adduct, and 0.2 parts of dibutyl tin oxide. The resultant mixture was allowed to react for 4 hours at 230° C. under ambient pressure, followed by reacting for 5 hours under the reduced pressure of from 10 mmHg through 15 mmHg, to thereby obtain [Amorphous Polyester Resin A1].

Production Example 2

<Synthesis of Amorphous Polyester Resin A2>

A reaction chamber equipped with a cooling tube, a stirrer, and a nitrogen-inlet tube was charged with 25.8 parts of terephthalic acid, 27.8 parts of adipic acid, 44.9 parts of 3-methyl-1,5-pentanediol, 1.5 parts of trimethylolpropane, and 0.2 parts of dibutyl tin oxide. The resultant mixture was allowed to react for 4 hours at 230° C. under ambient pressure, followed by reacting for 5 hours under the reduced pressure of from 10 mmHg through 15 mmHg, to thereby obtain an intermediate product of Amorphous Polyester Resin A2.

Next, a reaction vessel equipped with a cooling tube, a stirrer, and a nitrogen inlet tube was charged with 90 parts of the intermediate product of Amorphous Polyester Resin A2, and 10 parts of isophorone diisocyanate (IPDI). After diluting the resultant mixture with 100 parts of ethyl acetate, the resultant was allowed to react for 5 hours at 80° C., to thereby obtain an ethyl acetate solution of [Amorphous Polyester Resin A2] that was a prepolymer.

Production Example 3

<Synthesis of Crystalline Polyester Resin B>

A 5 L four-necked flask equipped with a nitrogen inlet tube, a dehydration tube, a stirrer, and a thermocouple was charged with dodecanedioic acid and 1,6-hexanediol so that a molar ratio OH/COOH of hydroxyl groups to carboxyl groups was to be 0.9. The resultant mixture was allowed to react together with titanium tetraisopropoxide (500 ppm relative to the resin component) for 10 hours at 180° C., followed by heating to 200° C. and reacting for 3 hours. The resultant was further reacted for 2 hours under the pressure of 8.3 kPa, to thereby obtain [Crystalline Polyester Resin B].

Production Example 4

<Synthesis of Amorphous Hybrid Resin 1 (Dispersant for Crystalline Polyester Resin)>

A 5 L four-necked flask equipped with a nitrogen inlet tube, a dehydration tube, a stirrer, and a thermocouple was charged with 7.2 g of 2,3-butanediol, 6.08 g of 1,2-propanediol, 18.59 g of terephthalic acid, and 0.18 g of tin (II) 2-ethylhexanoate. The flask was purged with nitrogen gas to maintain an inert atmosphere and heated, and the temperature was maintained at 180° C. for 1 hour, followed by heating from 180° C. to 230° C. at the heating rate of 10° C./hr. Thereafter, the resultant was allowed to react through a polycondensation reaction for 10 hours at 230° C., followed by further reacting for 1 hour at 230° C. and 8.0 kPa. After cooling the resultant to 160° C., 0.6 g of acrylic acid, 7.79 g of styrene, 1.48 g of 2-ethylhexylacrylate, and dibutyl peroxide by dripping over 1 hour using a dripping funnel. After the dripping, the addition polymerization reaction was measured for 1 hour with maintaining the temperature to 160° C. Thereafter, the resultant was heated to 210° C., followed by adding 4.61 g of trimelitic anhydride. The resultant was allowed to react for 2 hours at 210° C., followed by reacting at 210° C. and 10 kPa until a softening point thereof reaches a desired softening point, to thereby obtain [Amorphous Hybrid Resin 1].

The SP value of [Amorphous Hybrid Resin 1] was 10.8. Moreover, [Amorphous Hybrid Resin 1] had the weight average molecular weight of 55,000, the number average molecular weight of 2,800, Tg of 55° C., and the acid value of 9.4 mgKOH/g.

Production Example 5

<Production of resin particle (A-1) aqueous dispersion liquid (W0-1)>

A reaction vessel equipped with a stirrer, a heating and cooling device, and a thermometer was charged with 3,710 parts of water, and 200 parts of polyoxyethylene-1-(allyloxymethyl)alkyl ether ammonium sulfate (HITENOL KH-1025, available from DKS Co., Ltd.), and the resultant mixture was stirred at 200 rpm to homogenize the mixture. The homogenized mixture was heated to increase the internal system temperature to 75° C. Thereafter, 90 parts of a 10% by weight ammonium persulfate aqueous solution was added, followed by adding a mixture including 450 parts of styrene, 250 parts of butyl acrylate, and 300 parts of methacrylic acid by dripping over 4 hours.

After the dripping, the resultant was matured for 4 hours at 75° C., to thereby obtain an aqueous dispersion liquid (W0-1) of resin particles (A-1) including the resin (a1-1) that was a polymer obtained by copolymerizing the monomers and the polyoxyethylene-1-(allyloxymethy)alkyl ether ammonium sulfate.

The volume average particle diameter of the particles in the resin particle (A-1) aqueous dispersion liquid (W0-1) was measured by means of a dynamic light scattering particle size analyzer (LB). As a result, the volume average particle diameter of the particles was 15 nm. Part of the resin particle (A-1) aqueous dispersion liquid (W0-1) was dried to separate the resin (a1-1). The separated resin component had a glass transition temperature (Tg) of 53° C. and an acid value of 195 mgKOH/g.

Production Example 6

<Production of resin particle (A-2) aqueous dispersion liquid (W0-2)>

A reaction vessel equipped with a stirrer, a heating and cooling device, and a thermometer was charged with 3,760 parts of water, and 150 parts of polyoxyethylene-1-(allyloxymethyl)alkyl ether ammonium sulfate (HITENOL KH-1025, available from DKS Co., Ltd.), and the resultant mixture was stirred at 200 rpm to homogenize the mixture. The homogenized mixture was heated to increase the internal system temperature to 75° C. Thereafter, 90 parts of a 10% by weight ammonium persulfate aqueous solution was added, followed by adding a mixture including 430 parts of styrene, 270 parts of butyl acrylate, and 300 parts of methacrylic acid by dripping over 4 hours.

After the dripping, the resultant was matured for 4 hours at 75° C., to thereby obtain an aqueous dispersion liquid (W0-2) of resin particles (A-2) including the resin (a1-2) that was a polymer obtained by copolymerizing the monomers and the polyoxyethylene-1-(allyloxymethyl)alkyl ether ammonium sulfate.

The volume average particle diameter of the particles in the resin particle (A-2) aqueous dispersion liquid (W0-2) was measured in the same manner as in Production Example 4. As a result, the volume average particle diameter of the particles was 30 nm.

Part of the resin particle (A-2) aqueous dispersion liquid (W0-2) was dried to separate the resin (a1-2). The separated resin component had a glass transition temperature (Tg) of 53° C. and an acid value of 195 mgKOH/g.

Production Example 7

<Production of Resin Particle (A-3) Aqueous Dispersion Liquid (W0-3)>

A reaction vessel equipped with a stirrer, a heating and cooling device, and a thermometer was charged with 3,810 parts of water, and 100 parts of polyoxyethylene-1-(allyloxymethyl)alkyl ether ammonium sulfate (HITENOL KH-1025, available from DKS Co., Ltd.), and the resultant mixture was stirred at 200 rpm to homogenize the mixture. The homogenized mixture was heated to increase the internal system temperature to 75° C. Thereafter, 90 parts of a 10% by weight ammonium persulfate aqueous solution was added, followed by adding a mixture including 400 parts of styrene, 300 parts of butyl acrylate, and 300 parts of methacrylic acid by dripping over 4 hours.

After the dripping, the resultant was matured for 4 hours at 75° C., to thereby obtain an aqueous dispersion liquid (W0-3) of resin particles (A-3) including the resin (a1-3) that was a polymer obtained by copolymerizing the monomers and the polyoxyethylene-1-(allyloxymethy)alkyl ether ammonium sulfate.

The volume average particle diameter of the particles in the resin particle (A-3) aqueous dispersion liquid (W0-3) was measured in the same manner as in Production Example 4. As a result, the volume average particle diameter of the particles was 45 nm.

Part of the resin particle (A-3) aqueous dispersion liquid (W0-3) was dried to separate the resin (a1-3). The separated resin component had a glass transition temperature (Tg) of 53° C. and an acid value of 195 mgKOH/g.

Production Example 8

<Production of Resin Particle (A-4) Aqueous Dispersion Liquid (W0-4)>

A reaction vessel equipped with a stirrer, a heating and cooling device, and a thermometer was charged with 3,810 parts of water, and 100 parts of polyoxyethylene-1-(allyloxymethyl)alkyl ether ammonium sulfate (HITENOL KH-1025, available from DKS Co., Ltd.), and the resultant mixture was stirred at 200 rpm to homogenize the mixture. The homogenized mixture was heated to increase the internal system temperature to 75° C. Thereafter, 90 parts of a 10% by weight ammonium persulfate aqueous solution was added, followed by adding a mixture including 425 parts of styrene, 275 parts of butyl acrylate, and 300 parts of methacrylic acid by dripping over 4 hours.

After the dripping, the resultant was matured for 4 hours at 75° C., to thereby obtain an aqueous dispersion liquid (W0-4) of resin particles (A-4) including the resin (a1-4) that was a polymer obtained by copolymerizing the monomers and the polyoxyethylene-1-(allyloxymethy)alkyl ether ammonium sulfate.

The volume average particle diameter of the particles in the resin particle (A-4) aqueous dispersion liquid (W0-4) was measured in the same manner as in Production Example 4. As a result, the volume average particle diameter of the particles was 45 nm.

Part of the resin particle (A-4) aqueous dispersion liquid (W0-4) was dried to separate the resin (a1-4). The separated resin component had a glass transition temperature (Tg) of 53° C. and an acid value of 195 mgKOH/g.

Production Example 9

<Production of Resin Particle (A-5) Aqueous Dispersion Liquid (W0-5)>

A reaction vessel equipped with a stirrer, a heating and cooling device, and a thermometer was charged with 3,710 parts of water, and 200 parts of polyoxyethylene-1-(allyloxymethyl)alkyl ether ammonium sulfate (HITENOL KH-1025, available from DKS Co., Ltd.), and the resultant mixture was stirred at 200 rpm to homogenize the mixture. The homogenized mixture was heated to increase the internal system temperature to 75° C. Thereafter, 90 parts of a 10% by weight ammonium persulfate aqueous solution was added, followed by adding a mixture including 500 parts of styrene, 200 parts of butyl acrylate, and 300 parts of methacrylic acid by dripping over 4 hours.

After the dripping, the resultant was matured for 4 hours at 75° C., to thereby obtain an aqueous dispersion liquid (W0-5) of resin particles (A-5) including the resin (a1-5) that was a polymer obtained by copolymerizing the monomers and the polyoxyethylene-1-(allyloxymethyl)alkyl ether ammonium sulfate.

The volume average particle diameter of the particles in the resin particle (A-5) aqueous dispersion liquid (W0-5) was measured by means of a dynamic light scattering particle size analyzer (LB). As a result, the volume average particle diameter of the particles was 15 nm. Part of the resin particle (A-5) aqueous dispersion liquid (W0-5) was dried to separate the resin (a1-5). The separated resin component had a glass transition temperature (Tg) of 53° C. and an acid value of 195 mgKOH/g.

Production Example 10

<Production of Resin Particle (A-6) Aqueous Dispersion Liquid (W0-6)>

A reaction vessel equipped with a stirrer, a heating and cooling device, and a thermometer was charged with 3,810 parts of water, and 100 parts of polyoxyethylene-1-(allyloxymethyl)alkyl ether ammonium sulfate (HITENOL KH-1025, available from DKS Co., Ltd.), and the resultant mixture was stirred at 200 rpm to homogenize the mixture. The homogenized mixture was heated to increase the internal system temperature to 75° C. Thereafter, 90 parts of a 10% by weight ammonium persulfate aqueous solution was added, followed by adding a mixture including 425 parts of styrene, 275 parts of butyl acrylate, and 300 parts of methacrylic acid by dripping over 4 hours.

After the dripping, the resultant was matured for 4 hours at 75° C., to thereby obtain an aqueous dispersion liquid (W0-6) of resin particles (A-6) including the resin (a1-6) that was a polymer obtained by copolymerizing the monomers and the polyoxyethylene-1-(allyloxymethy)alkyl ether ammonium sulfate.

The volume average particle diameter of the particles in the resin particle (A-6) aqueous dispersion liquid (W0-6) was measured in the same manner as in Production Example 4. As a result, the volume average particle diameter of the particles was 45 nm.

Part of the resin particle (A-6) aqueous dispersion liquid (W0-6) was dried to separate the resin (a1-6). The separated resin component had a glass transition temperature (Tg) of 53° C. and an acid value of 195 mgKOH/g.

Production Example 11

<Production of Resin Particle (A-7) Aqueous Dispersion Liquid (W0-7)>

A reaction vessel equipped with a stirrer, a heating and cooling device, and a thermometer was charged with 3,710 parts of water, and 322 parts of polyoxyethylene-1-(allyloxymethyl)alkyl ether ammonium sulfate (HITENOL KH-1025, available from DKS Co., Ltd.), and the resultant mixture was stirred at 200 rpm to homogenize the mixture. The homogenized mixture was heated to increase the internal system temperature to 75° C. Thereafter, 90 parts of a 10% by weight ammonium persulfate aqueous solution was added, followed by adding a mixture including 450 parts of styrene, 250 parts of butyl acrylate, and 300 parts of methacrylic acid by dripping over 4 hours.

After the dripping, the resultant was matured for 4 hours at 75° C., to thereby obtain an aqueous dispersion liquid (W0-7) of resin particles (A-7) including the resin (a1-7) that was a polymer obtained by copolymerizing the monomers and the polyoxyethylene-1-(allyloxymethyl)alkyl ether ammonium sulfate.

The volume average particle diameter of the particles in the resin particle (A-7) aqueous dispersion liquid (W0-7) was measured by means of a dynamic light scattering particle size analyzer (LB). As a result, the volume average particle diameter of the particles was 7.2 nm. Part of the resin particle (A-7) aqueous dispersion liquid (W0-7) was dried to separate the resin (a1-7). The separated resin component had a glass transition temperature (Tg) of 53° C. and an acid value of 195 mgKOH/g.

Production Example 12

<Production of Resin Particle (A-8) Aqueous Dispersion Liquid (W0-8)>

A reaction vessel equipped with a stirrer, a heating and cooling device, and a thermometer was charged with 3,710 parts of water, and 300 parts of polyoxyethylene-1-(allyloxymethyl)alkyl ether ammonium sulfate (HITENOL KH-1025, available from DKS Co., Ltd.), and the resultant mixture was stirred at 200 rpm to homogenize the mixture. The homogenized mixture was heated to increase the internal system temperature to 75° C. Thereafter, 90 parts of a 10% by weight ammonium persulfate aqueous solution was added, followed by adding a mixture including 450 parts of styrene, 250 parts of butyl acrylate, and 300 parts of methacrylic acid by dripping over 4 hours.

After the dripping, the resultant was matured for 4 hours at 75° C., to thereby obtain an aqueous dispersion liquid (W0-8) of resin particles (A-8) including the resin (a1-8) that was a polymer obtained by copolymerizing the monomers and the polyoxyethylene-1-(allyloxymethyl)alkyl ether ammonium sulfate.

The volume average particle diameter of the particles in the resin particle (A-8) aqueous dispersion liquid (W0-8) was measured by means of a dynamic light scattering particle size analyzer (LB). As a result, the volume average particle diameter of the particles was 8 nm. Part of the resin particle (A-8) aqueous dispersion liquid (W0-8) was dried to separate the resin (a1-8). The separated resin component had a glass transition temperature (Tg) of 53° C. and an acid value of 195 mgKOH/g.

Production Example 13

<Production of Resin Particle (A-9) Aqueous Dispersion Liquid (W0-9)>

A reaction vessel equipped with a stirrer, a heating and cooling device, and a thermometer was charged with 3,710 parts of water, and 195 parts of polyoxyethylene-1-(allyloxymethyl)alkyl ether ammonium sulfate (HITENOL KH-1025, available from DKS Co., Ltd.), and the resultant mixture was stirred at 200 rpm to homogenize the mixture. The homogenized mixture was heated to increase the internal system temperature to 75° C. Thereafter, 90 parts of a 10% by weight ammonium persulfate aqueous solution was added, followed by adding a mixture including 450 parts of styrene, 250 parts of butyl acrylate, and 300 parts of methacrylic acid by dripping over 4 hours.

After the dripping, the resultant was matured for 4 hours at 75° C., to thereby obtain an aqueous dispersion liquid (W0-9) of resin particles (A-9) including the resin (a1-9) that was a polymer obtained by copolymerizing the monomers and the polyoxyethylene-1-(allyloxymethyl)alkyl ether ammonium sulfate.

The volume average particle diameter of the particles in the resin particle (A-9) aqueous dispersion liquid (W0-9) was measured by means of a dynamic light scattering particle size analyzer (LB). As a result, the volume average particle diameter of the particles was 22 nm. Part of the resin particle (A-9) aqueous dispersion liquid (W0-9) was dried to separate the resin (a1-9). The separated resin component had a glass transition temperature (Tg) of 53° C. and an acid value of 195 mgKOH/g.

Production Example 14

<Production of Resin Particle (A-10) Aqueous Dispersion Liquid (W0-10)>

A reaction vessel equipped with a stirrer, a heating and cooling device, and a thermometer was charged with 3,710 parts of water, and 142 parts of polyoxyethylene-1-(allyloxymethyl)alkyl ether ammonium sulfate (HITENOL KH-1025, available from DKS Co., Ltd.), and the resultant mixture was stirred at 200 rpm to homogenize the mixture. The homogenized mixture was heated to increase the internal system temperature to 75° C. Thereafter, 90 parts of a 10% by weight ammonium persulfate aqueous solution was added, followed by adding a mixture including 450 parts of styrene, 250 parts of butyl acrylate, and 300 parts of methacrylic acid by dripping over 4 hours.

After the dripping, the resultant was matured for 4 hours at 75° C., to thereby obtain an aqueous dispersion liquid (W0-10) of resin particles (A-10) including the resin (a1-10) that was a polymer obtained by copolymerizing the monomers and the polyoxyethylene-1-(allyloxymethy)alkyl ether ammonium sulfate.

The volume average particle diameter of the particles in the resin particle (A-10) aqueous dispersion liquid (W0-10) was measured by means of a dynamic light scattering particle size analyzer (LB). As a result, the volume average particle diameter of the particles was 36 nm. Part of the resin particle (A-10) aqueous dispersion liquid (W0-10) was dried to separate the resin (a1-10). The separated resin component had a glass transition temperature (Tg) of 53° C. and an acid value of 195 mgKOH/g.

Production Example 15

<Production of Resin Particle (A-11) Aqueous Dispersion Liquid (W0-11)>

A reaction vessel equipped with a stirrer, a heating and cooling device, and a thermometer was charged with 3,710 parts of water, and 88 parts of polyoxyethylene-1-(allyloxymethyl)alkyl ether ammonium sulfate (HITENOL KH-1025, available from DKS Co., Ltd.), and the resultant mixture was stirred at 200 rpm to homogenize the mixture. The homogenized mixture was heated to increase the internal system temperature to 75° C. Thereafter, 90 parts of a 10% by weight ammonium persulfate aqueous solution was added, followed by adding a mixture including 450 parts of styrene, 250 parts of butyl acrylate, and 300 parts of methacrylic acid by dripping over 4 hours.

After the dripping, the resultant was matured for 4 hours at 75° C., to thereby obtain an aqueous dispersion liquid (W0-11) of resin particles (A-11) including the resin (a1-11) that was a polymer obtained by copolymerizing the monomers and the polyoxyethylene-1-(allyloxymethyl)alkyl ether ammonium sulfate.

The volume average particle diameter of the particles in the resin particle (A-11) aqueous dispersion liquid (W0-11) was measured by means of a dynamic light scattering particle size analyzer (LB). As a result, the volume average particle diameter of the particles was 58 nm. Part of the resin particle (A-11) aqueous dispersion liquid (W0-11) was dried to separate the resin (a1-11). The separated resin component had a glass transition temperature (Tg) of 53° C. and an acid value of 195 mgKOH/g.

Production Example 16

<Production of Resin Particle (A-12) Aqueous Dispersion Liquid (W0-12)>

A reaction vessel equipped with a stirrer, a heating and cooling device, and a thermometer was charged with 3,710 parts of water, and 65 parts of polyoxyethylene-1-(allyloxymethyl)alkyl ether ammonium sulfate (HITENOL KH-1025, available from DKS Co., Ltd.), and the resultant mixture was stirred at 200 rpm to homogenize the mixture. The homogenized mixture was heated to increase the internal system temperature to 75° C. Thereafter, 90 parts of a 10% by weight ammonium persulfate aqueous solution was added, followed by adding a mixture including 450 parts of styrene, 250 parts of butyl acrylate, and 300 parts of methacrylic acid by dripping over 4 hours.

After the dripping, the resultant was matured for 4 hours at 75° C., to thereby obtain an aqueous dispersion liquid (W0-12) of resin particles (A-12) including the resin (a1-12) that was a polymer obtained by copolymerizing the monomers and the polyoxyethylene-1-(allyloxymethyl)alkyl ether ammonium sulfate.

The volume average particle diameter of the particles in the resin particle (A-12) aqueous dispersion liquid (W0-12) was measured by means of a dynamic light scattering particle size analyzer (LB). As a result, the volume average particle diameter of the particles was 80 nm. Part of the resin particle (A-12) aqueous dispersion liquid (W0-12) was dried to separate the resin (a1-12). The separated resin component had a glass transition temperature (Tg) of 53° C. and an acid value of 195 mgKOH/g.

Production Example 17

<Production of Resin Particle (A-13) Aqueous Dispersion Liquid (W0-13)>

A reaction vessel equipped with a stirrer, a heating and cooling device, and a thermometer was charged with 3,710 parts of water, and 50 parts of polyoxyethylene-1-(allyloxymethyl)alkyl ether ammonium sulfate (HITENOL KH-1025, available from DKS Co., Ltd.), and the resultant mixture was stirred at 200 rpm to homogenize the mixture. The homogenized mixture was heated to increase the internal system temperature to 75° C. Thereafter, 90 parts of a 10% by weight ammonium persulfate aqueous solution was added, followed by adding a mixture including 450 parts of styrene, 250 parts of butyl acrylate, and 300 parts of methacrylic acid by dripping over 4 hours.

After the dripping, the resultant was matured for 4 hours at 75° C., to thereby obtain an aqueous dispersion liquid (W0-13) of resin particles (A-13) including the resin (a1-13)

that was a polymer obtained by copolymerizing the monomers and the polyoxyethylene-1-(allyloxymethyl)alkyl ether ammonium sulfate.

The volume average particle diameter of the particles in the resin particle (A-13) aqueous dispersion liquid (W0-13) was measured by means of a dynamic light scattering particle size analyzer (LB). As a result, the volume average particle diameter of the particles was 100 nm. Part of the resin particle (A-13) aqueous dispersion liquid (W0-13) was dried to separate the resin (a1-13). The separated resin component had a glass transition temperature (Tg) of 53° C. and an acid value of 195 mgKOH/g.

Production Example 18

<Production of Resin Particle (A-14) Aqueous Dispersion Liquid (W0-14)>

A reaction vessel equipped with a stirrer, a heating and cooling device, and a thermometer was charged with 3,710 parts of water, and 29 parts of polyoxyethylene-1-(allyloxymethyl)alkyl ether ammonium sulfate (HITENOL KH-1025, available from DKS Co., Ltd.), and the resultant mixture was stirred at 200 rpm to homogenize the mixture. The homogenized mixture was heated to increase the internal system temperature to 75° C. Thereafter, 90 parts of a 10% by weight ammonium persulfate aqueous solution was added, followed by adding a mixture including 450 parts of styrene, 250 parts of butyl acrylate, and 300 parts of methacrylic acid by dripping over 4 hours.

After the dripping, the resultant was matured for 4 hours at 75° C., to thereby obtain an aqueous dispersion liquid (W0-14) of resin particles (A-14) including the resin (a1-14) that was a polymer obtained by copolymerizing the monomers and the polyoxyethylene-1-(allyloxymethy)alkyl ether ammonium sulfate.

The volume average particle diameter of the particles in the resin particle (A-14) aqueous dispersion liquid (W0-14) was measured by means of a dynamic light scattering particle size analyzer (LB). As a result, the volume average particle diameter of the particles was 110 nm. Part of the resin particle (A-14) aqueous dispersion liquid (W0-14) was dried to separate the resin (a1-14). The separated resin component had a glass transition temperature (Tg) of 53° C. and an acid value of 195 mgKOH/g.

Production Example 19

<Production of Resin Particle (B-1) Aqueous Dispersion Liquid (W-1)>

A reaction vessel equipped with a stirrer, a heating and cooling device, and a thermometer was charged with 667 parts of the aqueous dispersion liquid (W0-1) and 248 parts of water. To the resultant mixture, 0.267 parts of tert-butyl hydroperoxide (PERBUTYL H, available from NOF CORPORATION) was added, and the resultant mixture was heated to increase the internal system temperature to 70° C. To the resultant, thereafter, 43.3 parts of styrene, 17.5 parts of butyl acrylate, 5.8 parts of 2-ethylhexyl acrylate, and 18.0 parts of a 1% by mass ascorbic acid aqueous solution were added by dripping over 2 hours.

After the dripping, the resultant was matured for 4 hours at 70° C., to thereby obtain an aqueous dispersion liquid (W-1) of resin particles (B-1) including, as constitutional components, a resin (a2-1) and a resin (a1-1) in each particle, where the resin (a2-1) was a polymer obtained by copolymerizing the monomers using the resin particles in the aqueous dispersion liquid (W0-1) as seeds.

As described above, the monomers for constituting the resin (a2-1) were added in the aqueous dispersion liquid of the seed particles composed of the resin (a1-1) and were polymerized in the seed particles (a1-1) so that the resin (a2-1) formed cores.

The volume average particle diameter of the particles in the aqueous dispersion liquid (W-1) was measured in the same manner as in Production Example 4. As a result, the volume average particle diameter of the particles was 17 nm.

Whether or not the aqueous dispersion liquid (W-1) included the resin particles (B-1) each including, as constitutional components, the resin (a2-1) and the resin (a1-1) per particle was confirmed in the following manner.

Specifically, 2 parts of gelatin (Cook Gelatin, available from MORINAGA & CO., LTD.) was added to and dissolved in 15 parts of water heated to a temperature of from 95° C. through 100° C. To the gelatin aqueous solution air-cooled to 40° C., the aqueous dispersion liquid (W-1) was blended at a mass ratio of 1:1. After sufficiently stirring the resultant mixture, the mixture was cooled at 10° C. for 1 hour to set and form a gel.

The gel was cut by means of ultramicrotome (Ultramicrotome UC7, FC7, available from Leica Microsystems) with controlling a temperature to −80° C. to produce a cut piece having a thickness of 80 nm. Then, the cut piece was phase-dyed in a 2% ruthenium tetroxide aqueous solution for 5 minutes. The dyed cut piece was observed under a transmission electron microscope (H-7100, available from Hitachi High-Tech Corporation) to confirm the presence of the resin (a2-1) and the resin (a1-1) in each particle.

Production Example 20

<Production of Resin Particle (B-2) Aqueous Dispersion Liquid (W-2)>

A reaction vessel equipped with a stirrer, a heating and cooling device, and a thermometer was charged with 667 parts of the aqueous dispersion liquid (W0-1) and 248 parts of water. To the resultant mixture, 0.267 parts of tert-butyl hydroperoxide (PERBUTYL H, available from NOF CORPORATION) was added, and the resultant mixture was heated to increase the internal system temperature to 70° C. To the resultant, thereafter, 43.3 parts of styrene, 23.3 parts of butyl acrylate, and 18.0 parts of a 1% by mass ascorbic acid aqueous solution were added by dripping over 2 hours.

After the dripping, the resultant was matured for 4 hours at 70° C., to thereby obtain an aqueous dispersion liquid (W-2) of resin particles (B-2) including, as constitutional components, a resin (a2-2) and a resin (a1-1) in each particle, where the resin (a2-2) was a polymer obtained by copolymerizing the monomers using the resin particles in the aqueous dispersion liquid (W0-1) as seeds. The volume average particle diameter of the particles in the aqueous dispersion liquid (W-2) was measured in the same manner as in Production Example 4. As a result, the volume average particle diameter of the particles was 17 nm.

Whether or not the aqueous dispersion liquid (W-2) included the resin particles (B-2) each including, as constitutional components, the resin (a2-2) and the resin (a1-1) per particle was confirmed in the same manner as in Production Example 19.

Production Example 21

<Production of Resin Particle (B-3) Aqueous Dispersion Liquid (W-3)>

A reaction vessel equipped with a stirrer, a heating and cooling device, and a thermometer was charged with 667 parts of the aqueous dispersion liquid (W0-1) and 248 parts of water. To the resultant mixture, 0.267 parts of tert-butyl hydroperoxide (PERBUTYL H, available from NOF CORPORATION) was added, and the resultant mixture was heated to increase the internal system temperature to 70° C. To the resultant, thereafter, 43.3 parts of styrene, 23.3 parts of 2-ethylhexyl acrylate, and 18.0 parts of a 1% by mass ascorbic acid aqueous solution were added by dripping over 2 hours.

After the dripping, the resultant was matured for 4 hours at 70° C., to thereby obtain an aqueous dispersion liquid (W-3) of resin particles (B-3) including, as constitutional components, a resin (a2-3) and a resin (a1-1) in each particle, where the resin (a2-3) was a polymer obtained by copolymerizing the monomers using the resin particles in the aqueous dispersion liquid (W0-1) as seeds.

The volume average particle diameter of the particles in the aqueous dispersion liquid (W-3) was measured in the same manner as in Production Example 4. As a result, the volume average particle diameter of the particles was 17 nm.

Whether or not the aqueous dispersion liquid (W-3) included the resin particles (B-3) each including, as constitutional components, the resin (a2-3) and the resin (a1-1) per particle was confirmed in the same manner as in Production Example 19.

Production Example 22

<Production of Resin Particle (B-4) Aqueous Dispersion Liquid (W-4)>

A reaction vessel equipped with a stirrer, a heating and cooling device, and a thermometer was charged with 667 parts of the aqueous dispersion liquid (W0-2) and 248 parts of water. To the resultant mixture, 0.267 parts of tert-butyl hydroperoxide (PERBUTYL H, available from NOF CORPORATION) was added, and the resultant mixture was heated to increase the internal system temperature to 70° C. To the resultant, thereafter, 43.3 parts of styrene, 17.5 parts of butyl acrylate, 5.8 parts of 2-ethylhexyl acrylate, and 18.0 parts of a 1% by mass ascorbic acid aqueous solution were added by dripping over 2 hours.

After the dripping, the resultant was matured for 4 hours at 70° C., to thereby obtain an aqueous dispersion liquid (W-4) of resin particles (B-4) including, as constitutional components, a resin (a2-4) and a resin (a1-2) in each particle, where the resin (a2-4) was a polymer obtained by copolymerizing the monomers using the resin particles in the aqueous dispersion liquid (W0-2) as seeds.

The volume average particle diameter of the particles in the aqueous dispersion liquid (W-4) was measured in the same manner as in Production Example 4. As a result, the volume average particle diameter of the particles was 34 nm.

Whether or not the aqueous dispersion liquid (W-4) included the resin particles (B-4) each including, as constitutional components, the resin (a2-4) and the resin (a1-2) per particle was confirmed in the same manner as in Production Example 19.

Production Example 23

<Production of Resin Particle (B-5) Aqueous Dispersion Liquid (W-5)>

A reaction vessel equipped with a stirrer, a heating and cooling device, and a thermometer was charged with 667 parts of the aqueous dispersion liquid (W0-3) and 248 parts of water. To the resultant mixture, 0.267 parts of tert-butyl hydroperoxide (PERBUTYL H, available from NOF CORPORATION) was added, and the resultant mixture was heated to increase the internal system temperature to 70° C. To the resultant, thereafter, 43.3 parts of styrene, 23.3 parts of butyl acrylate, and 18.0 parts of a 1% by mass ascorbic acid aqueous solution were added by dripping over 2 hours.

After the dripping, the resultant was matured for 4 hours at 70° C., to thereby obtain an aqueous dispersion liquid (W-5) of resin particles (B-5) including, as constitutional components, a resin (a2-5) and a resin (a1-3) in each particle, where the resin (a2-5) was a polymer obtained by copolymerizing the monomers using the resin particles in the aqueous dispersion liquid (W0-3) as seeds.

The volume average particle diameter of the particles in the aqueous dispersion liquid (W-5) was measured in the same manner as in Production Example 4. As a result, the volume average particle diameter of the particles was 52 nm.

Whether or not the aqueous dispersion liquid (W-5) included the resin particles (B-5) each including, as constitutional components, the resin (a2-5) and the resin (a1-3) per particle was confirmed in the same manner as in Production Example 19.

Production Examples 24-1 to 24-4

<Production of Resin Particle (B-6 to B-9) Aqueous Dispersion Liquids (W-6 to W-9)>

A resin particle (B-6) aqueous dispersion liquid (W-6) was produced in the same manner as in Production Example 23, except that the entire amount (23.3 parts) of butyl acrylate was replaced with 2-ethylhexyl acrylate. Whether or not the aqueous dispersion liquid (W-6) included the resin particles (B-6) each including, as constitutional components, the resin (a2-6) and the resin (a1-3) per particle was confirmed in the same manner as in Production Example 19, where the resin (a2-6) was obtained by copolymerizing the monomers using the resin particles in the aqueous dispersion liquid (W0-3) as seeds.

A resin particle (B-7) aqueous dispersion liquid (W-7) was produced in the same manner as in Production Example 23, except that 75% of the entire amount (23.3 parts) of butyl acrylate was replaced with 2-ethylhexyl acrylate. Whether or not the aqueous dispersion liquid (W-7) included the resin particles (B-7) each including, as constitutional components, the resin (a2-7) and the resin (a1-3) per particle was confirmed in the same manner as in Production Example 19, where the resin (a2-7) was obtained by copolymerizing the monomers using the resin particles in the aqueous dispersion liquid (W0-3) as seeds.

A resin particle (B-8) aqueous dispersion liquid (W-8) was produced in the same manner as in Production Example 23, except that 50% of the entire amount (23.3 parts) of butyl acrylate was replaced with 2-ethylhexyl acrylate. Whether or not the aqueous dispersion liquid (W-8) included the resin particles (B-8) each including, as constitutional components, the resin (a2-8) and the resin (a1-3) per particle was confirmed in the same manner as in Production Example 19, where the resin (a2-8) was obtained by copolymerizing the monomers using the resin particles in the aqueous dispersion liquid (W0-3) as seeds.

A resin particle (B-9) aqueous dispersion liquid (W-9) was produced in the same manner as in Production Example 23, except that 25% of the entire amount (23.3 parts) of butyl acrylate was replaced with 2-ethylhexyl acrylate. Whether or not the aqueous dispersion liquid (W-9) included the resin particles (B-9) each including, as constitutional components, the resin (a2-9) and the resin (a1-3) per particle was confirmed in the same manner as in Production Example 19, where the resin (a2-9) was obtained by copolymerizing the monomers using the resin particles in the aqueous dispersion liquid (W0-3) as seeds.

Production Example 25

<Production of Resin Particle (B-10) Aqueous Dispersion Liquid (W-10)>

A reaction vessel equipped with a stirrer, a heating and cooling device, and a thermometer was charged with 667 parts of the aqueous dispersion liquid (W0-4) and 248 parts of water. To the resultant mixture, 0.267 parts of tert-butyl hydroperoxide (PERBUTYL H, available from NOF CORPORATION) was added, and the resultant mixture was heated to increase the internal system temperature to 70° C. To the resultant, thereafter, 43.3 parts of styrene, 23.3 parts of butyl acrylate, and 18.0 parts of a 1% by mass ascorbic acid aqueous solution were added by dripping over 2 hours.

After the dripping, the resultant was matured for 4 hours at 70° C., to thereby obtain an aqueous dispersion liquid (W-10) of resin particles (B-10) including, as constitutional components, a resin (a2-10) and a resin (a1-4) in each particle, where the resin (a2-4) was a polymer obtained by copolymerizing the monomers using the resin particles in the aqueous dispersion liquid (W0-4) as seeds.

The volume average particle diameter of the particles in the aqueous dispersion liquid (W-10) was measured in the same manner as in Production Example 4. As a result, the volume average particle diameter of the particles was 52 nm.

Whether or not the aqueous dispersion liquid (W-10) included the resin particles (B-10) each including, as constitutional components, the resin (a2-10) and the resin (a1-4) per particle was confirmed in the same manner as in Production Example 19.

Production Example 26

<Production of Resin Particle (B-11) Aqueous Dispersion Liquid (W-11)>

A reaction vessel equipped with a stirrer, a heating and cooling device, and a thermometer was charged with 667 parts of the aqueous dispersion liquid (W0-5) and 248 parts of water. To the resultant mixture, 0.267 parts of tert-butyl hydroperoxide (PERBUTYL H, available from NOF CORPORATION) was added, and the resultant mixture was heated to increase the internal system temperature to 70° C. To the resultant, thereafter, 43.3 parts of styrene, 23.3 parts of 2-ethylhexyl acrylate, and 18.0 parts of a 1% by mass ascorbic acid aqueous solution were added by dripping over 2 hours.

After the dripping, the resultant was matured for 4 hours at 70° C., to thereby obtain an aqueous dispersion liquid (W-11) of resin particles (B-11) including, as constitutional components, a resin (a2-11) and a resin (a1-5) in each particle, where the resin (a2-5) was a polymer obtained by copolymerizing the monomers using the resin particles in the aqueous dispersion liquid (W0-5) as seeds.

The volume average particle diameter of the particles in the aqueous dispersion liquid (W-11) was measured in the same manner as in Production Example 4. As a result, the volume average particle diameter of the particles was 17 nm.

Whether or not the aqueous dispersion liquid (W-11) included the resin particles (B-11) each including, as constitutional components, the resin (a2-11) and the resin (a1-5) per particle was confirmed in the same manner as in Production Example 19.

Production Example 27

<Production of Resin Particle (B-12) Aqueous Dispersion Liquid (W-12)>

A reaction vessel equipped with a stirrer, a heating and cooling device, and a thermometer was charged with 667 parts of the aqueous dispersion liquid (W0-6) and 248 parts of water. To the resultant mixture, 0.267 parts of tert-butyl hydroperoxide (PERBUTYL H, available from NOF CORPORATION) was added, and the resultant mixture was heated to increase the internal system temperature to 70° C. To the resultant, thereafter, 43.3 parts of styrene, 23.3 parts of 2-ethylhexyl acrylate, and 18.0 parts of a 1% by mass ascorbic acid aqueous solution were added by dripping over 2 hours.

After the dripping, the resultant was matured for 4 hours at 70° C., to thereby obtain an aqueous dispersion liquid (W-12) of resin particles (B-12) including, as constitutional components, a resin (a2-12) and a resin (a1-6) in each particle, where the resin (a2-6) was a polymer obtained by copolymerizing the monomers using the resin particles in the aqueous dispersion liquid (W0-6) as seeds.

The volume average particle diameter of the particles in the aqueous dispersion liquid (W-12) was measured in the same manner as in Production Example 4. As a result, the volume average particle diameter of the particles was 52 nm.

Whether or not the aqueous dispersion liquid (W-12) included the resin particles (B-12) each including, as constitutional components, the resin (a2-12) and the resin (a1-6) per particle was confirmed in the same manner as in Production Example 19.

Production Example 28

<Production of Resin Particle (B-13) Aqueous Dispersion Liquid (W-13)>

A reaction vessel equipped with a stirrer, a heating and cooling device, and a thermometer was charged with 667 parts of the aqueous dispersion liquid (W0-7) and 248 parts of water. To the resultant mixture, 0.267 parts of tert-butyl hydroperoxide (PERBUTYL H, available from NOF CORPORATION) was added, and the resultant mixture was heated to increase the internal system temperature to 70° C. To the resultant, thereafter, 43.3 parts of styrene, 17.5 parts of butyl acrylate, 5.8 parts of 2-ethylhexyl acrylate, and 18.0 parts of a 1% by mass ascorbic acid aqueous solution were added by dripping over 2 hours.

After the dripping, the resultant was matured for 4 hours at 70° C., to thereby obtain an aqueous dispersion liquid (W-13) of resin particles (B-13) including, as constitutional components, a resin (a2-13) and a resin (a1-7) in each particle, where the resin (a2-7) was a polymer obtained by copolymerizing the monomers using the resin particles in the aqueous dispersion liquid (W0-7) as seeds.

The volume average particle diameter of the particles in the aqueous dispersion liquid (W-13) was measured in the same manner as in Production Example 4. As a result, the volume average particle diameter of the particles was 8 nm.

Whether or not the aqueous dispersion liquid (W-13) included the resin particles (B-13) each including, as constitutional components, the resin (a2-13) and the resin (a1-7) per particle was confirmed in the same manner as in Production Example 19.

Production Example 29

<Production of Resin Particle (B-14) Aqueous Dispersion Liquid (W-14)>

A reaction vessel equipped with a stirrer, a heating and cooling device, and a thermometer was charged with 667 parts of the aqueous dispersion liquid (W0-8) and 248 parts of water. To the resultant mixture, 0.267 parts of tert-butyl hydroperoxide (PERBUTYL H, available from NOF CORPORATION) was added, and the resultant mixture was heated to increase the internal system temperature to 70° C. To the resultant, thereafter, 43.3 parts of styrene, 17.5 parts of butyl acrylate, 5.8 parts of 2-ethylhexyl acrylate, and 18.0 parts of a 1% by mass ascorbic acid aqueous solution were added by dripping over 2 hours.

After the dripping, the resultant was matured for 4 hours at 70° C., to thereby obtain an aqueous dispersion liquid (W-14) of resin particles (B-14) including, as constitutional components, a resin (a2-14) and a resin (a1-8) in each particle, where the resin (a2-8) was a polymer obtained by copolymerizing the monomers using the resin particles in the aqueous dispersion liquid (W0-8) as seeds.

The volume average particle diameter of the particles in the aqueous dispersion liquid (W-14) was measured in the same manner as in Production Example 4. As a result, the volume average particle diameter of the particles was 10 nm.

Whether or not the aqueous dispersion liquid (W-14) included the resin particles (B-14) each including, as constitutional components, the resin (a2-14) and the resin (a1-8) per particle was confirmed in the same manner as in Production Example 19.

Production Example 30

<Production of Resin Particle (B-15) Aqueous Dispersion Liquid (W-15)>

A reaction vessel equipped with a stirrer, a heating and cooling device, and a thermometer was charged with 667 parts of the aqueous dispersion liquid (W0-9) and 248 parts of water. To the resultant mixture, 0.267 parts of tert-butyl hydroperoxide (PERBUTYL H, available from NOF CORPORATION) was added, and the resultant mixture was heated to increase the internal system temperature to 70° C. To the resultant, thereafter, 43.3 parts of styrene, 17.5 parts of butyl acrylate, 5.8 parts of 2-ethylhexyl acrylate, and 18.0 parts of a 1% by mass ascorbic acid aqueous solution were added by dripping over 2 hours.

After the dripping, the resultant was matured for 4 hours at 70° C., to thereby obtain an aqueous dispersion liquid (W-15) of resin particles (B-15) including, as constitutional components, a resin (a2-15) and a resin (a1-9) in each particle, where the resin (a2-9) was a polymer obtained by copolymerizing the monomers using the resin particles in the aqueous dispersion liquid (W0-9) as seeds.

The volume average particle diameter of the particles in the aqueous dispersion liquid (W-15) was measured in the same manner as in Production Example 4. As a result, the volume average particle diameter of the particles was 25 nm.

Whether or not the aqueous dispersion liquid (W-15) included the resin particles (B-15) each including, as constitutional components, the resin (a2-15) and the resin (a1-9) per particle was confirmed in the same manner as in Production Example 19.

Production Example 31

<Production of Resin Particle (B-16) Aqueous Dispersion Liquid (W-16)>

A reaction vessel equipped with a stirrer, a heating and cooling device, and a thermometer was charged with 667 parts of the aqueous dispersion liquid (W0-10) and 248 parts of water. To the resultant mixture, 0.267 parts of tert-butyl hydroperoxide (PERBUTYL H, available from NOF CORPORATION) was added, and the resultant mixture was heated to increase the internal system temperature to 70° C. To the resultant, thereafter, 43.3 parts of styrene, 17.5 parts of butyl acrylate, 5.8 parts of 2-ethylhexyl acrylate, and 18.0 parts of a 1% by mass ascorbic acid aqueous solution were added by dripping over 2 hours.

After the dripping, the resultant was matured for 4 hours at 70° C., to thereby obtain an aqueous dispersion liquid (W-16) of resin particles (B-16) including, as constitutional components, a resin (a2-16) and a resin (a1-10) in each particle, where the resin (a2-10) was a polymer obtained by copolymerizing the monomers using the resin particles in the aqueous dispersion liquid (W0-10) as seeds.

The volume average particle diameter of the particles in the aqueous dispersion liquid (W-16) was measured in the same manner as in Production Example 4. As a result, the volume average particle diameter of the particles was 40 nm.

Whether or not the aqueous dispersion liquid (W-16) included the resin particles (B-16) each including, as constitutional components, the resin (a2-16) and the resin (a1-10) per particle was confirmed in the same manner as in Production Example 19.

Production Example 32

<Production of Resin Particle (B-17) Aqueous Dispersion Liquid (W-17)>

A reaction vessel equipped with a stirrer, a heating and cooling device, and a thermometer was charged with 667 parts of the aqueous dispersion liquid (W0-11) and 248 parts of water. To the resultant mixture, 0.267 parts of tert-butyl hydroperoxide (PERBUTYL H, available from NOF CORPORATION) was added, and the resultant mixture was heated to increase the internal system temperature to 70° C. To the resultant, thereafter, 43.3 parts of styrene, 17.5 parts of butyl acrylate, 5.8 parts of 2-ethylhexyl acrylate, and 18.0 parts of a 1% by mass ascorbic acid aqueous solution were added by dripping over 2 hours.

After the dripping, the resultant was matured for 4 hours at 70° C., to thereby obtain an aqueous dispersion liquid (W-17) of resin particles (B-17) including, as constitutional components, a resin (a2-17) and a resin (a1-11) in each particle, where the resin (a2-11) was a polymer obtained by copolymerizing the monomers using the resin particles in the aqueous dispersion liquid (W0-11) as seeds.

The volume average particle diameter of the particles in the aqueous dispersion liquid (W-17) was measured in the same manner as in Production Example 4. As a result, the volume average particle diameter of the particles was 65 nm.

Whether or not the aqueous dispersion liquid (W-17) included the resin particles (B-17) each including, as constitutional components, the resin (a2-17) and the resin (a1-11) per particle was confirmed in the same manner as in Production Example 19.

Production Example 33

<Production of Resin Particle (B-18) Aqueous Dispersion Liquid (W-18)>

A reaction vessel equipped with a stirrer, a heating and cooling device, and a thermometer was charged with 667 parts of the aqueous dispersion liquid (W0-12) and 248 parts of water. To the resultant mixture, 0.267 parts of tert-butyl hydroperoxide (PERBUTYL H, available from NOF CORPORATION) was added, and the resultant mixture was heated to increase the internal system temperature to 70° C. To the resultant, thereafter, 43.3 parts of styrene, 17.5 parts of butyl acrylate, 5.8 parts of 2-ethylhexyl acrylate, and 18.0 parts of a 1% by mass ascorbic acid aqueous solution were added by dripping over 2 hours.

After the dripping, the resultant was matured for 4 hours at 70° C., to thereby obtain an aqueous dispersion liquid (W-18) of resin particles (B-18) including, as constitutional components, a resin (a2-18) and a resin (a1-12) in each particle, where the resin (a2-12) was a polymer obtained by copolymerizing the monomers using the resin particles in the aqueous dispersion liquid (W0-12) as seeds.

The volume average particle diameter of the particles in the aqueous dispersion liquid (W-18) was measured in the same manner as in Production Example 4. As a result, the volume average particle diameter of the particles was 80 nm.

Whether or not the aqueous dispersion liquid (W-18) included the resin particles (B-18) each including, as constitutional components, the resin (a2-18) and the resin (a1-12) per particle was confirmed in the same manner as in Production Example 19.

Production Example 34

<Production of Resin Particle (B-19) Aqueous Dispersion Liquid (W-19)>

A reaction vessel equipped with a stirrer, a heating and cooling device, and a thermometer was charged with 667 parts of the aqueous dispersion liquid (W0-13) and 248 parts of water. To the resultant mixture, 0.267 parts of tert-butyl hydroperoxide (PERBUTYL H, available from NOF CORPORATION) was added, and the resultant mixture was heated to increase the internal system temperature to 70° C. To the resultant, thereafter, 43.3 parts of styrene, 17.5 parts of butyl acrylate, 5.8 parts of 2-ethylhexyl acrylate, and 18.0 parts of a 1% by mass ascorbic acid aqueous solution were added by dripping over 2 hours.

After the dripping, the resultant was matured for 4 hours at 70° C., to thereby obtain an aqueous dispersion liquid (W-19) of resin particles (B-19) including, as constitutional components, a resin (a2-19) and a resin (a1-13) in each particle, where the resin (a2-13) was a polymer obtained by copolymerizing the monomers using the resin particles in the aqueous dispersion liquid (W0-13) as seeds.

The volume average particle diameter of the particles in the aqueous dispersion liquid (W-19) was measured in the same manner as in Production Example 4. As a result, the volume average particle diameter of the particles was 100 nm.

Whether or not the aqueous dispersion liquid (W-19) included the resin particles (B-19) each including, as constitutional components, the resin (a2-19) and the resin (a1-13) per particle was confirmed in the same manner as in Production Example 19.

Production Example 35

<Production of Resin Particle (B-20) Aqueous Dispersion Liquid (W-20)>

A reaction vessel equipped with a stirrer, a heating and cooling device, and a thermometer was charged with 667 parts of the aqueous dispersion liquid (W0-14) and 248 parts of water. To the resultant mixture, 0.267 parts of tert-butyl hydroperoxide (PERBUTYL H, available from NOF CORPORATION) was added, and the resultant mixture was heated to increase the internal system temperature to 70° C. To the resultant, thereafter, 43.3 parts of styrene, 17.5 parts of butyl acrylate, 5.8 parts of 2-ethylhexyl acrylate, and 18.0 parts of a 1% by mass ascorbic acid aqueous solution were added by dripping over 2 hours.

After the dripping, the resultant was matured for 4 hours at 70° C., to thereby obtain an aqueous dispersion liquid (W-20) of resin particles (B-20) including, as constitutional components, a resin (a2-20) and a resin (a1-14) in each particle, where the resin (a2-14) was a polymer obtained by copolymerizing the monomers using the resin particles in the aqueous dispersion liquid (W0-14) as seeds.

The volume average particle diameter of the particles in the aqueous dispersion liquid (W-20) was measured in the same manner as in Production Example 4. As a result, the volume average particle diameter of the particles was 110 nm.

Whether or not the aqueous dispersion liquid (W-20) included the resin particles (B-20) each including, as constitutional components, the resin (a2-20) and the resin (a1-14) per particle was confirmed in the same manner as in Production Example 19.

Production Example 36

<Production of Crystalline Polyester Resin Particle Dispersion Liquid>

A beaker was charged with 20 parts of [Crystalline Polyester Resin B], 70 parts of ethyl acetate, and 30 parts by methyl ethyl ketone, and the resultant mixture was stirred by means of TK Homomixer (available from PRIMIX Corporation) at 10,000 rpm to homogeneously dissolve, to thereby prepare a polyester resin solution.

In 450 parts of ion-exchanged water, a dispersant (sodium dodecylbenzene sulfonae) (0.5%) and polyvinyl alcohol (0.5%) were dissolved to prepare an aqueous medium. In the aqueous medium, the polyester resin solution was suspended by means of TK Homomixer, to thereby form an O/W-type emulsion.

During the suspension, the mixture was stirred by means of TK Homomixer for 30 minutes at 12,000 rpm.

Thereafter, the O/W-type emulsion was heated with stirring by means of TK Homomixer at 200 rpm to remove the mixed solvents, to thereby obtain [Crystalline Polyester Resin Particle Dispersion Liquid] having the volume average particle diameter of 110 nm.

Production Example 37

<Production of Resin Particle B' Aqueous Dispersion Liquid>

A reaction vessel equipped with a stirring rod, and a thermometer was charged with 683 parts of water, 16 parts of sodium salt of sulfuric acid ester of methacrylic acid-ethylene oxide adduct (ELEMINOL RS-30, available from Sanyo Chemical Industries, Ltd.), 133 parts of styrene, 138 parts of methacrylic acid, and 1 part of ammonium persulfate. The resultant mixture was stirred for 15 minutes at 400 rpm, to thereby obtain a white emulsion. The obtained emulsion was heated to increase the temperature of the internal system to 75° C. and was reacted for 5 hours.

To the resultant, 30 parts of a 1% ammonium persulfate aqueous solution was added, and the resultant was matured for 5 hours at 75° C., to thereby obtain an aqueous dispersion liquid of a vinyl-based resin (a copolymer of styrene, methacrylic acid, and sodium salt of sulfuric acid ester of methacrylic acid-ethylene oxide adduct) [Resin Particle B' Aqueous Dispersion Liquid].

Production Example 38

<Preparation of Master Batch (MB)>

Water (1,200 parts), 400 parts of carbon black (Printex35, available from Degussa) [DBP oil absorption: 42 mL/100 mg, pH: 9.5], and 600 parts of the amorphous polyester resin A1 were blended, and the resultant mixture was mixed by means of HENSCHEL MIXER (available from Nippon Cole & Engineering Co., Ltd.). After kneading the mixture for 30 minutes at 150° C. using a twin-roller kneader, the resultant was rolled and cooled, followed by pulverizing to thereby obtain [Master Batch 1].

Production Example 39

<Production of Wax Dispersion Liquid>

A vessel equipped with a stirring rod and a thermometer was charged with 50 parts of paraffin wax (HNP-9, hydrocarbon-based wax, available from Nippon Seiro Co., Ltd., melting point: 75° C., SP value: 8.8) as [Release Agent 1], and 120 parts of ethyl acetate, and the resultant mixture was heated to 80° C. with stirring. The temperature was maintained at 80° C. for 5 hours, followed by cooling to 30° C. over 1 hour. The resultant was dispersed by means of a bead mill (ULTRA VISCOMILL, available from AIMEX CO., Ltd.) under the conditions that the feeding rate was 1 kg/hr, the disc circumferential speed was 6 m/sec, zirconia beads each having a diameter of 0.5 mm were packed in the amount of 80% by volume, and the number of passes was 3, to thereby obtain [Wax Dispersion Liquid].

Production Example 40

<Preparation of Crystalline Polyester Resin Dispersion Liquid>

A vessel equipped with a stirring rod and a thermometer was charged with 50 parts of the crystalline polyester resin B and 280 parts of ethyl acetate, and the resultant mixture was heated at 80° C. with stirring. The temperature was maintained at 80° C. for 5 hours, followed by cooling to 30° C. over 1 hour. The resultant was dispersed by means of a bead mill (ULTRA VISCOMILL, available from AIMEX CO., Ltd.) under the conditions that the feeding rate was 1 kg/hr, the disc circumferential speed was 6 m/sec, zirconia beads each having a diameter of 0.5 mm were packed in the amount of 80% by volume, and the number of passes was 3, to thereby obtain [Crystalline Polyester Resin Dispersion Liquid].

The structures of the resins of the resin particles A-1 to A-14 in Production Examples 5 to 18 are summarized in Table 1 below.

TABLE 1

| | Resin particles | Resin | Aqueous dispersion liquid |
|---|---|---|---|
| Production Ex. 5 | A-1 | a1-1 | W0-1 |
| Production Ex. 6 | A-2 | a1-2 | W0-2 |
| Production Ex. 7 | A-3 | a1-3 | W0-3 |
| Production Ex. 8 | A-4 | a1-4 | W0-4 |
| Production Ex. 9 | A-5 | a1-5 | W0-5 |
| Production Ex. 10 | A-6 | a1-6 | W0-6 |
| Production Ex. 11 | A-7 | a1-7 | W0-7 |
| Production Ex. 12 | A-8 | a1-8 | W0-8 |
| Production Ex. 13 | A-9 | a1-9 | W0-9 |
| Production Ex. 14 | A-10 | a1-10 | W0-10 |
| Production Ex. 15 | A-11 | a1-11 | W0-11 |
| Production Ex. 16 | A-12 | a1-12 | W0-12 |
| Production Ex. 17 | A-13 | a1-13 | W0-13 |
| Production Ex. 18 | A-14 | a1-14 | W0-14 |

The structures of the resins of the resin particles B-1 to B-2 of Production Examples 19 to 35 are summarized in Table 2 below.

TABLE 2

| | Resin particles | Core resin raw material resin particle dispersion liquid | Shell resin | Core resin | Aqueous dispersion liquid |
|---|---|---|---|---|---|
| Production Ex. 19 | B-1 | W0-1 | a1-1 | a2-1 | W-1 |
| Production Ex. 20 | B-2 | W0-1 | a1-1 | a2-2 | W-2 |
| Production Ex. 21 | B-3 | W0-1 | a1-1 | a2-3 | W-3 |
| Production Ex. 22 | B-4 | W0-2 | a1-2 | a2-4 | W-4 |
| Production Ex. 23 | B-5 | W0-3 | a1-3 | a2-5 | W-5 |
| Production Ex. 24-1 | B-6 | W0-3 | a1-3 | a2-6 | W-6 |
| Production Ex. 24-2 | B-7 | W0-3 | a1-3 | a2-7 | W-7 |
| Production Ex. 24-3 | B-8 | W0-3 | a1-3 | a2-8 | W-8 |
| Production Ex. 24-4 | B-9 | W0-3 | a1-3 | a2-9 | W-9 |
| Production Ex. 25 | B10 | W0-4 | a1-4 | a2-10 | W-10 |
| Production Ex. 26 | B-11 | W0-5 | a1-5 | a2-11 | W-11 |
| Production Ex. 27 | B12 | W0-6 | a1-6 | a2-12 | W-12 |
| Production Ex. 28 | B-13 | W0-7 | a1-7 | a2-13 | W-13 |
| Production Ex. 29 | B-14 | W0-8 | a1-8 | a2-14 | W-14 |
| Production Ex. 30 | B-15 | W0-9 | a1-9 | a2-15 | W-15 |

TABLE 2-continued

| | Resin particles | Core resin raw material resin particle dispersion liquid | Shell resin | Core resin | Aqueous dispersion liquid |
|---|---|---|---|---|---|
| Production Ex. 31 | B-16 | W0-10 | a1-10 | a2-16 | W-16 |
| Production Ex. 32 | B-17 | W0-11 | a1-11 | a2-17 | W-17 |
| Production Ex. 33 | B-18 | W0-12 | a1-12 | a218 | W-18 |
| Production Ex. 34 | B-19 | W0-13 | a1-13 | a2-19 | W-19 |
| Production Ex. 35 | B-20 | W0-14 | a1-14 | a2-20 | W-20 |

The products of Production Examples 1 to 4 and 36 to 40 are summarized in Table 3 below.

TABLE 3

| | Product |
|---|---|
| Production Ex. 1 | Synthesis of Amorphous Polyester Resin A1 |
| Production Ex. 2 | Synthesis of Amorphous Polyester Resin A2 (prepolymer) |
| Production Ex. 3 | Synthesis of Crystalline Polyester Resin B |
| Production Ex. 4 | Synthesis of Amorphous Hybrid Resin (dispersant for crystalline polyester) |
| Production Ex. 36 | Production of Crystalline Polyester Resin Particle Dispersion Liquid |
| Production Ex. 37 | Production of Resin Particle B Aqueous Dispersion Liquid |
| Production Ex. 38 | Preparation of Master Batch 1 |
| Production Ex. 39 | Preparation of Wax Dispersion Liquid |
| Production Ex. 40 | Production of Crystalline Polyester Resin Dispersion Liquid |

Example 1

<Preparation of Oil Phase>

A vessel was charged with 18 parts of [Wax Dispersion Liquid], 20 parts of [Amorphous Polyester Resin A2 Ethyl Acetate Solution], 35 parts of [Crystalline Polyester Resin Dispersion Liquid], 70 parts of [Amorphous Polyester Resin A1], 122 parts of [Master Batch 1], 0.2 parts of isophorone-diamine serving as a curing agent for [Amorphous Polyester Resin A2 Ethyl Acetate Solution] that was a prepolymer, and 60 parts of ethyl acetate. The resultant mixture was mixed by means of TK Homomixer (available from PRIMIX Corporation) for 60 minutes at 5,000 rpm, to thereby obtain [Oil Phase].

<Preparation of Aqueous Phase>

A vessel equipped with a stirrer and a thermometer was charged with 75 parts of ion-exchanged water, 16 parts of a 48.5% sodium dodecyldiphenyl ether disulfate aqueous solution ELEMINOL MON-7 (available from SANYO CHEMICAL, LTD.), and 5 parts of ethyl acetate. The resultant mixture was stirred, followed by further adding 3 parts (solid content: 0.2 parts) of [Aqueous Dispersion Liquid (W0-1)] and 1.5 parts (solid content: 0.3 parts) of [Aqueous Dispersion Liquid (W-1)], to thereby obtain an aqueous phase solution. The obtained aqueous phase solution was provided as [Aqueous Phase 1].

<Emulsification and Removal of Solvent>

To the vessel in which 80 parts of [Oil Phase] was accommodated, 120 parts of [Aqueous Phase 1] was added, and the resultant mixture was mixed by TK Homomixer for 20 minutes at 13,000 rpm, to thereby obtain [Emulsified Slurry 1]. A vessel equipped with a stirrer and a thermometer was charged with [Emulsified Slurry 1], and the solvent was removed for 8 hours at 30° C., followed by maturing for 10 hours at 45° C., to thereby obtain [Dispersion Slurry 1].

<Washing and Drying>

After performing vacuum filtration of 100 parts of [Dispersion Slurry 1], the following operations were performed.

(1): To the filtration cake, 100 parts of ion-exchanged water was added. The resultant was mixed by TK Homomixer (at 12,000 rpm for 10 minutes), followed by subjecting the resultant mixture to filtration.

(2): To the filtration cake of (1), 100 parts of a 10% sodium hydroxide aqueous solution was added and the resultant was mixed by TK Homomixer (at 12,000 rpm for 30 minutes), followed by subjecting the resultant mixture to vacuum filtration.

(3): To the filtration cake of (2), 100 parts of 10% hydrochloric acid was added. The resultant mixture was mixed by means of TK Homomixer (for 10 minutes at the rotational speed of 12,000 rpm), followed by filtering the resultant mixture.

(4): To the filtration cake of (3), 300 parts by mass of ion-exchanged water was added. The resultant mixture was mixed by means of TK Homomixer (for 10 minutes at the rotational speed of 12,000 rpm), followed by filtering the resultant mixture. The series of the processes (1) to (4) was repeated twice, to thereby obtain [Filtration Cake].

[Filtration Cake] was dried by means of an air-circulating drier for 48 hours at 45° C. Then, the resultant was passed through a sieve with a mesh size of 75 μm, to thereby obtain [Toner Base Particles 1].

<External Additive Treatment>

By means of a sample mill, 1.0 part by weight of colloidal silica (AEROSIL R972, available from NIPPON AEROSIL CO., LTD.) serving as an external additive was mixed with 100 parts of [Toner Base Particles 1] to thereby obtain [Toner 1] after the external additive treatment.

Example 2

[Toner Base Particles 2] were obtained in the same manner as in Example 1, except that, in <Preparation of aqueous phase>, 3 parts (solid content: 0.6 parts) of [Aqueous Dispersion Liquid (W0-1)] and 1.5 parts (solid content: 0.3 parts) of [Aqueous Dispersion Liquid (W-1)] were replaced with 3.6 parts (solid content: 0.72 parts) of [Aqueous Dispersion Liquid (W0-1)] and 0.9 parts (solid content: 0.18 parts) of [Aqueous Dispersion Liquid (W-1)]. [Toner 2] was produced using [Toner Base Particles 2] in the same manner as in Example 1.

Example 3

[Toner Base Particles 3] were obtained in the same manner as in Example 1, except that, in <Preparation of aqueous phase>, 3 parts (solid content: 0.6 parts) of [Aqueous Dispersion Liquid (W0-1)] and 1.5 parts (solid content: 0.3 parts) of [Aqueous Dispersion Liquid (W-1)] were replaced with 4.5 parts (solid content: 0.9 parts) of [Aqueous Dispersion Liquid (W-7)]. [Toner 3] was produced using [Toner Base Particles 3] in the same manner as in Example 1.

Example 4

[Toner Base Particles 4] were obtained in the same manner as in Example 1, except that, in <Preparation of aqueous phase>, 3 parts (solid content: 0.6 parts) of [Aqueous Dispersion Liquid (W0-1)] and 1.5 parts (solid content: 0.3 parts) of [Aqueous Dispersion Liquid (W-1)] were replaced with 4.5 parts (solid content: 0.9 parts) of [Aqueous Dispersion Liquid (W-8)]. [Toner 4] was produced using [Toner Base Particles 4] in the same manner as in Example 1.

Example 5

[Toner Base Particles 5] were obtained in the same manner as in Example 1, except that, in <Preparation of aqueous phase>, 3 parts (solid content: 0.6 parts) of [Aqueous Dispersion Liquid (W0-1)] and 1.5 parts (solid content: 0.3 parts) of [Aqueous Dispersion Liquid (W-1)] were replaced with 4.5 parts (solid content: 0.9 parts) of [Aqueous Dispersion Liquid (W-9)]. [Toner 5] was produced using [Toner Base Particles 5] in the same manner as in Example 1.

Example 6

[Toner Base Particles 6] were obtained in the same manner as in Example 1, except that, in <Preparation of aqueous phase>, 3 parts (solid content: 0.6 parts) of [Aqueous Dispersion Liquid (W0-1)] and 1.5 parts (solid content: 0.3 parts) of [Aqueous Dispersion Liquid (W-1)] were replaced with 3 parts (solid content: 0.6 parts) of [Aqueous Dispersion Liquid (W0-2)] and 1.5 parts (solid content: 0.3 parts) of [Aqueous Dispersion Liquid (W-4)]. [Toner 6] was produced using [Toner Base Particles 6] in the same manner as in Example 1.

Example 7

[Toner Base Particles 7] were obtained in the same manner as in Example 1, except that, in <Preparation of aqueous phase>, 3 parts (solid content: 0.6 parts) of [Aqueous Dispersion Liquid (W0-1)] and 1.5 parts (solid content: 0.3 parts) of [Aqueous Dispersion Liquid (W-1)] were replaced with 4.5 parts (solid content: 0.9 parts) of [Aqueous Dispersion Liquid (W-6)]. [Toner 7] was produced using [Toner Base Particles 7] in the same manner as in Example 1.

Example 8

[Toner Base Particles 8] were obtained in the same manner as in Example 1, except that, in <Preparation of aqueous phase>, 3 parts (solid content: 0.6 parts) of [Aqueous Dispersion Liquid (W0-1)] and 1.5 parts (solid content: 0.3 parts) of [Aqueous Dispersion Liquid (W-1)] were replaced with 3.6 parts (solid content: 0.72 parts) of [Aqueous Dispersion Liquid (W0-1)] and 0.9 parts (solid content: 0.18 parts) of [Aqueous Dispersion Liquid (W-2)]. [Toner 8] was produced using [Toner Base Particles 8] in the same manner as in Example 1.

Example 9

[Toner Base Particles 9] were obtained in the same manner as in Example 1, except that, in <Preparation of aqueous phase>, 3 parts (solid content: 0.6 parts) of [Aqueous Dispersion Liquid (W0-1)] and 1.5 parts (solid content: 0.3 parts) of [Aqueous Dispersion Liquid (W-1)] were replaced with 3.6 parts (solid content: 0.72 parts) of [Aqueous Dispersion Liquid (W0-1)] and 0.9 parts (solid content: 0.18 parts) of [Aqueous Dispersion Liquid (W-3)]. [Toner 9] was produced using [Toner Base Particles 9] in the same manner as in Example 1.

Example 10

[Toner Base Particles 10] were obtained in the same manner as in Example 1, except that, in <Preparation of aqueous phase>, 3 parts (solid content: 0.6 parts) of [Aqueous Dispersion Liquid (W0-1)] and 1.5 parts (solid content: 0.3 parts) of [Aqueous Dispersion Liquid (W-1)] were replaced with 4.5 parts (solid content: 0.9 parts) of [Aqueous Dispersion Liquid (W-10)]. [Toner 10] was produced using [Toner Base Particles 10] in the same manner as in Example 1.

Example 11

[Toner Base Particles 11] were obtained in the same manner as in Example 1, except that, in <Preparation of aqueous phase>, 3 parts (solid content: 0.6 parts) of [Aqueous Dispersion Liquid (W0-1)] and 1.5 parts (solid content: 0.3 parts) of [Aqueous Dispersion Liquid (W-1)] were replaced with 3.6 parts (solid content: 0.72 parts) of [Aqueous Dispersion Liquid (W0-5)] and 0.9 parts (solid content: 0.18 parts) of [Aqueous Dispersion Liquid (W-11)]. [Toner 11] was produced using [Toner Base Particles 11] in the same manner as in Example 1.

Example 12

[Toner Base Particles 12] were obtained in the same manner as in Example 1, except that, in <Preparation of aqueous phase>, 3 parts (solid content: 0.6 parts) of [Aqueous Dispersion Liquid (W0-1)] and 1.5 parts (solid content: 0.3 parts) of [Aqueous Dispersion Liquid (W-1)] were replaced with 4.5 parts (solid content: 0.9 parts) of [Aqueous Dispersion Liquid (W-12)]. [Toner 12] was produced using [Toner Base Particles 12] in the same manner as in Example 1.

Example 13

[Toner Base Particles 13] were obtained in the same manner as in Example 1, except that, in <Preparation of aqueous phase>, 3 parts (solid content: 0.6 parts) of [Aqueous Dispersion Liquid (W0-1)] and 1.5 parts (solid content: 0.3 parts) of [Aqueous Dispersion Liquid (W-1)] were replaced with 3 parts (solid content: 0.6 parts) of [Aqueous Dispersion Liquid (W0-7)] and 1.5 parts (solid content: 0.3 parts) of [Aqueous Dispersion Liquid (W-13)]. [Toner 13] was produced using [Toner Base Particles 13] in the same manner as in Example 1.

Example 14

[Toner Base Particles 14] were obtained in the same manner as in Example 1, except that, in <Preparation of aqueous phase>, 3 parts (solid content: 0.6 parts) of [Aqueous Dispersion Liquid (W0-1)] and 1.5 parts (solid content: 0.3 parts) of [Aqueous Dispersion Liquid (W-1)] were replaced with 3 parts (solid content: 0.6 parts) of [Aqueous Dispersion Liquid (W0-8)] and 1.5 parts (solid content: 0.3 parts) of [Aqueous Dispersion Liquid (W-14)]. [Toner 14] was produced using [Toner Base Particles 14] in the same manner as in Example 1.

Example 15

[Toner Base Particles 15] were obtained in the same manner as in Example 1, except that, in <Preparation of aqueous phase>, 3 parts (solid content: 0.6 parts) of [Aqueous Dispersion Liquid (W0-1)] and 1.5 parts (solid content: 0.3 parts) of [Aqueous Dispersion Liquid (W-1)] were replaced with 3 parts (solid content: 0.3 parts) of [Aqueous Dispersion Liquid (W0-9)] and 1.5 parts (solid content: 0.3 parts) of [Aqueous Dispersion Liquid (W-15)]. [Toner 15] was produced using [Toner Base Particles 15] in the same manner as in Example 1.

Example 16

[Toner Base Particles 16] were obtained in the same manner as in Example 1, except that, in <Preparation of aqueous phase>, 3 parts (solid content: 0.6 parts) of [Aqueous Dispersion Liquid (W0-1)] and 1.5 parts (solid content: 0.3 parts) of [Aqueous Dispersion Liquid (W-1)] were replaced with 3 parts (solid content: 0.6 parts) of [Aqueous Dispersion Liquid (W0-10)] and 1.5 parts (solid content: 0.3 parts) of [Aqueous Dispersion Liquid (W-16)]. [Toner 16] was produced using [Toner Base Particles 16] in the same manner as in Example 1.

Example 17

[Toner Base Particles 17] were obtained in the same manner as in Example 1, except that, in <Preparation of aqueous phase>, 3 parts (solid content: 0.6 parts) of [Aqueous Dispersion Liquid (W0-1)] and 1.5 parts (solid content: 0.3 parts) of [Aqueous Dispersion Liquid (W-1)] were replaced with 3 parts (solid content: 0.6 parts) of [Aqueous Dispersion Liquid (W0-11)] and 1.5 parts (solid content: 0.3 parts) of [Aqueous Dispersion Liquid (W-17)]. [Toner 17] was produced using [Toner Base Particles 17] in the same manner as in Example 1.

Example 18

[Toner Base Particles 18] were obtained in the same manner as in Example 1, except that, in <Preparation of aqueous phase>, 3 parts (solid content: 0.6 parts) of [Aqueous Dispersion Liquid (W0-1)] and 1.5 parts (solid content: 0.3 parts) of [Aqueous Dispersion Liquid (W-1)] were replaced with 3 parts (solid content: 0.6 parts) of [Aqueous Dispersion Liquid (W0-12)] and 1.5 parts (solid content: 0.3 parts) of [Aqueous Dispersion Liquid (W-18)]. [Toner 18] was produced using [Toner Base Particles 18] in the same manner as in Example 1.

Example 19

[Toner Base Particles 19] were obtained in the same manner as in Example 1, except that, in <Preparation of aqueous phase>, 3 parts (solid content: 0.6 parts) of [Aqueous Dispersion Liquid (W0-1)] and 1.5 parts (solid content: 0.3 parts) of [Aqueous Dispersion Liquid (W-1)] were replaced with 3 parts (solid content: 0.6 parts) of [Aqueous Dispersion Liquid (W0-13)] and 1.5 parts (solid content: 0.3 parts) of [Aqueous Dispersion Liquid (W-19)]. [Toner 19] was produced using [Toner Base Particles 19] in the same manner as in Example 1.

Example 20

[Toner Base Particles 20] were obtained in the same manner as in Example 1, except that, in <Preparation of aqueous phase>, 3 parts (solid content: 0.6 parts) of [Aqueous Dispersion Liquid (W0-1)] and 1.5 parts (solid content: 0.3 parts) of [Aqueous Dispersion Liquid (W-1)] were replaced with 3 parts (solid content: 0.6 parts) of [Aqueous Dispersion Liquid (W0-14)] and 1.5 parts (solid content: 0.3 parts) of [Aqueous Dispersion Liquid (W-20)]. [Toner 20] was produced using [Toner Base Particles 20] in the same manner as in Example 1.

Example 21

[Toner Base Particles 21] were obtained in the same manner as in Example 1, except that, in <Preparation of aqueous phase>, the amount of the ion-exchanged water was changed from 75 parts to 56.3 parts, and 3 parts (solid content: 0.6 parts) of [Aqueous Dispersion Liquid (W0-1)] and 1.5 parts (solid content: 0.3 parts) of [Aqueous Dispersion Liquid (W-1)] were replaced with 23.2 parts (solid content: 0.9 parts) of [Crystalline Polyester Resin Particle Dispersion Liquid]. [Toner 21] was produced using [Toner Base Particles 21] in the same manner as in Example 1.

Example 22

[Toner Base Particles 22] were obtained in the same manner as in Example 1, except that, in <Preparation of aqueous phase>, the amount of the ion-exchanged water was changed from 75 parts to 76.3 parts, and 3 parts (solid content: 0.6 parts) of [Aqueous Dispersion Liquid (W0-1)] and 1.5 parts (solid content: 0.3 parts) of [Aqueous Dispersion Liquid (W-1)] were replaced with 3.3 parts (solid content: 0.9 parts) of [Resin Particle B Aqueous Dispersion Liquid]. [Toner 22] was produced using [Toner Base Particles 22] in the same manner as in Example 1.

Example 23

[Toner Base Particles 23] were obtained in the same manner as in Example 1, except that, in <Preparation of oil phase>, 35 parts of [Crystalline Polyester Resin Dispersion Liquid], 70 parts of [Amorphous Polyester Resin A1], and 60 parts of ethyl acetate were replaced with 58 parts of [Crystalline Polyester Resin Dispersion Liquid], 66 parts of [Amorphous Polyester Resin A1], and 41 parts of ethyl acetate. [Toner 23] was produced using [Toner Base Particles 23] in the same manner as in Example 1.

Example 24

[Toner Base Particles 24] were obtained in the same manner as in Example 1, except that, in <Preparation of oil phase>, 35 parts of [Crystalline Polyester Resin Dispersion Liquid], 70 parts of [Amorphous Polyester Resin A1], and 60 parts of ethyl acetate were replaced with 88 parts of

[Crystalline Polyester Resin Dispersion Liquid], 62 parts of [Amorphous Polyester Resin A1], and 16 parts of ethyl acetate. [Toner 24] was produced using [Toner Base Particles 24] in the same manner as in Example 1.

Example 25

[Toner Base Particles 25] were obtained in the same manner as in Example 1, except that, in <Preparation of oil phase>, 35 parts of [Crystalline Polyester Resin Dispersion Liquid], 70 parts of [Amorphous Polyester Resin A1], and 60 parts of ethyl acetate were replaced with 27 parts of [Crystalline Polyester Resin Dispersion Liquid], 71 parts of [Amorphous Polyester Resin A1], and 67 parts of ethyl acetate. [Toner 25] was produced using [Toner Base Particles 25] in the same manner as in Example 1.

Example 26

[Toner Base Particles 26] were obtained in the same manner as in Example 1, except that, in <Preparation of oil phase>, 35 parts of [Crystalline Polyester Resin Dispersion Liquid], 70 parts of [Amorphous Polyester Resin A1], and 60 parts of ethyl acetate were replaced with 17.5 parts of [Crystalline Polyester Resin Dispersion Liquid], 73 parts of [Amorphous Polyester Resin A1], and 7 parts of ethyl acetate. [Toner 26] was produced using [Toner Base Particles 26] in the same manner as in Example 1.

Example 27

[Toner Base Particles 27] were obtained in the same manner as in Example 1, except that, in <Preparation of oil phase>, 35 parts of [Crystalline Polyester Resin Dispersion Liquid], 70 parts of [Amorphous Polyester Resin A1], and 60 parts of ethyl acetate were replaced with 6 parts of [Crystalline Polyester Resin Dispersion Liquid], 74 parts of [Amorphous Polyester Resin A1], and 85 parts of ethyl acetate. [Toner 27] was produced using [Toner Base Particles 27] in the same manner as in Example 1.

Example 28

[Toner Base Particles 28] were obtained in the same manner as in Example 1, except that, in <Preparation of oil phase>, 35 parts of [Crystalline Polyester Resin Dispersion Liquid], 70 parts of [Amorphous Polyester Resin A1], and 60 parts of ethyl acetate were replaced with 2.8 parts of [Crystalline Polyester Resin Dispersion Liquid], 75 parts of [Amorphous Polyester Resin A1], and 87 parts of ethyl acetate. [Toner 28] was produced using [Toner Base Particles 28] in the same manner as in Example 1.

Example 29

[Toner Base Particles 29] were obtained in the same manner as in Example 1, except that, in <Preparation of oil phase>, 35 parts of [Crystalline Polyester Resin Dispersion Liquid], 70 parts of [Amorphous Polyester Resin A1], and 60 parts of ethyl acetate were replaced with 82 parts of [Crystalline Polyester Resin Dispersion Liquid], 52 parts of [Amorphous Polyester Resin A1], and 20 parts of ethyl acetate, and 10.5 parts of [Hybrid Resin] was further added. [Toner 29] was produced using [Toner Base Particles 29] in the same manner as in Example 1.

Example 30

[Toner Base Particles 30] were obtained in the same manner as in Example 1, except that, in <Preparation of oil phase>, 35 parts of [Crystalline Polyester Resin Dispersion Liquid], 70 parts of [Amorphous Polyester Resin A1], and 60 parts of ethyl acetate were replaced with 58 parts of [Crystalline Polyester Resin Dispersion Liquid], 59 parts of [Amorphous Polyester Resin A1], and 40 parts of ethyl acetate, and 7.5 parts of [Hybrid Resin] was further added. [Toner 30] was produced using [Toner Base Particles 30] in the same manner as in Example 1.

Example 31

[Toner Base Particles 31] were obtained in the same manner as in Example 1, except that, in <Preparation of oil phase>, 35 parts of [Crystalline Polyester Resin Dispersion Liquid], 70 parts of [Amorphous Polyester Resin A1], and 60 parts of ethyl acetate were replaced with 6 parts of [Crystalline Polyester Resin Dispersion Liquid], 74 parts of [Amorphous Polyester Resin A1], and 85 parts of ethyl acetate, and 0.8 parts of [Hybrid Resin] was further added. [Toner 31] was produced using [Toner Base Particles 31] in the same manner as in Example 1.

Example 32

[Toner Base Particles 32] were obtained in the same manner as in Example 1, except that, in <Preparation of oil phase>, 35 parts of [Crystalline Polyester Resin Dispersion Liquid], 70 parts of [Amorphous Polyester Resin A1], and 60 parts of ethyl acetate were replaced with 2.8 parts of [Crystalline Polyester Resin Dispersion Liquid], 75 parts of [Amorphous Polyester Resin A1], and 87 parts of ethyl acetate, and in <Preparation of aqueous phase>, 3 parts (solid content: 0.6 parts) of [Aqueous Dispersion Liquid (W0-1)] and 1.5 parts (solid content: 0.3 parts) of [Aqueous Dispersion Liquid (W-1)] were replaced with 3.6 parts (solid content: 0.72 parts) of [Aqueous Dispersion Liquid (W0-5)] and 0.9 parts (solid content: 0.18 parts) of [Aqueous Dispersion Liquid (W-11)]. [Toner 32] was produced using [Toner Base Particles 32] in the same manner as in Example 1.

Example 33

[Toner Base Particles 33] were obtained in the same manner as in Example 1, except that, in <Preparation of oil phase>, 35 parts of [Crystalline Polyester Resin Dispersion Liquid], 70 parts of [Amorphous Polyester Resin A1], and 60 parts of ethyl acetate were replaced with 88 parts of [Crystalline Polyester Resin Dispersion Liquid], 62 parts of [Amorphous Polyester Resin A1], and 16 parts of ethyl acetate, and in <Preparation of aqueous phase>, 3 parts (solid content: 0.6 parts) of [Aqueous Dispersion Liquid (W0-1)] and 1.5 parts (solid content: 0.3 parts) of [Aqueous Dispersion Liquid (W-1)] were replaced with 4.5 parts (solid content: 0.9 parts) of [Aqueous Dispersion Liquid (W-10)]. [Toner 33] was produced using [Toner Base Particles 33] in the same manner as in Example 1.

Example 34

[Toner Base Particles 34] were obtained in the same manner as in Example 1, except that, in <Preparation of oil phase>, 35 parts of [Crystalline Polyester Resin Dispersion Liquid], 70 parts of [Amorphous Polyester Resin A1], and 60 parts of ethyl acetate were replaced with 88 parts of [Crystalline Polyester Resin Dispersion Liquid], 62 parts of [Amorphous Polyester Resin A1], and 16 parts of ethyl acetate, and in <Preparation of aqueous phase>, 3 parts (solid content: 0.6 parts) of [Aqueous Dispersion Liquid (W0-1)] and 1.5 parts (solid content: 0.3 parts) of [Aqueous Dispersion Liquid (W-1)] were replaced with 3.6 parts (solid content: 0.72 parts) of [Aqueous Dispersion Liquid (W0-5)] and 0.9 parts (solid content: 0.18 parts) of [Aqueous Dispersion Liquid (W-11)]. [Toner 34] was produced using [Toner Base Particles 34] in the same manner as in Example 1.

Example 35

[Toner Base Particles 35] were obtained in the same manner as in Example 1, except that, in <Preparation of oil phase>, 35 parts of [Crystalline Polyester Resin Dispersion Liquid], 70 parts of [Amorphous Polyester Resin A1], and 60 parts of ethyl acetate were replaced with 2.8 parts of [Crystalline Polyester Resin Dispersion Liquid], 75 parts of [Amorphous Polyester Resin A1], and 87 parts of ethyl acetate, and in <Preparation of aqueous phase>, 3 parts (solid content: 0.6 parts) of [Aqueous Dispersion Liquid (W0-1)] and 1.5 parts (solid content: 0.3 parts) of [Aqueous Dispersion Liquid (W-1)] were replaced with 4.5 parts (solid content: 0.9 parts) of [Aqueous Dispersion Liquid (W-10)]. [Toner 35] was produced using [Toner Base Particles 35] in the same manner as in Example 1.

Comparative Example 1

[Toner Base Particles 36] were obtained in the same manner as in Example 1, except that, in <Preparation of aqueous phase>, 3 parts (solid content: 0.6 parts) of [Aqueous Dispersion Liquid (W0-1)] and 1.5 parts (solid content: 0.3 parts) of [Aqueous Dispersion Liquid (W-1)] were replaced with 4.5 parts (solid content: 0.9 parts) of [Aqueous Dispersion Liquid (W-5)]. [Toner 36] was produced using [Toner Base Particles 36] in the same manner as in Example 1.

Comparative Example 2

[Toner Base Particles 37] were obtained in the same manner as in Example 1, except that, in <Preparation of aqueous phase>, 3 parts (solid content: 0.6 parts) of [Aqueous Dispersion Liquid (W0-1)] and 1.5 parts (solid content: 0.3 parts) of [Aqueous Dispersion Liquid (W-1)] were replaced with 3.75 parts (solid content: 0.75 parts) of [Aqueous Dispersion Liquid (W0-5)]. [Toner 37] was produced using [Toner Base Particles 37] in the same manner as in Example 1.

Comparative Example 3

[Toner Base Particles 38] were obtained in the same manner as in Example 1, except that, in <Preparation of oil phase>, 35 parts of [Crystalline Polyester Resin Dispersion Liquid], 70 parts of [Amorphous Polyester Resin A1], and 60 parts of ethyl acetate were replaced with 100 parts of [Crystalline Polyester Resin Dispersion Liquid], 60 parts of [Amorphous Polyester Resin A1], and 5 parts of ethyl acetate. [Toner 38] was produced using [Toner Base Particles 38] in the same manner as in Example 1.

Comparative Example 4

[Toner Base Particles 39] were obtained in the same manner as in Example 1, except that, in <Preparation of oil phase>, 35 parts of [Crystalline Polyester Resin Dispersion Liquid], 70 parts of [Amorphous Polyester Resin A1], and 60 parts of ethyl acetate were replaced with 2.4 parts of [Crystalline Polyester Resin Dispersion Liquid], 75 parts of [Amorphous Polyester Resin A1], and 88 parts of ethyl acetate. [Toner 39] was produced using [Toner Base Particles 39] in the same manner as in Example 1.

Comparative Example 5

[Toner Base Particles 40] were obtained in the same manner as in Example 1, except that, in <Preparation of oil phase>, 35 parts of [Crystalline Polyester Resin Dispersion Liquid], 70 parts of [Amorphous Polyester Resin A1], and 60 parts of ethyl acetate were replaced with 4.7 parts of [Crystalline Polyester Resin Dispersion Liquid], 74 parts of [Amorphous Polyester Resin A1], and 86 parts of ethyl acetate, and 0.6 parts of [Hybrid Resin] was further added. [Toner 40] was produced using [Toner Base Particles 40] in the same manner as in Example 1.

<Production of Carrier>

To 100 parts of toluene, 100 parts of a silicone resin (organo straight silicone), 5 parts of γ-(2-aminoethyl)aminopropyltrimethoxysilane, and 10 parts of carbon black were added. The resultant was dispersed by means of a homomixer for 20 minutes to thereby prepare a resin layer coating liquid.

The resin layer coating liquid was applied onto surfaces of spherical magnetite particles (1,000 parts by mass) having the average particle diameter of 50 μm by means of a fluidized bed coater, to thereby produce [Carrier].

<Production of Developer>

By means of a ball mill, 5 parts of each [toner] and 95 parts of [carrier] were mixed to produce each [developer].

Next, various characteristics of each of the obtained toners, and each of the obtained developers were evaluated in the following manner. The results are presented in Tables 4-1 to 4-4.

<Granularity>

Each [Toner] was dispersed in water, and a volume average particle diameter and particle size distribution (volume average particle diameter/number average particle diameter) thereof were measured by means of Coulter Counter "Multisizer III" (available from Beckman Coulter, Inc.). The granularity was evaluated based on the following criteria.

The granularity was determined as being preferable when the volume average particle diameter of the toner was from 5.0 μm through 5.9 μm, and the particle size distribution of the toner was 1.20 or less.

[Evaluation Criteria]

A: The particle size distribution was 1.20 or less.

B: The particle size distribution was 1.21 or greater but 1.24 or less.

C: The particle size distribution was 1.25 or greater.

<Low Temperature Fixability>

The composite resin particles were uniformly deposited on a surface of paper to give a deposition amount of 0.8 $mg/cm^2$. As a method for depositing the composite resin particles onto the surface of the paper, a printer from which a thermal fixing device had been removed was used. Another method may be used as long as the composite resin particles can be uniformly deposited with the above-mentioned weight density. A cold offset onset temperature (minimum fixing temperature (MFT)) when the paper was passed through a nip with a heat roller at the fixing speed (circumferential speed of the heat roller) of 213 mm/sec, and fixing pressure (heat roller pressure) of 10 kg/$cm^2$.

The lower cold offset onset temperature means more excellent low temperature fixability.

[Cold Offset Evaluation Criteria]

AA: The minimum fixing temperature was 130° C. or lower.

A: The minimum fixing temperature was higher than 130° C. but 135° C. or lower.

B: The minimum fixing temperature was higher than 135° C. but 140° C. or lower.

C: The minimum fixing temperature was higher than 140° C.

<Toner Adhesion Force>

The force between two particles (Fp) of each toner when compressed at 160 kN/$m^2$ could be measured by measuring the toner powder layer by means of a compression and tensile tester AGGROBOT (available from HOSOKAWA MICRON CORPORATION). Specifically, a cylindrical cell divided into an upper part and a lower part was charged with the predetermined amount of each toner, and the toner was held with applying the pressure of 160 kN/$m^2$. The Fp was calculated from the maximum tensile fracture force when the upper cell was lifted and the powder layer was fractured, the height of the powder layer as compressed, the inner diameter of the cell, the average particle diameter of the toner, the true density of the toner, and the amount of the toner.

Specifically, the measurement was performed under the conditions that the toner amount was 8.00 g 0.02 g, the environment temperature was 25° C.±2° C., the humidity was 30% RH±5% RH, the inner diameter of the cell was 25 mm, the cell temperature was 25° C., the diameter of the spring wire was 1.0 mm, the compression speed was 0.1 mm/sec, the compression load was 8 kg (applied pressure: 160 kN/$m^2$), the compression retention time was 60 sec, the tensile speed was 0.6 mm/sec, the tensile sampling onset time was 0 sec, the tensile sampling time was sec, and the force between the two particles (Fp) calculated by the application software installed in the device was determined as the force between the two particles (Fp) of the toner as compressed at 160 kN/$m^2$. The results were evaluated based on the following criteria. The measurement was performed on the toner after conditioning the toner for 24 hours at 23° C. and 53% RH.

[Evaluation Criteria]

AA: Excellent, Fp≤200

A: Good, 200<Fp≤300

B: Acceptable, 300<Fp≤500

C: Not good, a fracture failure

<Heat Resistant Storage Stability>

A 50 mL glass container was charged with the toner. After leaving the toner in the glass container to stand in a thermostat chamber of 50° C. for 24 hours, the toner was cooled to 24° C. Next, a penetration degree [mm] was measured according to a penetration degree test (JISK2235-1991), to thereby evaluate heat resistant storage stability of the toner.

[Evaluation Criteria]

AA: The penetration degree was 20 mm or greater.

A: The penetration degree was 15 mm or greater but less than 20 mm.

B: The penetration degree was 10 mm or greater but less than 15 mm.

C: The penetration degree was less than 10 mm.

TABLE 4-1-1

| | | Ex. 1 Toner 1 | Ex. 2 Toner 2 | Ex. 3 Toner 3 | Ex. 4 Toner 4 | Ex. 5 Toner 5 |
|---|---|---|---|---|---|---|
| Constitutional component of resin particles | | Styrene-acrylic resin | Styrene-acrylic resin | Styrene-acrylic resin | Styrene-acrylic resin | Styrene-acrylic resin |
| Structure of Resin Particles B | | Core-shell structure | Core-shell structure | Core-shell structure | Core-shell structure | Core-shell structure |
| Resin Particle A Aqueous Dispersion Liquid (WO) | | W0-1 | W0-1 | — | — | — |
| Resin Particle B Aqueous Dispersion Liquid (W) | | W-1 | W-1 | W-7 | W-8 | W-9 |
| Blended ratio (W/WO) | | 1/2 | 1/4 | 1/0 | 1/0 | 1/0 |
| Standard deviation of distance between resin particles (nm) | | 64 | 561 | 332 | 312 | 291 |
| Occupancy ratio of aggregates (%) | | 29.2 | 20.3 | 19.1 | 38.4 | 56.2 |
| Crystalline polyester abundance ratio (%) | | 14.1 | 13.5 | 13.6 | 14.5 | 14.8 |
| Evaluation results | Granularity | A | A | A | A | A |
| | Low temperature fixability | AA | AA | AA | A | A |
| | Adhesion force | AA | A | A | AA | AA |
| | Heat resistant storage stability | AA | AA | AA | AA | AA |

TABLE 4-1-2

| | | Ex. 6 Toner 6 | Ex. 7 Toner 7 | Ex. 8 Toner 8 | Ex. 9 Toner 9 | Ex. 10 Toner 10 |
|---|---|---|---|---|---|---|
| Constitutional component of resin particles | | Styrene-acrylic resin | Styrene-acrylic resin | Styrene-acrylic resin | Styrene-acrylic resin | Styrene-acrylic resin |
| Structure of Resin Particles B | | Core-shell structure | Core-shell structure | Core-shell structure | Core-shell structure | Core-shell structure |
| Resin Particle A Aqueous Dispersion Liquid (WO) | | W0-2 | — | W0-1 | W0-1 | — |
| Resin Particle B Aqueous Dispersion Liquid (W) | | W-4 | W-6 | W-2 | W-3 | W-10 |
| Blended ratio (W/WO) | | 1/2 | 1/0 | 1/4 | 1/4 | 1/0 |
| Standard deviation of distance between resin particles (nm) | | 203 | 324 | 696 | 704 | 350 |
| Occupancy ratio of aggregates (%) | | 28.1 | 11.1 | 62.3 | 2.0 | 70.0 |
| Crystalline polyester abundance ratio (%) | | 14.2 | 13.3 | 15.0 | 13.1 | 15.1 |
| Evaluation results | Granularity | A | A | A | A | A |
| | Low temperature fixability | A | A | B | A | B |
| | Adhesion force | AA | B | B | B | B |
| | Heat resistant storage stability | AA | AA | A | AA | A |

TABLE 4-2-1

| | | Ex. 11 Toner 11 | Ex. 12 Toner 12 | Ex. 13 Toner 13 | Ex. 14 Toner 14 | Ex. 15 Toner 15 |
|---|---|---|---|---|---|---|
| Constitutional component of resin particles | | Styrene-acrylic resin | Styrene-acrylic resin | Styrene-acrylic resin | Styrene-acrylic resin | Styrene-acrylic resin |
| Structure of Resin Particles B | | Core-shell structure | Core-shell structure | Core-shell structure | Core-shell structure | Core-shell structure |
| Resin Particle A Aqueous Dispersion Liquid (WO) | | W0-5 | — | W0-7 | W0-8 | W0-9 |
| Resin Particle B Aqueous Dispersion Liquid (W) | | W-11 | W-12 | W-13 | W-14 | W-15 |
| Blended ratio (W/WO) | | 1/4 | 1/0 | 1/2 | 1/2 | 1/2 |
| Standard deviation of distance between resin particles (nm) | | 690 | 330 | 101 | 86 | 64 |
| Occupancy ratio of aggregates (%) | | 1.0 | 5.0 | 19.8 | 22.2 | 30.1 |
| Crystalline polyester abundance ratio (%) | | 13.0 | 13.1 | 14.1 | 14.1 | 14.1 |
| Evaluation results | Granularity | A | A | A | A | A |
| | Low temperature fixability | A | A | A | AA | AA |
| | Adhesion force | B | B | A | A | A |
| | Heat resistant storage stability | B | AA | A | A | A |

TABLE 4-2-2

| | | Ex. 16 Toner 16 | Ex. 17 Toner 17 | Ex. 18 Toner 18 | Ex. 19 Toner 19 | Ex. 20 Toner 20 |
|---|---|---|---|---|---|---|
| Constitutional component of resin particles | | Styrene-acrylic resin | Styrene-acrylic resin | Styrene-acrylic resin | Styrene-acrylic resin | Styrene-acrylic resin |
| Structure of Resin Particles B | | Core-shell structure | Core-shell structure | Core-shell structure | Core-shell structure | Core-shell structure |
| Resin Particle A Aqueous Dispersion Liquid (WO) | | W0-10 | W0-11 | W0-12 | W0-13 | W0-14 |
| Resin Particle B Aqueous Dispersion Liquid (W) | | W-16 | W-17 | W-18 | W-19 | W-20 |
| Blended ratio (W/WO) | | 1/2 | 1/2 | 1/2 | 1/2 | 1/2 |
| Standard deviation of distance between resin particles (nm) | | 63 | 63 | 78 | 110 | 125 |
| Occupancy ratio of aggregates (%) | | 36.3 | 45.2 | 48.8 | 51.1 | 55.5 |
| Crystalline polyester abundance ratio (%) | | 14.4 | 14.1 | 14.1 | 14.1 | 14.1 |
| Evaluation results | Granularity | A | A | A | A | B |
| | Low temperature fixability | AA | AA | AA | AA | AA |
| | Adhesion force | AA | A | A | A | A |
| | Heat resistant storage stability | AA | A | A | A | B |

TABLE 4-3-1

| | | Ex. 21 Toner 21 | Ex. 22 Toner 22 | Ex. 23 Toner 23 | Ex. 24 Toner 24 | Ex. 25 Toner 25 |
|---|---|---|---|---|---|---|
| Constitutional component of resin particles | | Polyester resin | Styrene-acrylic resin | Styrene-acrylic resin | Styrene-acrylic resin | Styrene-acrylic resin |
| Structure of Resin Particles B | | Non-core-shell structure | Non-core-shell structure | Core-shell structure | Core-shell structure | Core-shell structure |
| Resin Particle A Aqueous Dispersion Liquid (WO) | | — | — | W0-1 | W0-1 | W0-1 |
| Resin Particle B Aqueous Dispersion Liquid (W) | | Crystalline Polyester Resin Particle Dispersion Liquid | Resin Particle B Aqueous Dispersion Liquid | W-1 | W-1 | W-1 |
| Blended ratio (W/WO) | | 1/0 | 1/0 | 1/2 | 1/2 | 1/2 |
| Standard deviation of distance between resin particles (nm) | | 522 | 512 | 65 | 61 | 62 |
| Occupancy ratio of aggregates (%) | | 16.2 | 20.2 | 29.1 | 28.8 | 28.5 |
| Crystalline polyester abundance ratio (%) | | 13.5 | 13.4 | 19.2 | 25.0 | 11.0 |
| Evaluation results | Granularity | B | A | A | A | A |
| | Low temperature fixability | AA | B | AA | AA | AA |
| | Adhesion force | B | B | A | B | AA |
| | Heat resistant storage stability | B | B | A | B | AA |

TABLE 4-3-2

| | | Ex. 26 Toner 26 | Ex. 27 Toner 27 | Ex. 28 Toner 28 | Ex. 29 Toner 29 | Ex. 30 Toner 30 |
|---|---|---|---|---|---|---|
| Constitutional component of resin particles | | Styrene-acrylic resin | Styrene-acrylic resin | Styrene-acrylic resin | Styrene-acrylic resin | Styrene-acrylic resin |
| Structure of Resin Particles B | | Core-shell structure | Core-shell structure | Core-shell structure | Core-shell structure | Core-shell structure |
| Resin Particle A Aqueous Dispersion Liquid (WO) | | W0-1 | W0-1 | W0-1 | W0-1 | W0-1 |
| Resin Particle B Aqueous Dispersion Liquid (W) | | W-1 | W-1 | W-1 | W-1 | W-1 |
| Blended ratio (W/WO) | | 1/2 | 1/2 | 1/2 | 1/2 | 1/2 |
| Standard deviation of distance between resin particles (nm) | | 64 | 63 | 60 | 62 | 61 |
| Occupancy ratio of aggregates (%) | | 29.4 | 28.7 | 28.8 | 29.1 | 29.3 |
| Crystalline polyester abundance ratio (%) | | 9.1 | 4.2 | 2.0 | 14.2 | 11.3 |
| Evaluation results | Granularity | A | A | A | A | A |
| | Low temperature fixability | A | A | B | AA | AA |
| | Adhesion force | AA | AA | AA | AA | AA |
| | Heat resistant storage stability | AA | AA | AA | AA | AA |

TABLE 4-4-1

| | | Ex. 31 Toner 31 | Ex. 32 Toner 32 | Ex. 33 Toner 33 | Ex. 34 Toner 34 | Ex. 35 Toner 35 |
|---|---|---|---|---|---|---|
| Constitutional component of resin particles | | Styrene-acrylic resin | Styrene-acrylic resin | Styrene-acrylic resin | Styrene-acrylic resin | Styrene-acrylic resin |
| Structure of Resin Particles B | | Core-shell structure | Core-shell structure | Core-shell structure | Core-shell structure | Core-shell structure |
| Resin Particle A Aqueous Dispersion Liquid (WO) | | W0-1 | W0-5 | — | W0-5 | — |
| Resin Particle B Aqueous Dispersion Liquid (W) | | W-1 | W-11 | W-10 | W-11 | W-10 |
| Blended ratio (W/WO) | | 1/2 | 1/4 | 1/0 | 1/4 | 1/0 |
| Standard deviation of distance between resin particles (nm) | | 63 | 680 | 329 | 687 | 327 |
| Occupancy ratio of aggregates (%) | | 28.9 | 1.0 | 70.0 | 1.0 | 70.0 |
| Crystalline polyester abundance ratio (%) | | 2.5 | 2.5 | 25.0 | 25.0 | 2.5 |
| Evaluation results | Granularity | A | A | A | A | A |
| | Low temperature fixability | B | B | AA | AA | B |
| | Adhesion force | AA | A | A | B | AA |
| | Heat resistant storage stability | AA | AA | A | B | AA |

TABLE 4-4-2

| | | Comp. Ex. 1 Toner 36 | Comp. Ex. 2 Toner 37 | Comp. Ex. 3 Toner 38 | Comp. Ex. 4 Toner 39 | Comp. Ex. 5 Toner 40 |
|---|---|---|---|---|---|---|
| Constitutional component of resin particles | | Styrene-acrylic resin | Styrene-acrylic resin | Styrene-acrylic resin | Styrene-acrylic resin | Styrene-acrylic resin |
| Structure of Resin Particles B | | Core-shell structure | Core-shell structure | Core-shell structure | Core-shell structure | Core-shell structure |
| Resin Particle A Aqueous Dispersion Liquid (WO) | | — | W0-5 | W0-1 | W0-1 | W0-1 |
| Resin Particle B Aqueous Dispersion Liquid (W) | | W-5 | W-11 | W-1 | W-1 | W-1 |
| Blended ratio (W/WO) | | 1/0 | 1/5 | 1/2 | 1/2 | 1/2 |
| Standard deviation of distance between resin particles (nm) | | 321 | 692 | 61 | 65 | 62 |
| Occupancy ratio of aggregates (%) | | 75.1 | 0.9 | 29 2 | 29.4 | 28.6 |
| Crystalline polyester abundance ratio (%) | | 15.5 | 13.0 | 27.0 | 2.3 | 2.0 |
| Evaluation results | Granularity | A | A | A | A | A |
| | Low temperature fixability | C | A | AA | C | C |
| | Adhesion force | A | C | C | AA | AA |
| | Heat resistant storage stability | C | B | C | AA | AA |

It was found from the results of Tables 4-1 to 4-4 that Examples 1 to 35 of the present disclosure exhibited excellent performances in all of granularity, low temperature fixability, adhesion force, and heat resistant storage stability.

In Comparative Example 1, the amount of the arrogates on the surfaces of the toner base particles was large, the low temperature fixability was slightly impaired, and the heat resistant storage stability was not desirable because the coverage with the external additives could not be performed appropriately due to the excessive amount of the aggregates. In Comparative Example 2, the amount of the aggregates on the surfaces of the toner base particles was small and therefore a spacer effect thereof was low to impair the adhesion force. In Comparative Example 3, the surface crystalline polyester (Cpes) amount was excessive, the adhesion force and the heat resistant storage stability were poor. In Comparative Examples 4 and 5, moreover, the appropriate amount of the Cpes was not present, and therefore low temperature fixability was poor.

The present disclosure relates to the toner according to (1), but the embodiments of the present disclosure include the following (2) to (10).

(1) A toner including:

toner base particles, each including an amorphous polyester resin, a crystalline polyester resin, a release agent, and resin particles; and external additives deposited on a surface of each of the toner base particles, wherein an abundance ratio of the crystalline polyester resin in the surface of the toner base particle as observed by a transmission electron microscope (TEM) is 2.5% or greater but 25% or less, the resin particles are deposited at the surface of the toner base particle as observed by a scanning electron microscope (SEM), and a ratio of aggregates of the resin particles occupying the surface of the toner base particle is 1% or greater but 70% or less, where R is a major axis of the minimum particle of the resin particles, and the resin particle having a major axis of 3R or greater is determined as the aggregate.

(2) The toner according to (1), wherein the amorphous polyester resin includes two or more amorphous polyester resins.

(3) The toner according to (1) or (2), wherein each of the resin particles has a core-shell structure, where a resin constituting a core of the core-shell structure and a resin constituting a shell of the core-shell structure are different resins.

(4) The toner according to any one of (1) to (3), wherein the resin particles include a styrene-acrylic resin.

(5) The toner according to any one of (1) to (4), wherein the resin particles have a volume average primary particle diameter of 10 nm or greater but 100 nm or less.

(6) The toner according to any one of (1) to (5), wherein a standard deviation of a distance between the resin particles next to one another is 500 nm or less.

(7) A developer including:

the toner according to any one of (1) to (6); and a carrier.

(8) A toner storage unit including:

the toner according to any one of (1) to (6); and a unit storing the toner therein.

(9) An image forming apparatus including:

an electrostatic latent image bearer;

an electrostatic latent image forming unit configured to form an electrostatic latent image on the electrostatic latent image bearer;

a developing unit storing a toner therein, and configured to develop the electrostatic latent image formed on the electrostatic latent image bearer with the toner to form a toner image;

a transferring unit configured to transfer the toner image formed on the electrostatic latent image bearer onto a surface of a recording medium; and a fixing unit configured to fix the toner image transferred on the surface of the recording medium, wherein the toner is the toner according to any one of (1) to (6).

(10) An image forming method including:

forming an electrostatic latent image on an electrostatic latent image bearer;

developing the electrostatic latent image formed on the electrostatic latent image bearer with a toner to form a toner image;

transferring the toner image formed on the electrostatic latent image bearer onto a surface of a recording medium; and fixing the toner image transferred on the surface of the recording medium, wherein the toner is the toner according to any one of (1) to (6).

What is claimed is:

1. A toner comprising toner base particles, each including an amorphous polyester resin, a crystalline polyester resin, a release agent, and resin particles; and external additives deposited on a surface of each of the toner base particles, wherein an abundance ratio of the crystalline polyester resin in the surface of the toner base particle as observed by a transmission electron microscope (TEM) is 2.5% or greater but 25% or less, the resin particles are deposited at the surface of the toner base particle as observed by a scanning electron microscope (SEM), and a ratio of aggregates of the resin particles occupying the surface of the toner base particle is 1% or greater but 70% or less, where R is a major axis of the minimum particle of the resin particles, and the resin particle having a major axis of 3R or greater is determined as the aggregate, wherein the resin particles include resin particles (B) comprising two types of styrene acrylic resins (resin (a1) and resin (a2) and resin particles (A) comprising one type of styrene acrylic resin.

2. The toner according to claim 1, wherein the amorphous polyester resin includes two or more amorphous polyester resins.

3. The toner according to claim 1, wherein each of the resin particles has a core-shell structure, where a resin constituting a core of the core-shell structure and a resin constituting a shell of the core-shell structure are different resins.

4. The toner according to claim 1, wherein the resin particles have a volume average primary particle diameter of 10 nm or greater but 100 nm or less.

5. The toner according to claim 1, wherein a standard deviation of a distance between the resin particles next to one another is 500 nm or less.

6. A developer, comprising:

the toner according to claim 1; and a carrier.

7. A toner storage unit comprising:

the toner according to claim 1; and a unit storing the toner therein.

8. An image forming apparatus comprising:

an electrostatic latent image bearer;

an electrostatic latent image forming unit configured to form an electrostatic latent image on the electrostatic latent image bearer;

a developing unit storing a toner therein, and configured to develop the electrostatic latent image formed on the electrostatic latent image bearer with the toner to form a toner image;

a transferring unit configured to transfer the toner image formed on the electrostatic latent image bearer onto a surface of a recording medium; and a fixing unit configured to fix the toner image transferred on the surface of the recording medium, wherein the toner is the toner according to claim 1.

9. An image forming method comprising:

forming an electrostatic latent image on an electrostatic latent image bearer;

developing the electrostatic latent image formed on the electrostatic latent image bearer with a toner to form a toner image;

transferring the toner image formed on the electrostatic latent image bearer onto a surface of a recording medium; and fixing the toner image transferred on the surface of the recording medium, wherein the toner is the toner according to claim 1.

10. The toner according to claim 3, wherein resin (a1) is a shell resin and resin (a2) is a core resin.

11. The toner according to claim 1, wherein resin (a1) is a styrene-(meth)acrylic acid ester copolymer.

12. The toner according to claim 1, wherein resin (a2) is a styrene-(meth)acrylic acid ester copolymer.

13. The toner according to claim 1, wherein particles (A) comprising only one type of styrene acrylic resin.

14. The toner according to claim 1, wherein resin particles B have a core-shell structure.

* * * * *